US011544982B2

United States Patent
Pertz et al.

(10) Patent No.: US 11,544,982 B2
(45) Date of Patent: Jan. 3, 2023

(54) SELF-SERVICE MODULAR DROP SAFES WITH MESSENGER ACCESS CAPABILITY

(71) Applicant: Brink's Network, Inc., Richmond, VA (US)

(72) Inventors: Douglas A. Pertz, Southlake, TX (US); Rohan Pal, Colleyville, TX (US); Keith Barthelmeus, Atlanta, GA (US); Laura Baumann, Rockwall, TX (US); Shane McKiernan, Charlotte, NC (US); Ken Pohl, Arlington, TX (US); Kyle Bolin, Flower Mound, TX (US); Colm McKiernan, Flower Mound, TX (US); Mark Nietubyc, Frisco, TX (US)

(73) Assignee: BRINK'S NETWORK, INCORPORATED, Richmond, VA (US)

( * ) Notice: Subject to any disclaimer, the term of this patent is extended or adjusted under 35 U.S.C. 154(b) by 0 days.

(21) Appl. No.: 17/379,543

(22) Filed: Jul. 19, 2021

(65) Prior Publication Data
US 2021/0358240 A1      Nov. 18, 2021

Related U.S. Application Data

(62) Division of application No. 17/003,120, filed on Aug. 26, 2020, now Pat. No. 11,164,412.
(Continued)

(51) Int. Cl.
G07C 9/00 (2020.01)
G06K 7/10 (2006.01)
(Continued)

(52) U.S. Cl.
CPC ..... G07C 9/00912 (2013.01); G06K 7/10297 (2013.01); G06K 19/06028 (2013.01);
(Continued)

(58) Field of Classification Search
CPC ............ G07C 9/00912; G07C 9/00309; G07C 9/00182; G07C 2009/0042;
(Continued)

(56) References Cited

U.S. PATENT DOCUMENTS 3,778,596 A    12/1973   Wapner
4,972,784 A    11/1990   Ing-Hsiang
(Continued)

FOREIGN PATENT DOCUMENTS

CN    108615285 A    10/2018
EP    3 120 334 B1    4/2022
(Continued)

OTHER PUBLICATIONS

The above U.S. Pat. No. 1 and U.S. Publications # 3, 7-8 and 11 were cited in an Aug. 18, 2022 European Search Report—EP 22170570.0.
(Continued)

*Primary Examiner* — Nam V Nguyen
(74) *Attorney, Agent, or Firm* — Cowan, Liebowitz & Latman, P.C.

(57) ABSTRACT

Novel modular smart management devices in the form of drop safes include the modular components of a chassis, door and technology cabinet. The drop safes enable retailers to make cash deposits quickly and safely within or near their own facilities. Various technology, including RFID readers, RFID tags, and other equipment allow the drop safes to identify each deposited bag. Employees utilize specialized apps on their mobile devices to facilitate deposit creation and other tasks. Novel methodologies for accessing the drop safes for emptying employ single-use, time-expiration type authorization codes along with other security measures to minimize risk and to provide other benefits. Novel structures along with methodologies for replacing, on-site, modular
(Continued)

components with auto-detection of functionality during initialization and re-initialization enables for efficient replacement and upgrading of components, including the upgrading of safes to provide additional functionality.

28 Claims, 27 Drawing Sheets

Related U.S. Application Data

(60) Provisional application No. 62/898,868, filed on Sep. 11, 2019.

(51) Int. Cl.
*G06K 19/06* (2006.01)
*G06K 19/07* (2006.01)

(52) U.S. Cl.
CPC ... *G06K 19/06037* (2013.01); *G06K 19/0723* (2013.01); *G07C 9/00309* (2013.01)

(58) Field of Classification Search
CPC .......... G07C 2209/08; G06K 7/10297; G06K 19/06037; G06K 19/0723; G06K 19/06028; G06K 7/10415; G07F 19/206; G07F 19/209; G07F 19/21
USPC ........................................ 340/5.61
See application file for complete search history.

(56) References Cited

U.S. PATENT DOCUMENTS

| | | | |
|---|---|---|---|
| 5,695,038 A | 12/1997 | Keith, III et al. | |
| 5,814,797 A | 9/1998 | Rifkin | |
| 5,944,163 A | 8/1999 | Keith, III et al. | |
| 5,975,275 A | 11/1999 | Keith, III et al. | |
| 6,206,284 B1 | 3/2001 | Do | |
| 6,527,172 B1 | 3/2003 | Lewis | |
| 7,143,933 B2 | 12/2006 | Uematsu | |
| 7,611,045 B1 | 11/2009 | Lute | |
| 7,965,184 B1 | 6/2011 | Nichols | |
| 8,109,379 B2 | 2/2012 | Sjostrom | |
| 8,157,162 B2 | 4/2012 | Jonsson | |
| 8,645,214 B2 | 2/2014 | Hipolito et al. | |
| 8,651,367 B1 | 2/2014 | Spencer | |
| 8,844,804 B2 | 9/2014 | Blachowicz et al. | |
| 9,367,836 B2 | 6/2016 | Hanson | |
| 9,495,705 B2 | 11/2016 | Blachowicz et al. | |
| 9,640,009 B1 | 5/2017 | Sears et al. | |
| 9,911,108 B2 | 3/2018 | Hipolito et al. | |
| 10,513,379 B2 | 12/2019 | McBride | |
| 11,164,412 B2* | 11/2021 | Pertz ................ | G06K 19/06028 |
| 2002/0023954 A1 | 2/2002 | Calder | |
| 2002/0178074 A1* | 11/2002 | Bloom ................... | G06Q 20/00 705/26.81 |
| 2004/0210515 A1 | 10/2004 | Hughes | |
| 2005/0040005 A1 | 2/2005 | Dobbins | |
| 2005/0066179 A1 | 3/2005 | Seidlein | |
| 2006/0196926 A1 | 9/2006 | Benson | |
| 2008/0223930 A1 | 9/2008 | Rolland et al. | |
| 2009/0006249 A1 | 1/2009 | Morgan et al. | |
| 2009/0222381 A1 | 9/2009 | Purches et al. | |
| 2009/0309694 A1 | 12/2009 | Nichols et al. | |
| 2013/0082822 A1 | 4/2013 | Levenick et al. | |
| 2014/0014719 A1 | 1/2014 | Douglass et al. | |
| 2014/0107836 A1 | 4/2014 | Crews et al. | |
| 2015/0154551 A1* | 6/2015 | Skaaksrud ............. | H04L 43/10 705/333 |
| 2015/0221160 A1 | 8/2015 | Graef et al. | |
| 2016/0125375 A1 | 5/2016 | Magee et al. | |
| 2017/0058590 A1 | 3/2017 | Carullo et al. | |
| 2017/0098134 A1 | 4/2017 | Jones | |
| 2017/0101807 A1 | 4/2017 | Huang | |
| 2017/0236101 A1 | 8/2017 | Irudayam et al. | |
| 2017/0255227 A1 | 9/2017 | Birgeoglu et al. | |
| 2018/0293649 A1 | 10/2018 | Morgan et al. | |

FOREIGN PATENT DOCUMENTS

| | | | | |
|---|---|---|---|---|
| GB | 2353068 A | * | 2/2001 | ........... A47G 29/141 |
| GB | 2549465 A | * | 10/2017 | ............. A47G 29/14 |
| RU | 2308087 C2 | | 10/2007 | |
| SG | 189559 A1 | | 5/2013 | |

OTHER PUBLICATIONS

The above U.S. Publication # 2 and all foreign patent documents #1-3 were cited in an Aug. 18, 2022 European Application Search Report—EP 22170588.2.
The above U.S. Publications # 4-8 were cited in an Aug. 16, 2022 European Search Report—EP 22170599.9.
The above U.S. Publications # 1, 5-9 and 10 were cited in an Aug. 17, 2022 European Search Report—EP 22170605.4.
The above U.S. Publications #1,3, 5-9, and 11-12 was cited in an Aug. 30, 2022 European Search Report—EP 20863068.1.

* cited by examiner

FIGURE 14A
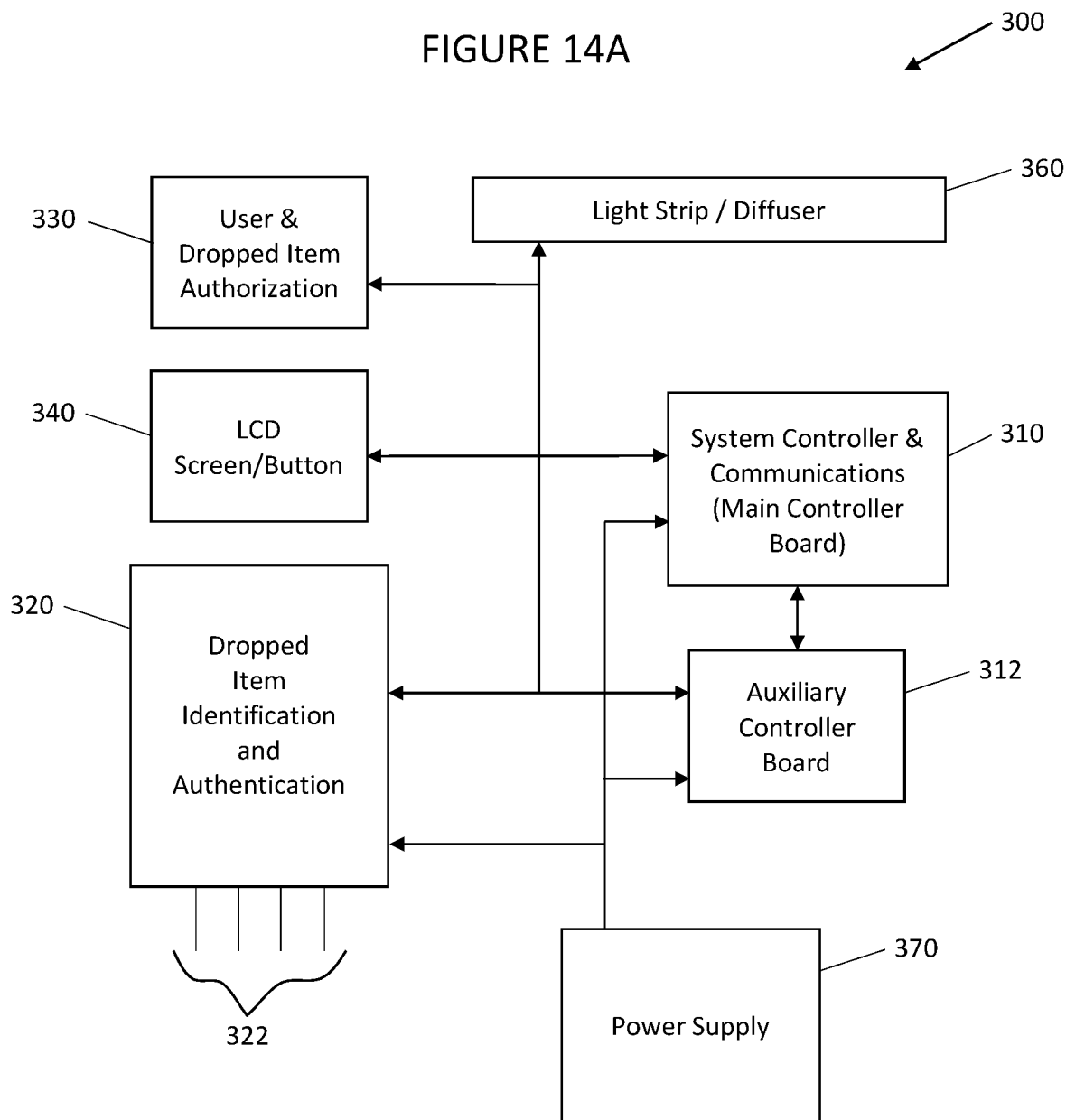
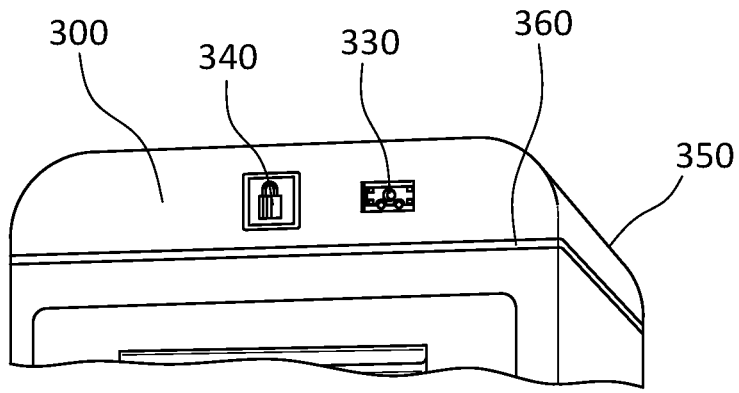
FIGURE 14B

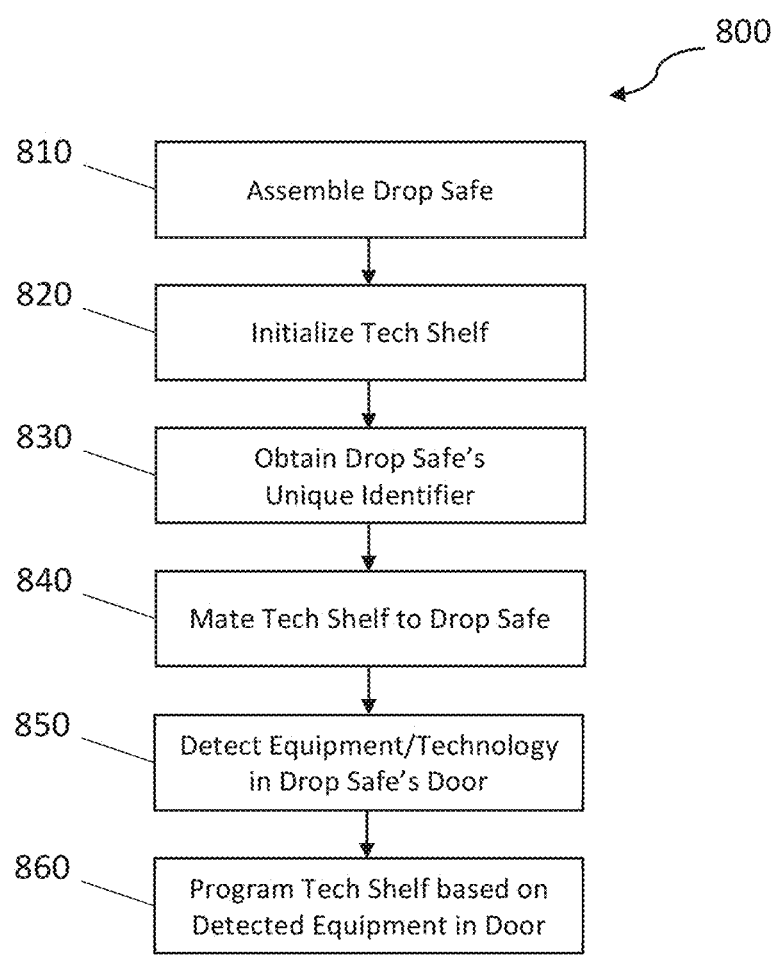

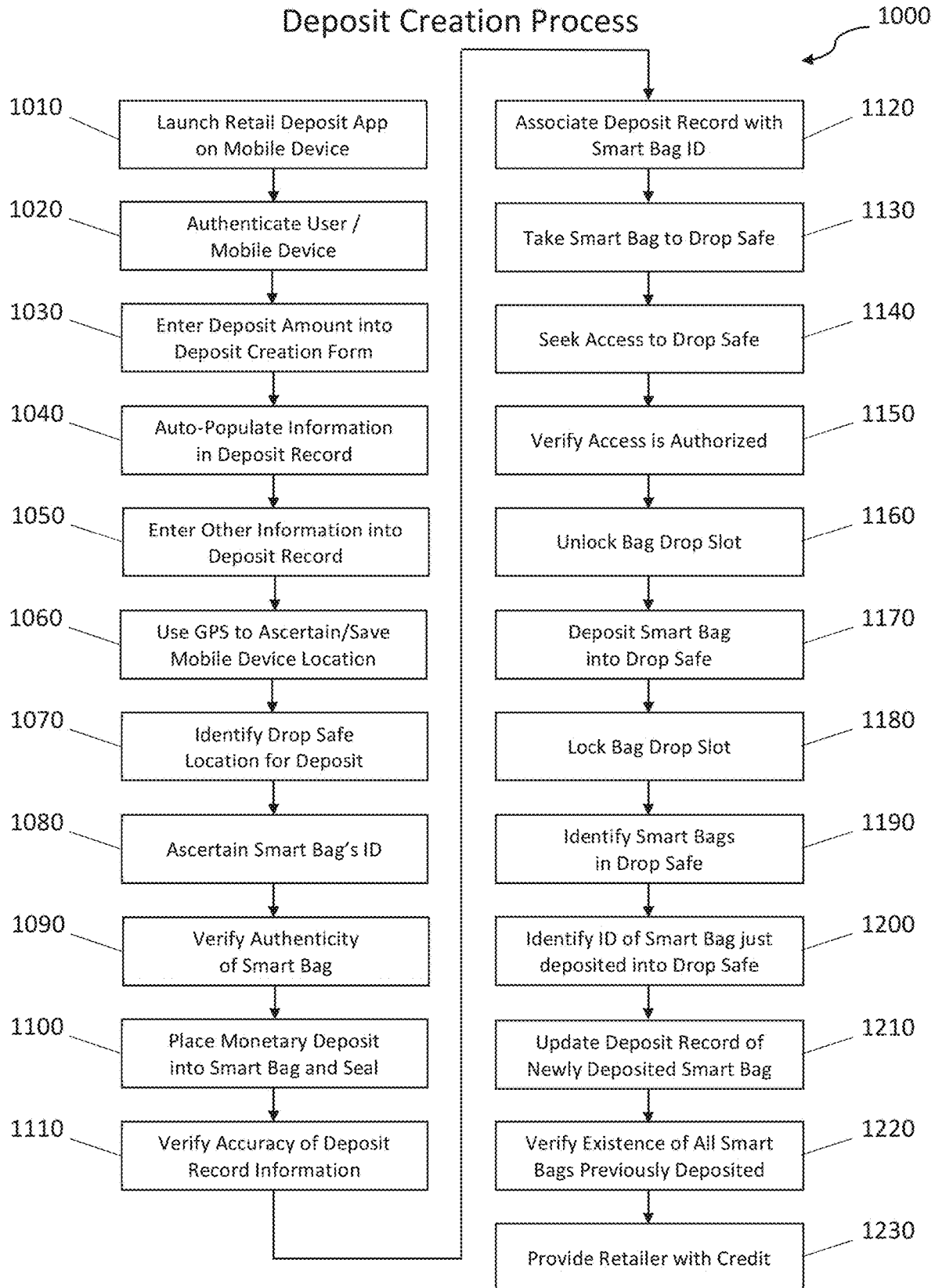

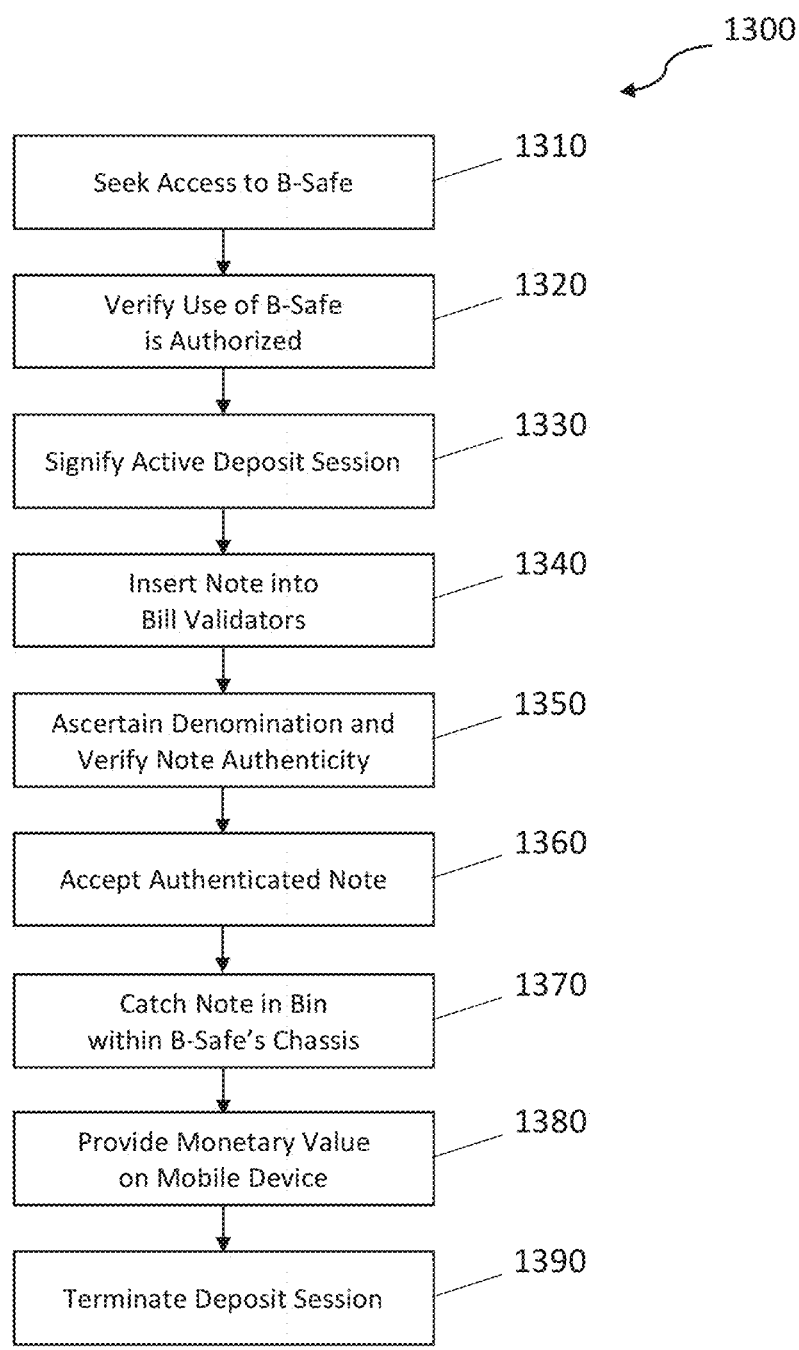

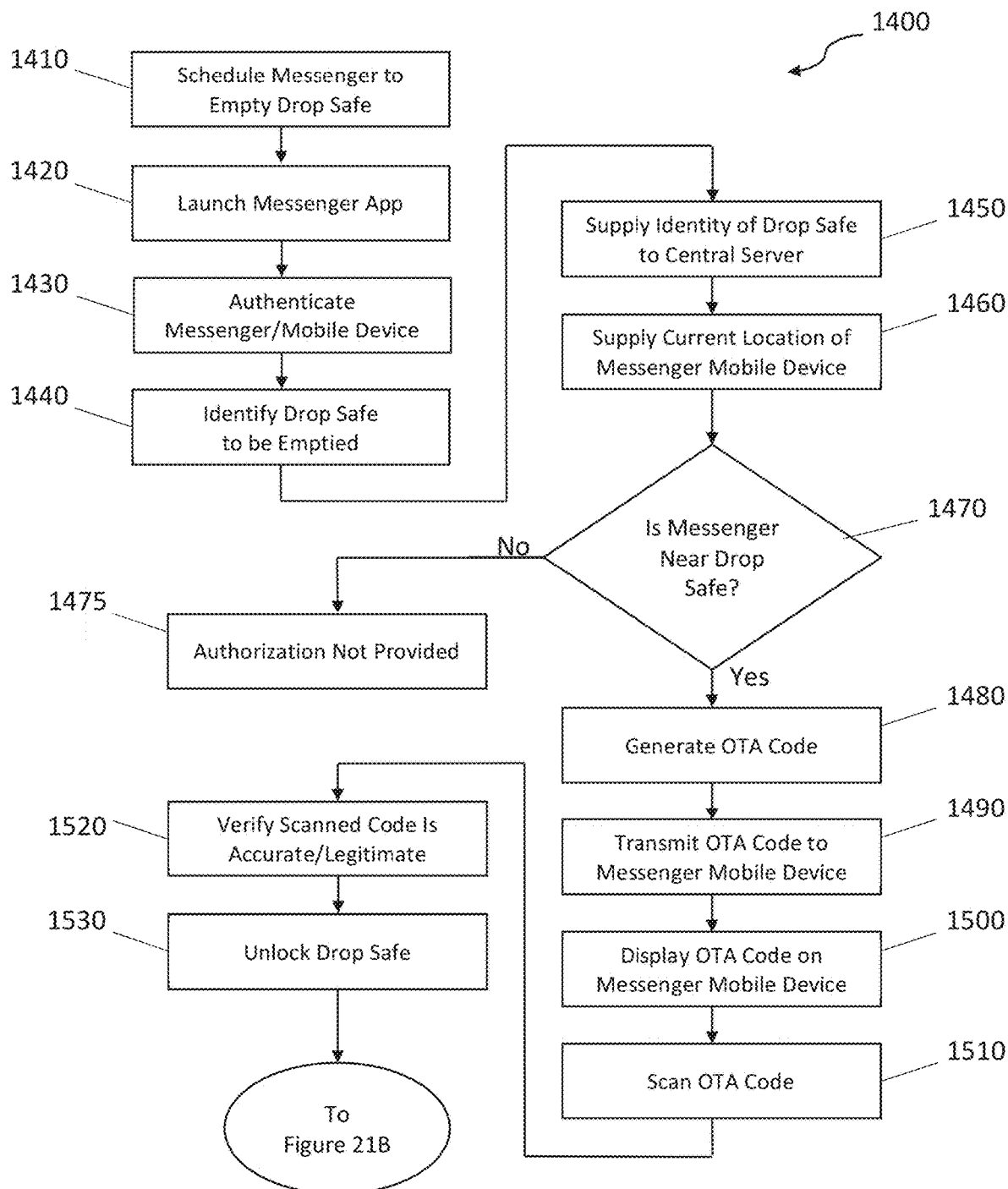

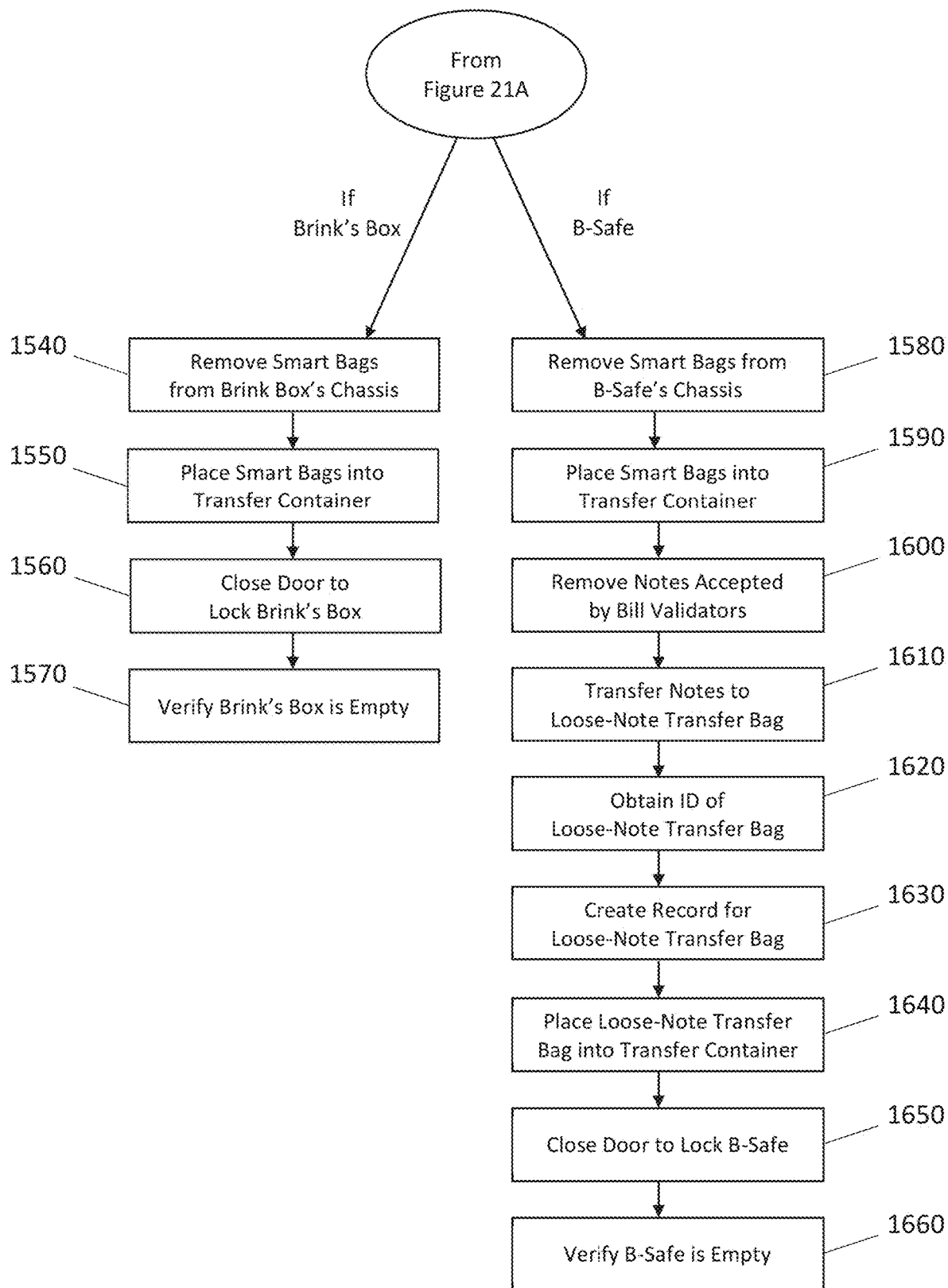

SELF-SERVICE MODULAR DROP SAFES WITH MESSENGER ACCESS CAPABILITY

REFERENCE TO RELATED APPLICATION

This is a divisional of U.S. application Ser. No. 17/003,120, filed Aug. 26, 2020, now U.S. Pat. No. 11,164,412, which claims priority to U.S. Provisional Patent Application No. 62/898,868, filed Sep. 11, 2019, both of which are incorporated herein in their entirety by reference.

FIELD OF THE INVENTION

Cash handling can be a slow, manual process that consumes valuable time, money and resources. It can also be a security risk to employees and places of business.

The present invention is directed to novel modular money smart management devices. For convenience, such modular money smart management devices are herein called modular drop safes.

More particularly, the present invention is directed to novel modular drop safes and novel systems/processes that enable retailers to make cash deposits quickly and safely within or near their own facilities. The present invention further is directed to novel systems/processes for withdrawing the contents of the drop safes, novel systems/methods for replacing the modular components of the drop safes, and novel systems/methods for converting one type of drop safe into another type with different and/or expanded capability. The present invention is particularly directed to self-service modular drop safes with these features designed to be placed within retailer facilities that enable retailers to utilize their own mobile devices or employee badges to make cash deposits into the drop safes that track the location of the deposits and facilitate credit to the retailer for those deposits.

OBJECTS AND SUMMARY OF THE INVENTION

With hardware engineered for efficiency, the drop safes of the present invention provide a more intuitive experience for all users. By securing in-store deposits in a fast and simplified way, the drop safes empower teams to spend less time on hardware training and more time on essential business activities.

The incorporation of deposit identification methodologies works seamlessly with Brink's software applications to accept physical cash deposits without the need for an on-device display. Users can generate, scan and drop deposits conveniently from within the store.

Once deposits are made into the inventive drops safes, a credit process is initiated and physical cash is protected from loss. Employees who previously drove to the bank to make deposits can now remain safely in the store and focus on customers. Businesses using armored car services no longer need to rely on scheduled pickups. Retailers no longer have responsibility for the cash at the point of deposit, and the cash is collected from the drop safes periodically or when filled to capacity.

The present invention includes several main embodiments: the Brink's Box drop safe (called, for convenience, "the Brink's Box"), the Brink's B-Safe drop safe (called, for convenience, "the B-Safe"), and the Brink's Small Form Factor Cash Recycler drop safe (called, for convenience, "the Recycler Safe"). The names of these embodiments are provided merely for convenience and ease of reference. Variations of these embodiments and other embodiments of the invention also are discussed.

The Brink's Box is a secure cash management device designed to accept cash deposits in sealed bags called Smart Bags herein. Digital deposits are created using Brink's software applications, and deposit bags are scanned and dropped into a Brink's Box to transfer custody from the business to Brink's (or other facilitator). Deposits accepted into the Brink's Box are then transmitted to a central server for validation, then to the retailer's associated bank account. Advance credit accelerates bank deposits.

The B-Safe is a secure cash management device designed to accept individual notes through integrated bill validators as well as Smart Bag deposits. Bill validators eliminate the need for employees to count cash and create deposit bags. This added functionality speeds up the deposit process and enables fast till skims.

The Recycler Safe is a secure cash management device designed to accept and recycle notes via an integrated small form factor cash recycler. The Recycler Safe also accepts Smart Bag deposits. By employing a small form factor cash recycler, the recycler's bill dispenser dispenses notes that have been accepted by the recycler's bill depositor, thus improving productivity and operational efficiency.

After a safe verifies the identity of an employee, which may be achieved in several different ways, employees make deposits by simply inserting notes into the bill validator. By identifying the employee for each deposit, user access is tightly controlled, and each transaction is registered back to the employee, enabling full tracking of chain of custody. Credit for deposits accepted into the B-Safe, the Brink's Box, the Recycler Safe, or other embodiments described herein is provided to the associated bank account.

These and other features and benefits of the invention are described herein.

To achieve the foregoing the following are brief summaries of some of the various embodiments of the present invention and some of the numerous aspects/features of those embodiments.

In accordance with certain embodiments of the present invention, the inventive modular drop safe comprises three modular components: a chassis, a door and a technology cabinet. The chassis includes a set of walls that define an internal storage space (along with an opening for the door). The door is coupled to the chassis and movable between open and closed positions. The door includes at least a controllable digital lock designed to lock and thus be maintained in a closed and locked position. The door, when unlocked, can be opened. The door also includes a lockable bag drop slot designed to be controllably unlocked to allow a bag (e.g., a deposit bag containing something of value) to be placed within the bag drop slot and to cause the bag within the bag drop slot to fall within the internal storage space of the chassis. The technology cabinet is to the exterior of the chassis and has various technology including at least one (or more) processor adapted/designed/programmed to provide control data to the digital lock and the lockable bag drop slot on the door so as to control those functional devices in the door. The door may include other functional equipment, such as a bill validator and/or a small form factor cash recycler, or other equipment for use by the retailer. In addition, the technology cabinet includes a reader designed/adapted/programmed to identify bags (e.g., deposit bags) placed within the internal storage space of the chassis and provides user identification and authentication in all communications.

As an aspect of these embodiments of the present invention, the reader in the technology cabinet is an RFID reader, and the chassis includes, placed within its internal storage space, at least one RFID antenna. Also, a set of cables extend between the RFID reader within the technology cabinet and the RFID antenna(s) within the chassis. The RFID reader is designed/adapted/programmed to use the RFID antenna to detect the IDs of RFID tags within bags that are placed within the internal storage space of the chassis.

As a further aspect of the invention, the inner portion of the chassis includes electronic devices that consists only of the RFID antenna(s), cables, and the RFID tags of any bags that are placed within the internal storage space of the chassis.

As another aspect of the invention, the technology cabinet includes a reader adapted/designed to detect a unique ID of some sort (externally provided), and the processor within the technology cabinet controls the bag drop slot to unlock when the reader detects the unique ID of a deposit bag that includes at least one item of value to be deposited within the modular drop safe.

As an additional aspect of the invention, the unique ID is a barcode or a QR-code placed on the exterior of the deposit bag, and the code represents the ID of the deposit bag.

As yet a further aspect of the invention, the reader within the technology shelf is an RFID reader that reads the ID of an RFID tag within a deposit bag to be deposited, and the bag drop slot is opened upon reading that ID.

As yet another aspect of the invention, the technology cabinet includes a reader for detect a unique ID that represents an identity of the person seeking access to the bag drop slot of the drop safe. The technology cabinet controls the bag drop slot to unlock when the reader detects the unique ID of a person who is deemed to be authorized to access the bag drop slot. The unique ID can be a code (e.g., barcode or QR-code) displayed on the person's badge or the ID of an RFID tag within the badge (or using other type of communication with the badge).

As still yet a further aspect, the technology cabinet includes short-range communication equipment adapted to receive a request from a mobile device of the person seeking access to the bag drop slot of the drop safe, and to receive from the mobile device data identifying the current location of the mobile device. The technology cabinet is adapted to control the bag drop slot on the door to unlock if it is ascertained that the person associated with the mobile device seeking access to the bag drop slot of the drop safe is authorized to access the bag drop slot and the mobile device is within a predetermined distance from the drop safe's location.

As still yet another aspect, the technology cabinet includes a housing along with RF communication equipment placed within that housing, and the housing is made of a material(s) that permits the pass-through of RF signals to and from the RF communication equipment external to the technology cabinet.

As another aspect of the present invention, the drop safe can be converted into a drop safe having different functionality. In particular, the door is a first modular door, and the modular drop safe is configured to allow the first modular door to be replaceable with a second modular door without moving the modular drop safe from its current position. The second modular door includes a controllable digital lock and a lockable bag drop slot that are the same as the controllable digital lock and the lockable bag drop slot of the first modular door, and the second modular door further includes at least one bill validator. As a further aspect of the invention, the drop safe can be converted into a recycler safe that includes a small form factor cash recycler. The drop safe can be converted into other types of safes having yet different functionality.

As an additional aspect of the invention, the door includes a pair of bill validators and the chassis includes a bin placed below the bill validators to catch notes that pass through those bill validators.

As yet a further aspect of the invention, neither of the bill validators includes or utilizes a cartridge designed to hold a preset number of notes that have passed through one of the bill validators.

As yet another aspect of the invention, the technology cabinet is fully removable from the chassis without any need to open the door or to access the internal storage space of the chassis.

As yet an additional aspect of the invention, the technology cabinet is removably coupled to the top of the chassis via at least one mounting rail. The mounting rail (or rails) is adapted/designed to allow the technology cabinet, when not fixed to the chassis, to be slidable relative to a position of the chassis, and adapted/designed to allow the technology cabinet to be fully removable from the mounting rail when the mounting rail is at or near its fully extended length.

As a further aspect, the technology cabinet includes memory having a program stored therein that, when executed, causes at least the processor to perform an auto-detect process, which comprises the following the following steps/activities/functions: communicating with each functional device placed within the door to ascertain identities of all functional devices within the door, communicating with a central server, via communication equipment within the technology cabinet, the ascertained identities of all the functional devices within the door, and receiving from the central server, via the communication equipment within the technology cabinet, program code adapted to enable the technology cabinet to control each functional device within the door.

As a specific feature of this aspect, the technology cabinet is pre-programmed, prior to assembly within the modular drop safe, to execute the auto-detect process upon an initial installation within the modular drop safe. Hence, after assembly of the drop safe and upon its initialization, the auto-detect process is carried accordingly.

As another feature of this aspect, the modular drop safe can be modified by replacing its current door with a new door, and then the technology cabinet is designed/adapted/programmed to execute the auto-detect process after the door is replaced with the new door. Accordingly, the technology cabinet ascertains the identities of all functional devices within the new door and communicates that information to the central server. The technology cabinet then receives program code that enables it to control each functional device within the new door. The new door includes a controllable digital lock and at least one additional functional device (e.g., the new door may be that of a Brink's Box, B-Safe, Recycler or other type of drop safe mentioned herein).

As a further aspect of the invention, the technology cabinet includes GPS functionality to ascertain its own location, and communication equipment adapted/programmed to transmit the ascertained location of the technology cabinet to a central server in order to provide the current location of the modular drop safe (e.g., to be included in its database and for use in created deposit records).

As another aspect of the invention, the technology cabinet includes short-range communication equipment adapted to communicate with a mobile device of the person authorized to make a deposit into the drop safe and to receive data from and to transmit data to that mobile device pertaining to a deposit to be made or that has been made into the drop safe. In a particular embodiment of the present invention, the data is transmitted to the mobile device for the purpose of the mobile device subsequently transmitting the data to the central processor for further handling, such as to create a deposit record corresponding to the transmitted data (and possibly for providing a credit to the retailer). In this "disconnected" embodiment, the drop safe has no capability to communicate with the central server via an RF communication protocol, that is, via Wi-Fi, cellular (e.g., LTE/4G) or other mid or long-range communication technique.

Various other aspects and features associated with the apparatus/system embodiments of the present invention are provided in the detailed description section below. Other apparatus/system embodiments also are further discussed and the foregoing should not be construed to represent the only apparatus/system embodiments of the invention.

In accordance with certain method/process embodiments of the present invention, in summary form, the present invention entails creating a deposit into a drop safe placed at or near a retailer location by the following steps. Receiving, by the central server, deposit information from a mobile device, the deposit information including at least an identity of a thing of value to be deposited into the drop safe. Receiving, by the central server, an ID of a deposit bag that includes the thing of value to be deposited. Creating, by the central server, a deposit record associated with the ID of the deposit bag and that includes data pertaining to the deposit information received from the mobile device. Receiving, by the drop safe, either the identity of the person to deposit the deposit bag into the drop safe or the ID of the deposit bag. Unlocking, by the drop safe, the bag drop slot based on the received identity of the person or the received ID of the deposit bag. Receiving, by the drop safe, the deposit bag. Verifying, by the drop safe, that the deposit bag is within an internal storage space of the drop safe after receiving the deposit bag. Communicating, by the drop safe to the central server, upon verifying, that the deposit bag is within the internal storage space of the drop safe.

As an aspect of these embodiments, the thing of value is an amount of money, and the method further comprises arranging, by the central server, to provide a monetary credit to the retailer in accordance with the amount of money in the deposit bag based on the deposit information in the deposit record that was received from the mobile device.

As an aspect of these embodiments, the drop safe receives the identity of the person by scanning a code on the person's badge (or other thing he/she is carrying) in which the code represents the identity of the person. The method further comprises transmitting, by the drop safe, the scanned code to the central server, ascertaining, by the central server, the identity of the person based on the transmitted scanned code, and ascertaining, by the central server, if the identified person is authorized to use the drop safe and, if so, transmitting an unlock instruction to the drop safe. Unlocking, by the drop safe, of the bag drop slot comprises unlocking the bag drop slot upon receipt of the unlock instruction from the central server.

As a further aspect of these embodiments, the method further comprising receiving, by the central server from the mobile device, a request to access the bag drop slot of the drop safe, ascertaining, by the central server, the identity of the person based on one or more communications from the mobile device, receiving, by the central server from the mobile device, data identifying a current location of the mobile device, determining, by the central server, whether the current location of the mobile device is within a predetermined distance of a location of the drop safe, ascertaining, by the central server, if the identified person is authorized to access the bag drop slot based on at least the ascertained identity of the person and whether the current location of the mobile device is within the predetermined distance of the location of the drop safe, and, if so, transmitting an unlock instruction to the drop safe. Unlocking, by the drop safe, of the bag drop slot is carried out upon receipt of the unlock instruction from the central server.

As another aspect, the deposit bags within the internal storage space of the drop safe are imaged, and the ID of each of the deposit bags is identified from the imaging.

As an additional aspect, the ID of each RFID tag within the internal storage space of the drop safe is obtained, and ID of the deposit bag that is associated with the created deposit record is identified from those obtained IDs.

As a further aspect, the ID of each RFID tag within the internal storage space of the drop safe is carried out by an RFID reader that is placed outside the internal storage space of the drop safe, in communication with at least one RFID antenna that is placed within the internal storage space of the drop safe.

As a yet another aspect, multiple deposit bags are received by the drop safe, each including a respective RFID tag, and the IDs of all the RFID tags are read via the RFID reader.

As a feature of this aspect, the method further comprises ascertaining if a deposit bag dropped within the drop safe is removed from the drop safe based on data regarding the identified IDs obtained during a series of identifications over time of the IDs of the RFID tags within the drop safe.

As an additional aspect, wherein the thing of value is an amount of money, and the method further comprises creating, by the central server, a respective deposit record that corresponds to each of the plurality of deposit bags, and arranging, by the central server, to provide a monetary credit to the retailer in accordance with a total amount of money in the plurality of deposit bags received by the drop safe based on the created deposit records.

As yet another embodiment, the method comprises receiving, by the central server from the mobile device, an identity of the mobile device, and verifying the identity of the mobile device corresponds to an authorized employee of the retailer associated with the drop safe.

As yet a further embodiment, the method further comprises receiving, by the central server from the mobile device, data identifying the current location of the mobile device, identifying the drop safe associated with the current location of the mobile device, and associating data received from the mobile device with the identified drop safe.

As yet an additional embodiment, the method comprises including the identified current location of the mobile device within the created deposit record.

As a further aspect, the method further comprises identifying the drop safe nearest to the current location of the mobile device, and communicating data to the mobile device regarding the identified drop safe nearest to the current location of the mobile device for subsequent conveyance to the user of the mobile device.

As a feature of this aspect, navigation instructions from the current location of the mobile device to the identified drop safe are provided to the mobile device for use by the user of the mobile device.

Various other aspects and features associated with these process/method embodiments of the present invention are provided in the detailed description section below.

In accordance with certain method/process embodiments of the present invention, in summary form, the present invention entails accessing a drop safe placed at or near a retailer location for the purpose of emptying it by a messenger. The method comprises scheduling, by the central server, to arrange a messenger to empty a drop safe placed at or near a retailer location, receiving, by the central server, data from a mobile device of the messenger that includes an identification of the messenger and a current location of the mobile device, verifying, by the central server, that the identified messenger is authorized to empty the drop safe, receiving, by the central server from the mobile device, a code that uniquely identifies the drop safe, identifying, by the central server, an identity of the drop safe based on the received code, ascertaining, by the central server, a location of the identified drop safe, determining, by the central server, whether the current location of the mobile device is within a predetermined distance of the ascertained location of the drop safe, generating, by the central server, a one-time authorization code to open the drop safe if the current location of the mobile device is determined to be within the predetermined distance of the ascertained location of the drop safe, communicating, by the central server, the generated one-time authorization code to the mobile device, receiving, by the drop safe from the mobile device, the one-time authorization code communicated by the central server, determining whether the received one-time authorization code corresponds to the one-time authorization code generated by the central server, and unlocking and opening a door of the drop safe to provide access of the drop safe by the messenger, for subsequent emptying, if it is determined that the received one-time authorization code corresponds to the one-time authorization code generated by the central server.

As an aspect of these embodiments, the code that uniquely identifies the drop safe corresponds to a computer-readable code displayed on the drop safe that is taken by a camera of the mobile device.

As a further aspect, the code that uniquely identifies the drop safe is the ID of an RFID tag associated with the drop safe that is read by a reader on or associated with the mobile device.

As another aspect, the location of the identified drop safe is identified by the drop safe itself (e.g., using its own GPS), which is transmitted to the central server.

As an additional aspect the one-time authorization code is a time-dependent code, and the method further comprises determining, by the central server, whether the received one-time authorization code was received by the drop safe within a preset amount of time of when the one-time authorization code was generated and, if not, the unlocking and opening of the door of the drop safe is inhibited.

As yet a further aspect of the invention, the one-time authorization code generated by the central server is based on multiple data elements including at least data relating to the identified messenger and data representing the identity or location of the drop safe.

As yet another aspect, the one-time authorization code is displayed by the mobile device, which is then scanned using a reader within the drop safe.

As yet a further aspect, the one-time authorization code is wirelessly received from the mobile device via a short-range communication protocol.

As yet an additional aspect, prior to unlocking and opening the door of the drop safe, the ID of the RFID tag of each bag deposited within the drop safe is identified to identify all bags within the drop safe that are to be removed by the messenger upon unlocking and opening the door.

As a feature of this aspect, the number of bags within the drop safe to be removed are transmitted to the mobile device for subsequent instruction to the messenger.

As a further feature, after the door of the drop safe is unlocked and opened to enable access by the messenger, the central server receives from a device operated by the messenger removed bag transmitted data that represents the IDs of all deposit bags that have been removed by the messenger (e.g., the messenger scans each deposit bag as it is being removed from the drop safe or scans at a later time). The central server verifies that the transmitted removed bag data corresponds to the IDs of all the RFID tags that were identified to be within the drop safe prior to the unlocking and opening the door of the drop safe.

As a further aspect, the RFID reader is placed exterior to the internal storage area of the drop safe using at least one RFID antenna placed within the internal storage space of the drop safe.

As another aspect the door is closed and locked, and the ID of an RFID tag of any bag remaining within the drop safe after the door is closed and locked is ascertained to determine whether all bags within the drop safe had been removed prior to the closing of the door. As a feature, if a bag is detected within the drop safe, the messenger is informed.

Additional aspects and features associated with these process/method embodiments of the present invention are provided in the detailed description section below.

In accordance with certain method/process embodiments of the present invention, in summary form, the present invention entails a method of replacing a technology cabinet of a modular drop safe. The method comprises servicing a modular drop safe that includes a modular chassis, a modular door, and a modular technology cabinet, each having certain features. Servicing includes: physically removing the technology cabinet from the chassis, disconnecting the set of cables between the technology cabinet and the door, connecting the set of cables between a new technology cabinet and the door, coupling the new technology cabinet to the chassis, and initializing the new technology cabinet to enable the modular drop safe to function during to provide control data and power to the various functional devices of the drop safe.

As an aspect of these embodiments, the steps employed to replace the technology cabinet are all carried out without the door being moved to its open position and without any need to access the internal storage space of the chassis.

As a further aspect of these embodiments, the drop safe being serviced employs a set of cables that extend from the door from within the internal storage space of the chassis and extend from within the internal storage space via an opening in the chassis to the technology cabinet.

As another aspect of these embodiments, initializing the new technology cabinet comprises ascertaining, by the processor of the technology cabinet, identities of all functional devices within the door, communicating, by the technology cabinet to a remote central server, the ascertained identities of all the functional devices within the door, and receiving, by the technology cabinet from the central server, program code adapted to enable the technology cabinet to control each of the functional devices within the door.

As an additional aspect of these embodiments, the technology cabinet of the drop safe being serviced includes a reader adapted to identify bags placed within the internal storage space of the chassis.

As a feature of this aspect, the reader is an RFID reader and the chassis of the modular drop safe being serviced includes, placed within the internal storage space, at least one RFID antenna coupled to the RFID reader via an antenna cable, the RFID reader and the RFID antenna collectively adapted to ascertain IDs of RFID tags placed within the internal storage space of the chassis. Here, the step of disconnecting further comprises disconnecting the antenna cable between the RFID reader in the technology cabinet and the at least one RFID antenna in the chassis, and the step of connecting further comprises connecting the antenna cable between the RFID reader and the at least one RFID antenna.

As yet a further aspect of the invention, the technology cabinet of the modular drop safe being serviced is coupled to the top of the chassis via at least one slidable mounting rail. During the method, the step of physically removing the technology cabinet from the cabinet entails sliding the technology cabinet, via the slidable mounting rail, from a position fully on the chassis to a position fully off the chassis, and the step of coupling the new technology cabinet to the chassis entails installing the new technology cabinet to the slidable mounting rail and sliding, via the slidable mounting rail, the new technology cabinet to a position fully on the chassis.

Additional aspects and features associated with these process/method embodiments of the present invention are provided in the detailed description section below.

In accordance with certain method/process embodiments of the present invention, in summary form, the present invention entails a method of converting/servicing a modular drop safe by obtaining access to the modular drop safe (the door is unlocked and moved to its open position), disconnecting the set of cables from the door, physically removing the door from the chassis, physically installing a new door onto the chassis, connecting the set of cables to the new door, and re-initializing the technology cabinet to enable the modular drop safe to function to provide control of and power to the functional devices within the new door.

As an aspect of these embodiments, the new door has a different set of functions than the replaced door, and reinitializing entails ascertaining the identities of all the functional devices within the new door, communicating those identities to the remote central server, and receiving by the technology cabinet program code adapted/designed to enable the technology cabinet to control each of the functional devices within the new door.

As a further aspect of these embodiments, the door physically removed from the chassis includes a controllable digital lock and a lockable bag drop slot, and the new door includes a controllable digital lock and at least one bill validator (i.e., a Brink's Box is converted to a B-Safe).

As another aspect of these embodiments, the door physically removed from the chassis includes a controllable digital lock and a lockable bag drop slot, and the new door includes a controllable digital lock and a small form factor cash recycle (i.e., a Brink's Box is converted to a Recycler Safe).

As additional aspects of the present in invention, a drop safe of one type can be converted into a drop safe of another type (i.e., with different functionality) by physically replacing the door as summarized above and then re-initializing the technology cabinet.

In addition to the foregoing, process embodiments that correspond to the foregoing summarized apparatus embodiments are provided and, conversely, apparatus and/or system embodiments that correspond to the foregoing summarized method embodiments are provided. Hence, the above-summarized embodiments, aspects and features are illustrative and non-limiting.

Various other objects, advantages and features of the present invention will become readily apparent to those of ordinary skill in the art from the following detailed description of the invention.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 14A is a block diagram of the technology shelf of the present invention;

FIG. 14B shows an exemplary front exterior of the technology shelf;

FIG. 15 is a flowchart of configuring the tech shelf in accordance with the present invention;

FIG. 19 is a flowchart of the deposit creation process of the present invention;

FIG. 20 is a flowchart of the bill insertion process of the present invention; and FIGS. 21A and 21B collectively show a flowchart of the messenger pickup process of the present invention.

DETAILED DESCRIPTION OF THE PRESENT INVENTION

The present invention entails modular money smart management devices that enable retailers to conveniently and quickly make cash deposits within their own facilities to minimize security risk, time and resources. Retailers use their own mobile devices (e.g., smart phones, tablets, etc.) to facilitate a cash deposit within the modular devices of the present invention and receive real-time information about those deposits on those same mobile devices. Withdrawal of the contents are carried out by messengers utilizing their own mobile smart phones or other smart hand-held device. The present invention further entails various novel processes for making deposits, novel processes for removing deposited contents, novel processes for replacing modular components within the devices, and novel processes for converting those devices for expanded, enhanced or otherwise modified capability.

The modular money smart management devices, in many of the embodiments described herein, are modular drop safes. However, some embodiments (or variations of other embodiments) may not employ a drop slot. For convenience, each of the embodiments described herein (and their variations) are referred to herein as a "drop safe." Accordingly, the term "drop safe" as used herein includes safes that include a drop slot that accepts the Smart Bag of the present invention or other type of bag, envelope or receptacle containing something of value, and also includes safes that may not include a drop slot but otherwise accept a note or other thing of value (e.g., via a bill validator).

The drop safes of the present invention, with their modular design, are quickly configurable, serviceable, upgradeable, and designed to allow for upgrading to include future-developed functionality/capabilities. As will be described, and as one example of the drop safes' upgradeable capability, a Brink's Box (i.e., a drop safe without bill validators) is modifiable on site to be converted/upgraded into a B-Safe (i.e., a drop safe that includes bill validators).

Figure 1:
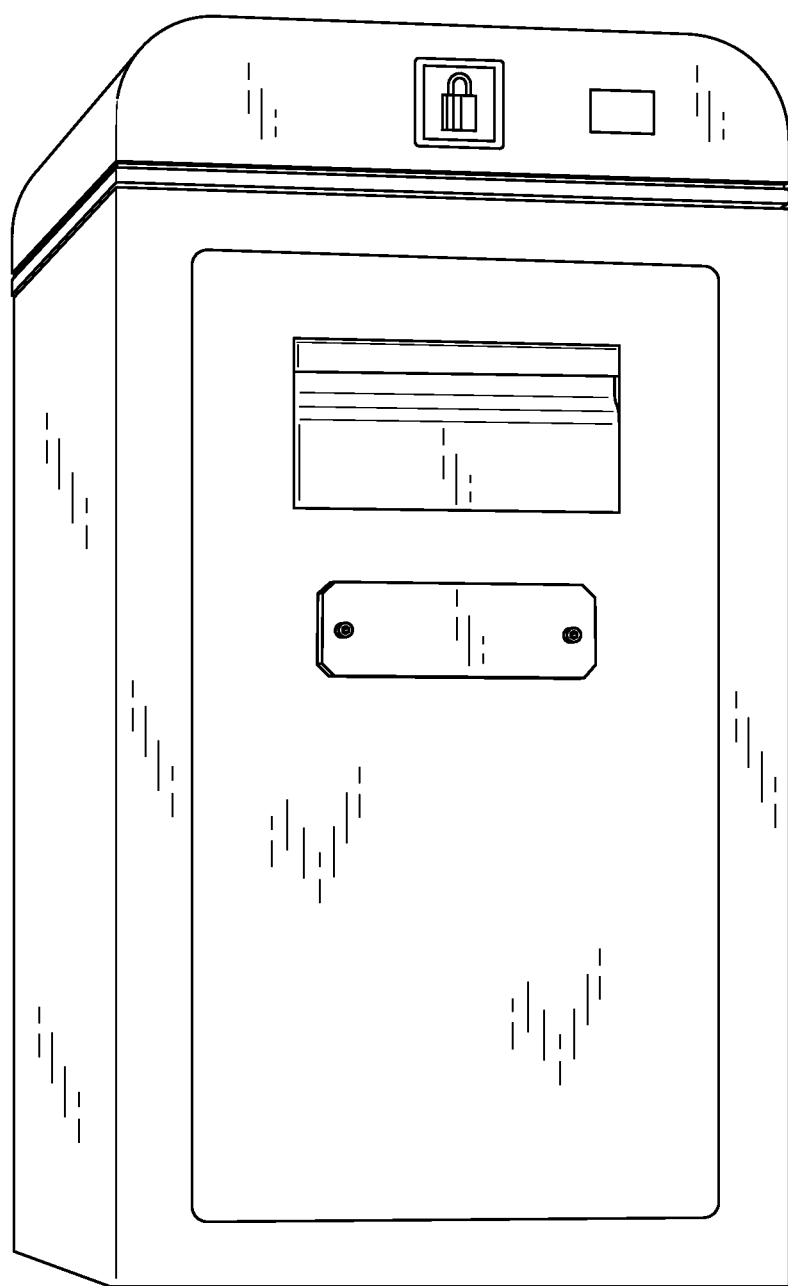
FIG. 1 shows an exemplary of the Brink's Box present invention.
Figure 2:
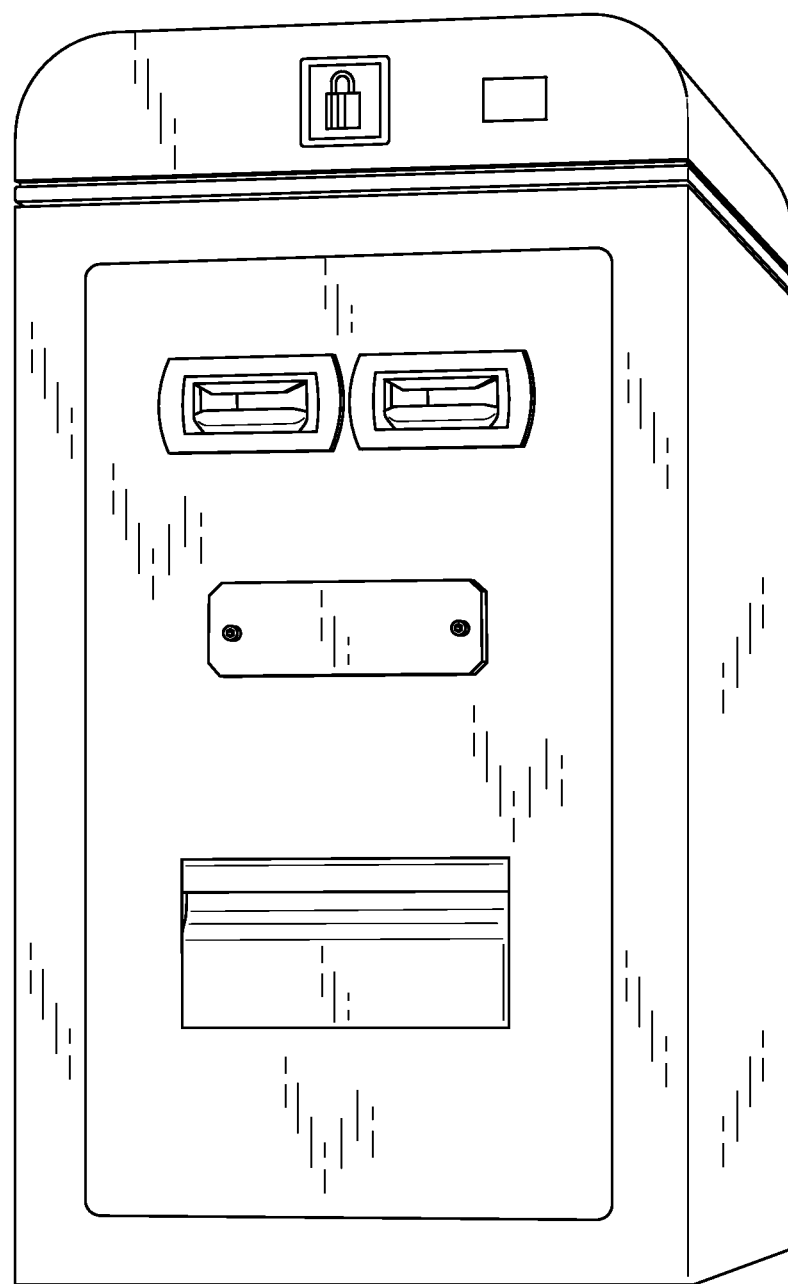
FIG. 2 shows an exemplary of the B-Safe present invention.

The drop safe in accordance with one embodiment of the present invention is called, for convenience herein, a "Brink's Box" (as mentioned above). An exemplary Brink's Box is shown in FIG. 1 of the drawings. A drop safe in accordance with another embodiment of the present invention is called, for convenience, a "B-Safe" (also as mentioned above). An exemplary B-Safe is shown in FIG. 2 of the drawings. As will be discussed, the primary difference between the Brink's Box and the B-Safe is that the B-Safe includes currency acceptance, identification and authenticity verification equipment. Such equipment/technology is capable of accepting a note, recognizing its denomination, verifying its authenticity, and dispensing the note (within the safe). As understood within the art, bill validators serve this functionality and thus may be employed within the various embodiments, as appropriate, of the present invention. The operations of both the Brink's Box and B-Safe are further described below.

The drop safe in accordance with a further embodiment of the present invention is called, for convenience here, a "Recycler Safe" (as mentioned above). As will be described, the Recycler Safe includes equipment/technology that both accepts and dispenses notes in a controlled manner. A small form factor cash recycler carries out such functionality and may be employed.

In accordance with yet other embodiments of the present invention, the B-Safe and the Recycler Safe may be modified to omit a drop slot (and thus do not accept a dropped Smart Bag or other dropped bag, envelope, or receptacle containing something of value). These and other embodiments are further discussed below.

In addition to the function, operation, and benefits of the Brink's Box, the B-Safe, the Recycler Safe and other embodiments/variations described herein, including the novel techniques for emptying these devices, a beneficial feature of the present invention is the ease in which one type of drop safe of the present invention, which is already installed and operating at a retailer location, is easily converted into another type of drop safe of the present invention. Other features and benefits of the present invention are discussed.

Brink's Box: Brief Hardware Overview

Figure 3:
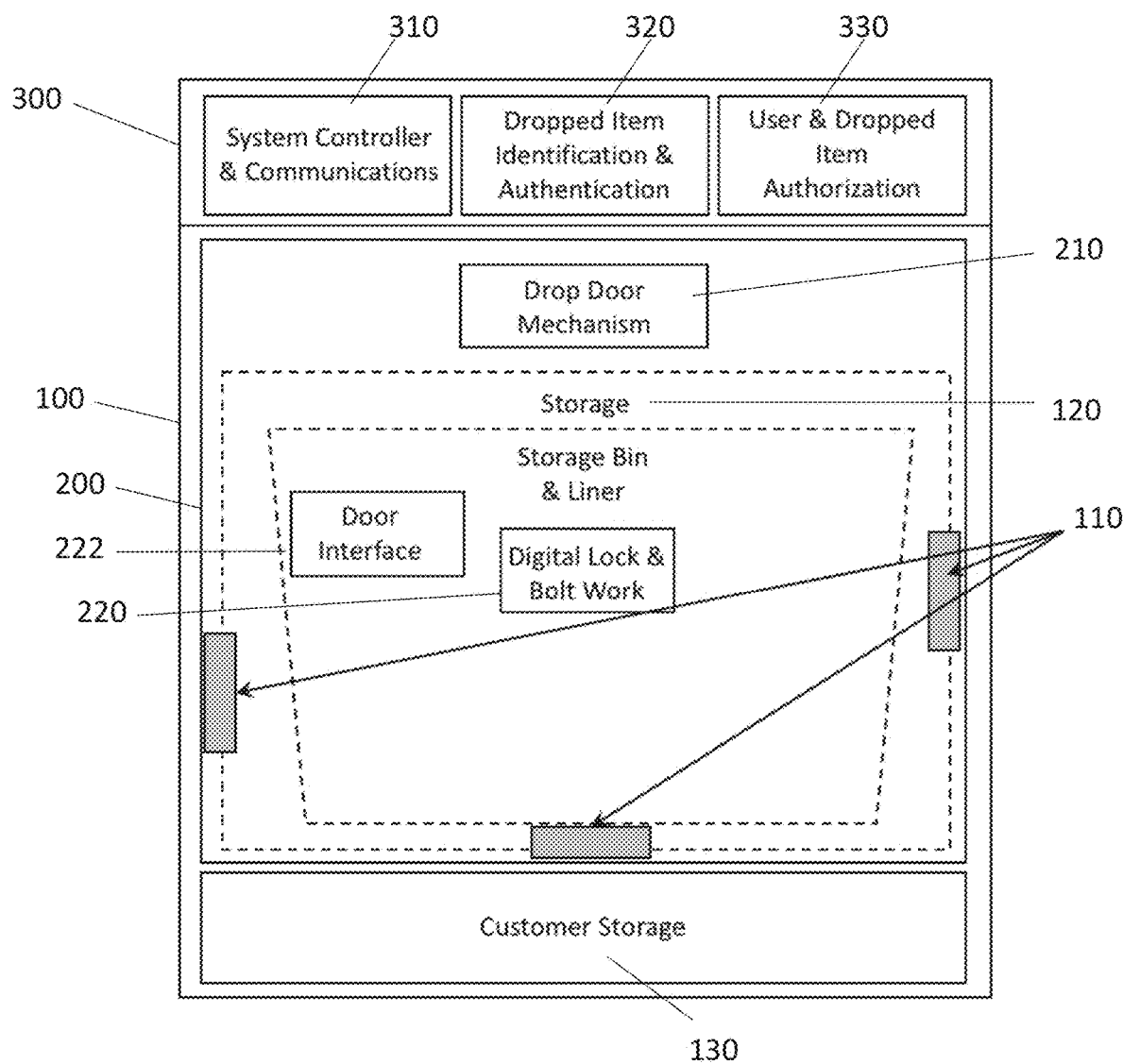
FIG. 3 is a schematic illustration of the Brink's Box.

FIG. 3 shows a schematic illustration of a Brink's Box 10 in accordance with the present invention. Brink's Box 10 includes three main components: a chassis 100, a door 200, and a technology cabinet 300.

Chassis 100 is designed to securely hold deposited bags of money (or other things of value) and may be manufactured from any suitably strong, industry-acceptable material. Chassis 100 includes dropped item setting technology 110 designed to identify individual bags that have been dropped within the chassis. In one embodiment, the chassis includes a set of RFID antennae 110 (to be described). In another embodiment, optical recognition technology 110 is employed. Other technology to identify each individual dropped bag may be used.

Chassis 100 includes an inner volume (storage 120) that serves as a storage compartment sufficient to hold a certain number of dropped bags. The number of dropped bags that a drop safe can hold generally will be based on the needs of the end-user. Exemplary numbers of dropped bags that can be held, which usually are based on the size of the chassis, include 25, 30, 35, 50 80, 110, 150, etc. An optional customer storage compartment 130 also may be provided.

The door 200 of the Brink's Box engages with chassis 100 and includes a lockable bag drop slot/mechanism (drop door mechanism 210) to enable the dropping within the safe of deposit bags (also called Smart Bags herein) that contain cash, coin and/or other items of value. Door 200 is tailored for use with Brink's Box 10 and doesn't includes any bill validators. Door 200 also includes a digital lock and associated bolt work 220 that can be opened only by an authorized messenger employing the cash removal process described herein. The electronics of door 200 are controlled via cabling (via door interface 222) from the Brink's Box's technology cabinet 300.

Technology cabinet 300 is coupled to the top of chassis 100 and includes the bulk of the processing and communications of the Brink's Box 10. Technology cabinet 300 is also referred to herein, for convenience, as the technology shelf, or more simply, the "tech shelf" Tech shelf 300 includes system controller and communications 310, dropped item identification and authentication 320, and user and dropped item authorization 330. Exemplary structural components that correspond to these modules include a main controller board, an RFID reader, a barcode/QR-code scanner/reader, to be discussed. In other embodiments/variations, other technology is employed to perform dropped item identification and authentication, as well as user and dropped item authorization, to be discussed.

B-Safe: Brief Hardware Overview

Figure 4:
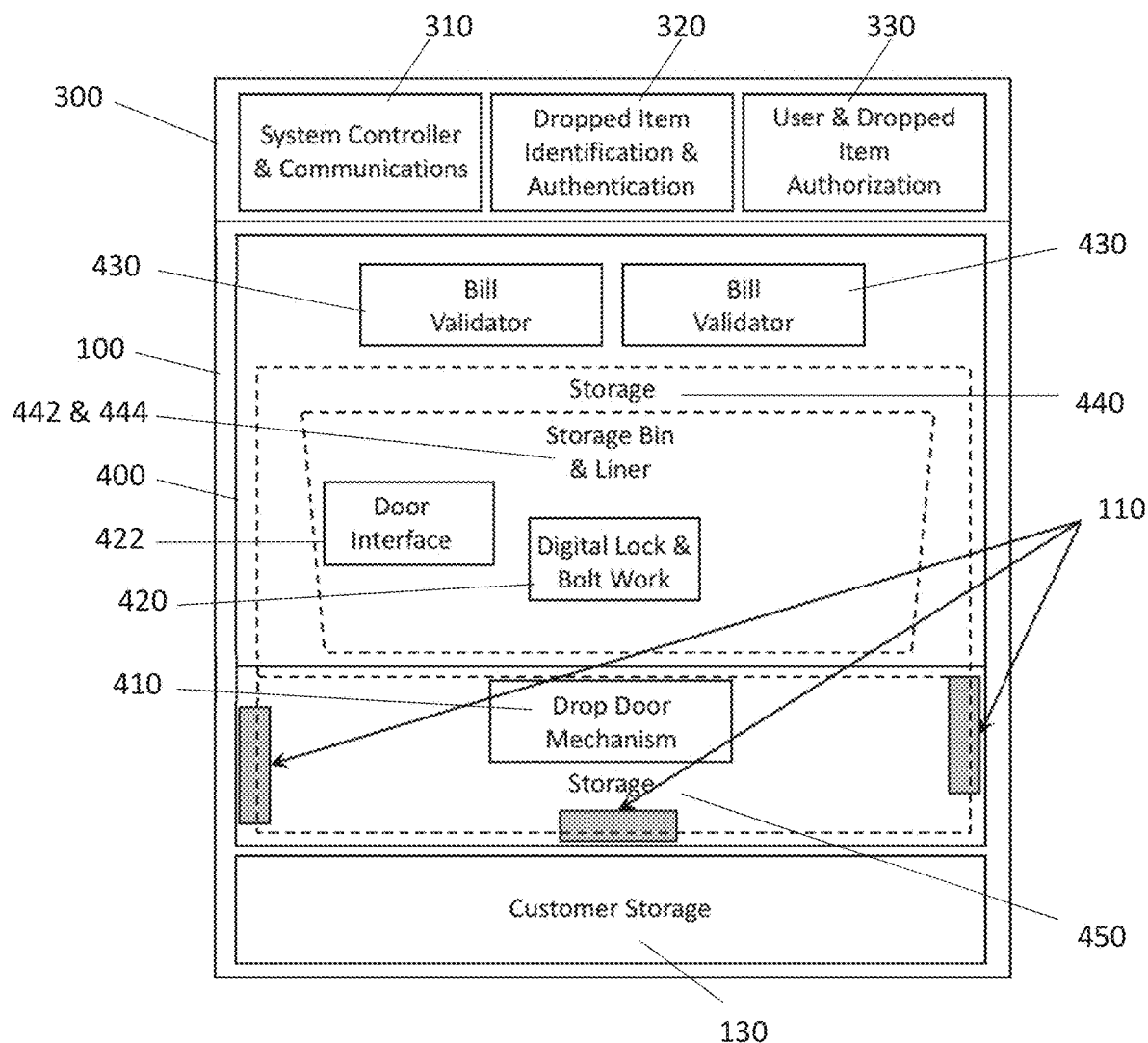
FIG. 4 is a schematic illustration of the B-Safe.

The B-Safe 20 is schematically shown in FIG. 4. B-Safe 20 is similar to Brink's Box 10 and includes the three main components of a chassis, door, and tech shelf. The B-Safe's chassis is identical to the Brink's Box's chassis 100. The B-Safe's tech shelf is identical (at least hardware-wise) to the Brink's Box's tech shelf 300, but the tech shelf of the B-Safe controls its door differently than how the Brink's Box's tech shelf 300 controls its door. The control/function/operation of the tech shelf (for each embodiment) is discussed in detail in the Detailed Discussion section provided below.

B-Safe 20 employs a different door than the door of the Brink's Box. In particular, B-Safe 20 includes a door 400 that includes the capability to accept a note, recognize its denomination, verify its authenticity, and dispense the note (within the safe's chassis). In the exemplary embodiment illustrated in FIG. 4, a pair of bill validators 430 carry out these functions. Accordingly, retailers are able to deposit single cash notes (i.e., bills) in the B-Safe of the present invention. The received notes are stored within a storage space 440 (within the chassis of B-Safe 20). Door 400 also contains a bag drop slot (drop door mechanism) 410 and a digital lock/locking mechanism (digital lock and bolt work) 420 similar to those in the Brink Box's door 200. Also, like the Brink's Box, the electronics of door 400 (i.e., the bill validators, the digital lock/bolt work, and bag drop slot) are controlled and communicated with via cabling (via door interface 422) from the technology cabinet 300.

In the B-Safe embodiment, storage space 450 within the chassis holds the dropped bags. Also, the B-Safe's chassis may include a storage bin 442 and a liner 444 (for that bin) to capture the notes that have been accepted by the bill validators. The inventive features of B-Safe 20 are further described.

Recycler Safe: Brief Hardware Overview

Figure 4A:
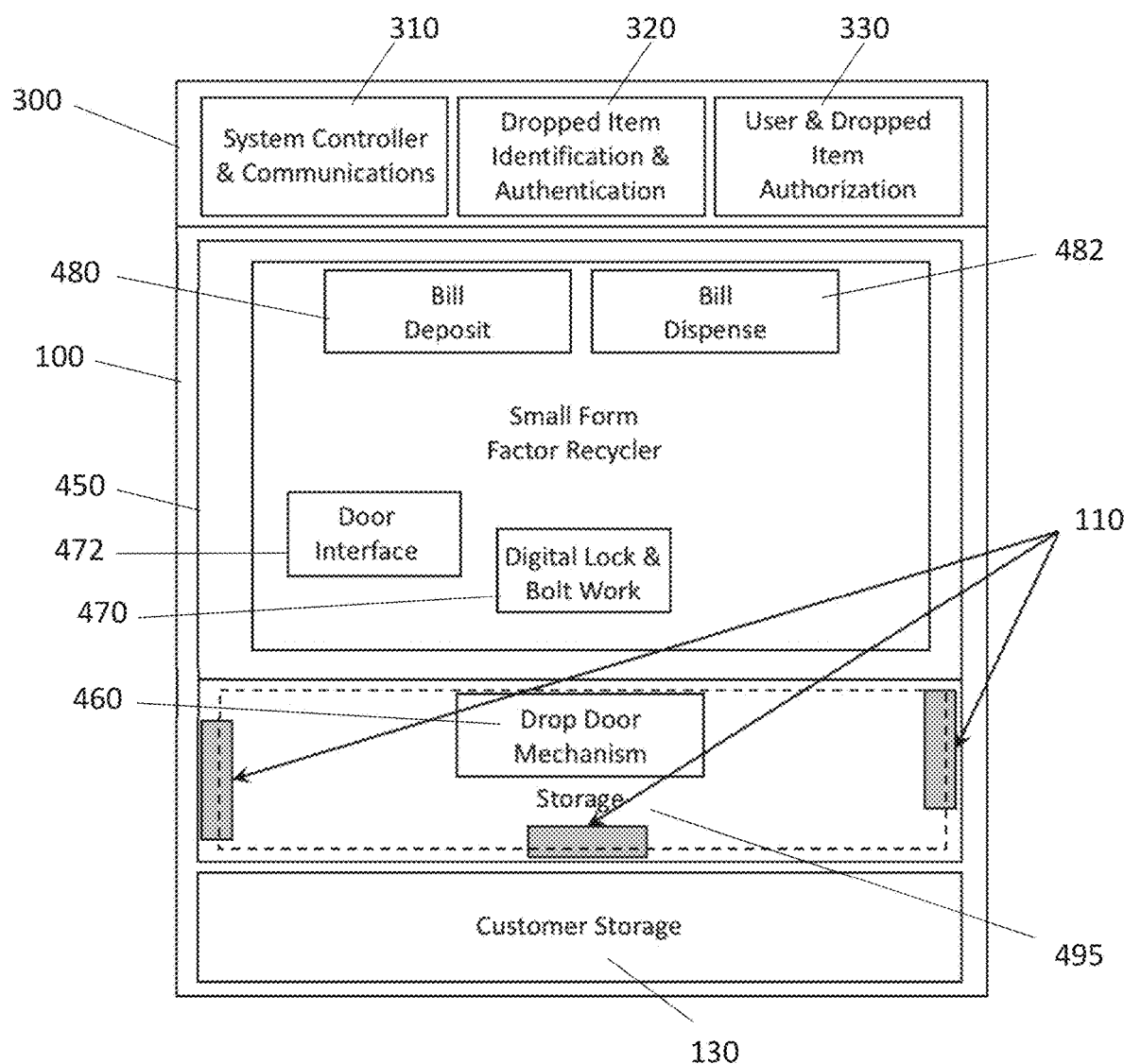
FIG. 4A is a schematic illustration of the Recycler Safe.

The Recycler Safe 30 is schematically shown in FIG. 4A. Recycler Safe 30 is similar to the Brink's Box 10 and the B-Safe 20 in that it also includes the three main components of a chassis, door, and tech shelf. The Recycler Safe's chassis is identical to the chasses of the other drop safes. The Recycler Safe's tech shelf also is structurally identical to the other drop safes. However, the tech shelf of the Recycler Safe controls its door differently in that it further controls the function/operation of the small form factor cash recycler included within the Recycler Safe's door.

The Recycler Safe's door 450 includes a bag drop slot (drop door mechanism) 460 and a digital lock/locking mechanism (digital lock and bolt work) 470, like those in the Brink Box and B-Safe. Storage space 495 within the chassis holds the dropped bags.

The Recycler Safe's door 450 further includes a small form factor cash recycler (bill depositor 480 and bill dispenser 482) to recycle notes as needed.

The electronics of door 450 (i.e., the small form factor cash recycler, the digital lock/bolt work, and bag drop slot) are controlled and communicated with via cabling (via door interface 472) from the Recycler Safe's technology cabinet 300.

Other embodiments of the drop safe, which include different hardware and functionality are discussed in the sections below.

The drop safes of the various embodiments of the present invention accept banknotes contained within the dropped Smart Bags, via the bill validators, via the small form factor cash recycler, and/or via other equipment that accept banknotes. For convenience, the term "note" or "notes" as used herein refers a banknote (or banknotes). Other common terms for a banknote include "bill," "money," "cash," "paper money," and "paper currency." These terms, along with the term "note" and other like terms, are used interchangeably herein to refer to a banknote.

Smart Bag: Overview

The embodiments of the present invention that include a bag drop slot are designed to receive a tamper-evident sealing deposit bag, also referred to herein as a Smart Bag. The Smart Bag is utilized by retailers to make deposits in the manner described herein. The Smart Bag of the present invention includes active and/or passive technology that enable technology within the drop safes of the invention to uniquely identify each deposited Smart Bag.

Figure 5:
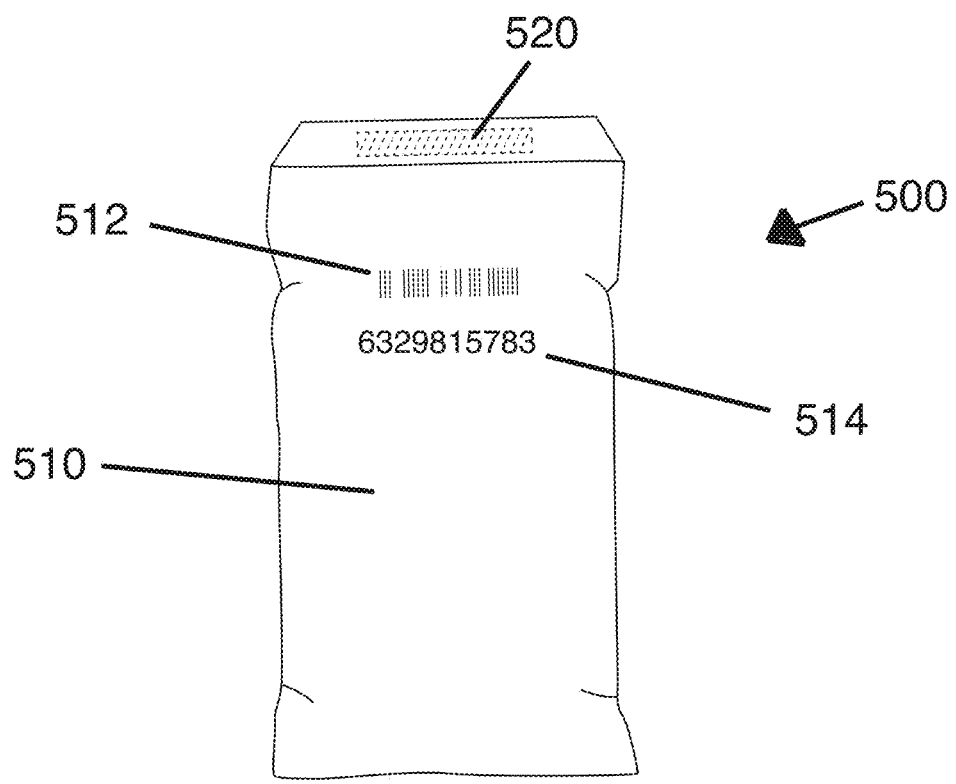
FIG. 5 is a schematic illustration of the Smart Bag of the present invention.

In one embodiment, which is schematically shown in FIG. 5, Smart Bag 500 is shown to be comprised of a bag 510 that includes certain information printed (or otherwise provided) on the exterior of the bag. Such information includes a unique barcode 512 and a human-readable identification number 514. Preferably, the barcode 512 represents the same human-reader number 514.

For convenience herein, the term "printed," "printed information," "printed text" and the like includes information, numbers, text and other indicia (e.g., icons, graphics, photos, pictures, etc.) that are provided in a manner that is viewable by a person and/or viewable by a camera (and the like), whether or not such information is actually printed. For instance, the information may be engraved or otherwise visibly provided (without actual being "printing"). Accordingly, the term "printed" and other like terms are used to broadly indicate visible information.

In other embodiments and variations, rather than providing printed information (or in addition to providing printed information), suitable technology is employed to provide the information in an audible fashion. For instance, in one embodiment, Smart Bag 500 includes the capability of audibly providing the human-readable identification number 514. Such functionality is beneficial under certain circumstances, such as in areas of low-light, for use by the visually impaired, and/or in other situations. Since technology for providing audible information is well known, further details are not discussed herein except where particularly necessary for an understanding of the present invention.

Smart Bag 500, in certain embodiments, includes an RFID tag 520 embedded within the bag 510. The placement of the RFID tag and the printed information may be provided at different locations than that shown in FIG. 5. The RFID tag 520 preferably is an industry-standard Ultra-High Frequency RFID tag, although other types of RFID tags may be employed if appropriate. The ID of the RFID tag may represent the same number represented by the barcode and/or the human-readable identification number.

In another embodiment, an RFID tag is omitted from the Smart Bag. In yet a further embodiment, either the unique barcode or the human-readable identification number is omitted. In alternative embodiments, rather than using a barcode, other computer-reader indicia is employed. For instance, a QR-code may be used.

In the various embodiments, the Smart Bags may be sized to accommodate the needs of the retailer end-users. For instance, the Smart Bags may be sized to accommodate, 50 notes, 100 notes, 150 notes, 200 notes, 250 notes, etc. Moreover, the Smart Bags may be sized to allow coins to be included. In yet other embodiments, the Smart Bags may be sized to accommodate other items of value (including things of sentimental value).

As will be further described, each Smart Bag that is dropped into a drop safe of the present invention is identified/detected by employing the drop safe's dropped item identification and authentication capabilities. In certain embodiments to be described, the drop safe employs RFID technology capable of reading the ID of the RFID tag contained within each Smart Bag. In certain other embodiments, the drop safe employs visual recognition technologies. In certain embodiments, a combination of identification and authentication capabilities are employed.

Other Equipment: Overview

The safes of the present invention work in conjunction with users' mobile smart phones or smart tablets, such as an iPhone, iPad, Android smart phone, and the like. For convenience herein, the terms "mobile device," "mobile phone," "smart phone," "portable device" and the like are interchangeably used herein to refer to and include all cellular telephones that support wireless communications protocols, and include portable tablets and other portable electronic devices, such as the iPad mobile device, that support wireless communications protocols, such as cellular communication, Wi-Fi communication protocols, Bluetooth protocols and/or other long-range, mid-range and short-range protocols. In certain embodiments, the mobile device includes location identification capability, such as GPS.

Figure 6:
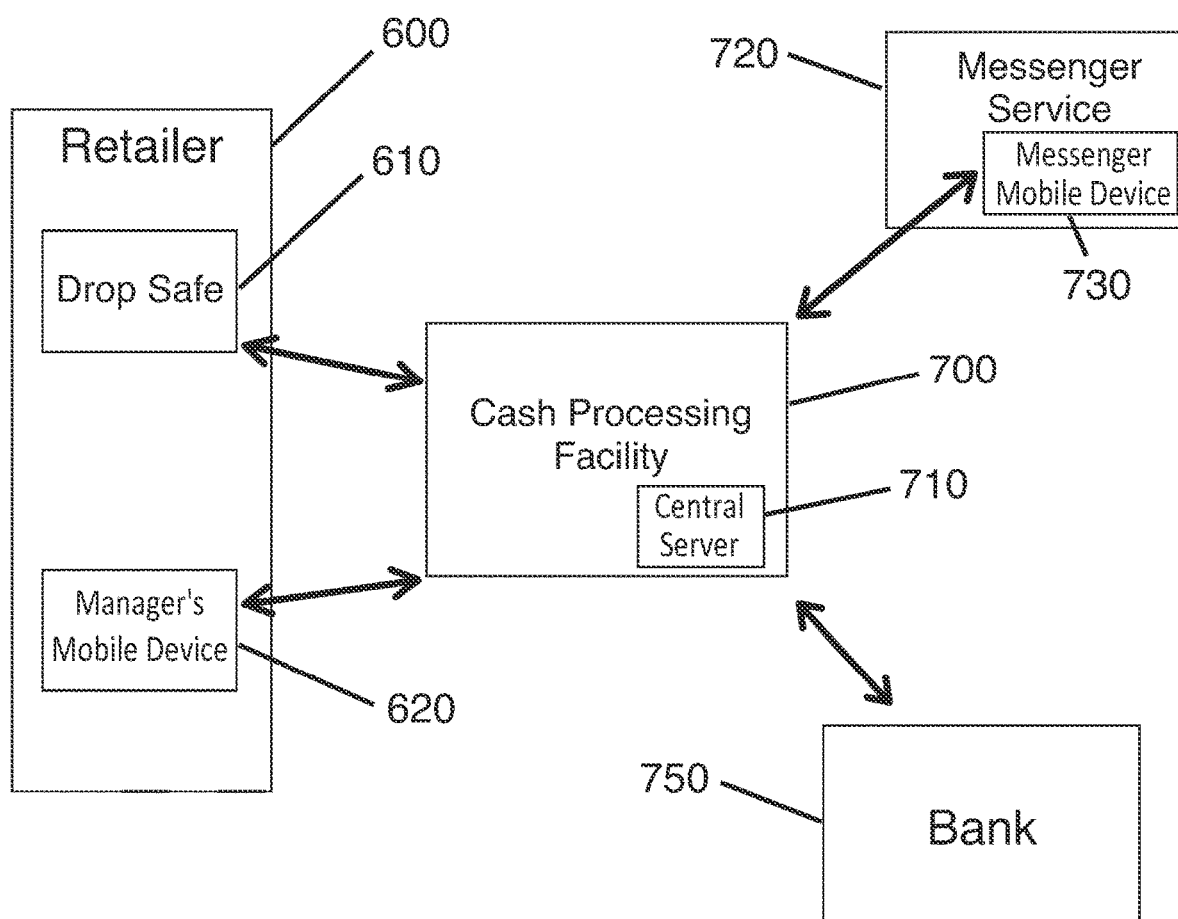
FIG. 6 is a block diagram of the various entities involved in the processes of present invention.

The drop safes of the present invention communicate with and work in conjunction with a central server (or other remote computing system) via the Internet, cellular communication, or other form of long-range communication. FIG. 6 is a block diagram that shows the various devices/entities that are involved in the processes of the present invention. In particular, the various devices/entities include the retailer 600, a cash processing facility 700, a messenger service 720, and the retailer's bank 750. Although four entities are shown, additional entities may also be involved. Further, a single entity may carry out the functions of two or more entities and, thus, the total number of entities involved in the process may be different than that shown in FIG. 6.

Retailer 600 includes an associated drop safe 610, which may be the Brink's Box 10, the B-Safe 20, the Recycler Safe 30, or other drop safe embodiment or variation thereof as described herein. The drop safe 610 may be placed within the retailer location or at another location accessible to employees of the retailer.

As used herein, a "retailer" is a company providing goods and/or services, such as a retail store (e.g., department store, supermarket, grocery store), a transportation provider (e.g., an airline, a bus company), etc. For convenience, the generic term "retailer" is used herein to refer to a company that provides goods and/or services in exchange for money and where that retailer sometimes (perhaps often) accepts physical cash in exchange for such goods and/or services. In certain embodiments, a retailer may receive something of value (other than notes/coins) that is intended to be temporarily stored within a drop safe of the present invention. For convenience, the term "thing of value" is used herein to refer to one or more notes, coins, and/or other item(s) that has value.

Drop safe 610 may be physically placed within the retailer location, such as within a back office. The drop safe also may be placed within the physical space of another retailer (e.g., a neighboring store) that is accessible to personnel of the retailer, or within a common area. The term "common area" refers to a space accessible to multiple entities, such as multiple retailers, so that a drop box located in such common area is accessible and thus usable by multiple entities. For example, a common area may be placed within a shopping mall at a location accessible to the tenants of that shopping mall. The common area may include an area within a particular retailer that is accessible to other retailers. The term "placed" and the like is intended to mean disposed or located, where appropriate.

Other equipment/entities schematically shown in FIG. 6 are discussed in the following sections.

Processes: Overview

In advance of using the drop safe of the present invention, the retailer prepares for a deposit. In accordance with the present invention, the retailer's manager or other designated person (collectively, for convenience, "manager") uses his/her mobile device 620 (referred to herein as "manager's mobile device" or "user's mobile device" or the like) to start the deposit of a certain amount of notes, coins, and/or other thing(s) of value. As described in greater detail below, the manager executes an app or other software program/application (residing within the mobile device or within central server 710 or other remote computing device) to facilitate the creation of the deposit. Generally, the manager identifies the notes and/or coins placed within the Smart Bag 500, identifies the identification number of the Smart Bag, and then seals the Smart Bag for subsequent depositing into drop safe 610. Details of the manager's creation of a deposit are described in the sections that follow.

In certain embodiments in which the retailer desires to deposit into the drop safe something of value (other than notes and/or coins), the manager identifies the thing of value within the app or other software program/application, identifies the identification number of the Smart Bag, and then seals the Smart Bag for subsequent depositing into the drop safe. Further details are described in the sections below.

The present invention entails novel techniques for depositing a deposit bag, e.g., the herein-described Smart Bag, within the inventive drop safe. As will be described further below, the bag drop slot of the drop safe is unlocked in various manners, including after the drop safe scans the barcode printed on the outside of the Smart Bag. The drop slot may be opened upon reading of the badge of an authorized employee of the retailer, among other techniques described herein. In addition, during each drop into the drop safe of the present invention, the drop safe via its dropped item identification and authentication capability, ascertains the ID of each and every Smart Bag that is currently within the safe. This information is utilized to ascertain certain benefits including whether a previously dropped Smart Bag has been impermissibly removed from the drop safe (e.g., fished out via the bag drop slot), among other benefits to be discussed.

The drop safe is in communication with the central server 710 (of the cash processing facility 700) that collectively know the identity of each Smart Bag that has been dropped in the drop safe, the contents within each dropped Smart Bag, when each Smart Bag was dropped, who created the associated deposit record for each Smart Bag, who actually deposited each Smart Bag with the drop safe, among other information. Details about the function and operation of these features are further described.

Based on a schedule or the number of Smart Bags currently in the drop safe or other reason, a designated and duly authorized messenger (messenger service 720) removes the cash deposits (or other deposited items) from the drop safe. To initiate bag removal, the messenger uses his/her mobile device 730 (referred to herein also as "messenger's mobile device" or the like) to gain access to the drop safe. The messenger executes an app or other software program/application (residing within the messenger's mobile device or within central server 710 or other remote computing device) to verify the identity of the messenger, the identity of the drop safe to be emptied, among other things, which in turn causes the generation of a single-use authorization code, also referred to herein as a one-time authorization code or an "OTA" code. In preferred embodiments, the OTA code has a timed expiration for additional security.

The OTA code is transmitted to the messenger's mobile device that, in turn, provides the OTA code to the drop safe. In certain embodiments, the OTA code is in the form of a QR code (or other displayable code) that is displayed on the messenger's mobile device and subsequently read/scanned by the drop safe's QR reader (as part of the drop safe's user and dropped item authorization capability). In other embodiments, the OTA code is transmitted from the messenger's mobile device to the drop safe using a communication protocol, preferably a short-range communication protocol. Other embodiments/variations for communicating the OTA code to the drop safe are discussed.

Upon receipt of a valid, non-expired OTA code, the digital lock of the drop safe's door unlocks, thus providing the messenger with access to the drop safe's internal storage.

Once the safe is opened, the messenger removes all the Smart Bags. If the drop safe is a B-Safe (which includes bill validators) or other version of a drop safe that includes bill validators, the messenger removes all the notes that may be loose or included within an open bag that is within the drop safe. As will be described in further detail, the safe monitors the existence of the Smart bags that have been removed. The messenger replenishes the internal bag from the B-Safe, closes the safe door, and transfers the removed contents to cash processing facility 700 for further handling. Certain benefits and features of the invention during this process include verifying that the messenger has indeed removed all the Smart Bags from the safe. If not, the messenger may be notified to return to the safe. Other features and benefits are further described.

Cash Processing Facility 700 processes the Smart Bags and if applicable the currency notes, in manners known in the art. In addition, the drop safes of the present invention enable for retailers to be provided with a credit (e.g., to the retailer's bank account within bank 750) for the cash deposits that are made to the inventive safes.

The Brink's Box, B-Safe, and Recycler Safe: Detailed Discussion

As briefly discussed above, each of the drop safe embodiments of the present invention include a chassis, a door, and a tech shelf.

The Drop Safe's Chassis

In accordance with the present invention, the chassis in the Brink's Box, the B-Safe, and the Recycler Safe, and other embodiments discussed herein, include dropped item sensing technology that is used to identify each Smart Bag that has been dropped into the drop safe. In accordance with certain embodiments, such technology is a set of RFID antennae that are connected to an RFID reader that is placed within the tech shelf. The RFID antennae, also called for convenience RFID sensors or RFID pads, are placed on different inner walls of the lower portion (lower compartment) of the chassis, generally close to where the Smart Bags are stored within the chassis after being dropped into the safe.

Figure 7:
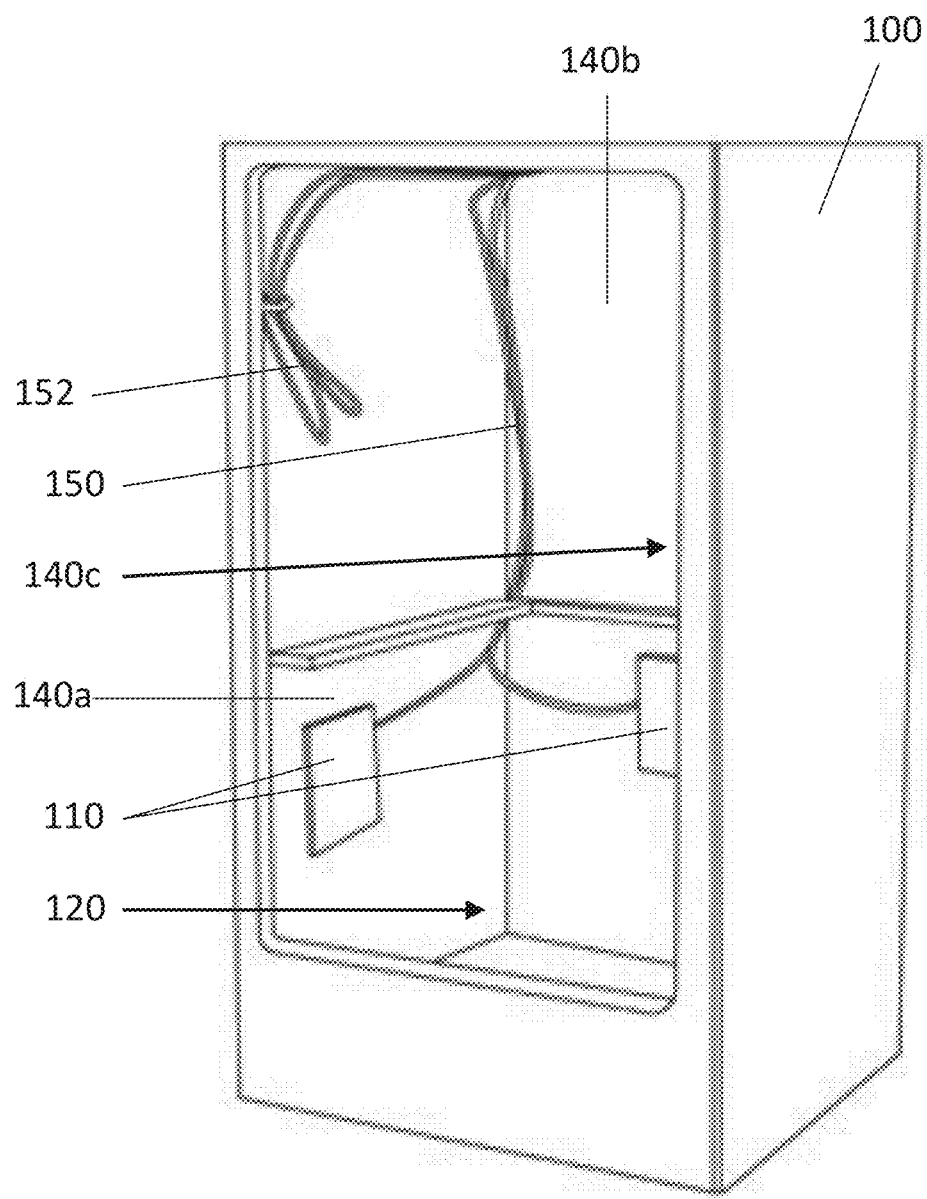
FIG. 7 shows an exemplary chassis of the drop safes of the present invention.

FIG. 7 shows an exemplary chassis 100. As shown, a first RFID pad 110 is coupled to the chassis' inner wall 140a, a second RFID pad 110 is coupled to the inner wall 140b, and a third RFID pad (not shown) is coupled to inner wall 140c. A set of cables 150 extending from the RFID reader within tech shelf 300 are coupled to each of the RFID pads within the chassis. Another set of cables 152 are shown within chassis 100 that connect the electronics within the safe's door 200 to components within tech shelf 300. Both sets of cables extend within chassis 100 to tech shelf 300 via a small aperture within the top or near the top of the chassis.

In accordance with the present invention, the RFID reader within the tech shelf utilizes the RFID pads/antennae 110 placed within the chassis to detect the ID of each of the Smart Bags' RFID tags. With such equipment, the IDs of several hundred RFID tags can be identified within a few seconds. Accordingly, all the Smart Bags that have been dropped within the drop safe of the present invention are, during the various processes described herein, identified immediately upon use of the drop safe, whether such use is the opening of the bag drop slot, closing of the bag drop slot, opening of the safe for content removal, closing of the safe, and/or at any other time of operation, as further discussed herein. For instance, the drop safe can be programmed to take an inventory of its contents at periodic intervals of time, such as every 5 minutes or every 15 minutes (or other periodic interval of time), to verify dropped bags haven't been removed without authorization, to identify any newly deposited Smart bags, and/or other reason.

The number of RFID pads may be different. For instance, a drop safe in accordance with the present invention may employ two RFID pads appropriately placed within the chassis, or may employ another number of RFID pads. Moreover, the location of the RFID pads may be different than that shown in FIG. 7. For instance, an RFID pad may be placed on the bottom inner surface (i.e., floor) of the chassis or near the top of the chassis, if desired.

As shown in FIG. 7, the chassis includes sufficient storage space (i.e., storage area 120) for a relatively large number of dropped Smart Bags. However, due to financial risk or other reasons, the drop safe may be programmed to accept a maximum number of dropped Smart Bags that is substantially less than the chassis' actual physical storage capacity. For instance, a drop safe installed at one retailer location may be limited to a maximum of 30 dropped Smart Bags, or 20 dropped Smart Bags, or other number. In a larger retail environment, the drop safe may be programmed to limit the number of dropped Smart Bags to yet a larger number, such as 45 Smart Bags, 55 Smart Bags, 65 Smart Bags, 75 Smart Bags, etc. Other numbers may be employed. In yet other versions (or in addition to the foregoing), the drop safe may be programmed to accept a limited monetary value, regardless of the number of Smart Bags that the drop safe may already contain.

As shown in the exemplary chassis in FIG. 7, the chassis of the present invention in certain embodiments includes no electronics or electrical components other than RFID pads 110, cables 150 and 152, and connectors/interfacing equipment for the cables. As used herein, the term electronics includes cables, interfacing for the cables, and pass-through cabling/connectors (for the electronics/technology in the drop safe's door).

In accordance with the B-Safe embodiment of the present invention, which is illustrated in FIGS. 2 and 4, a pair of bill validators 430 are placed within the upper portion of the B-Safe's door 400. Referring again to FIG. 7, the upper portion of the chassis' storage space is employed to hold notes that have been accepted by the bill validators. In one embodiment, a bin is placed within the chassis to catch/contain the received notes. In another embodiment of the B-Safe, a large sealable bag is appropriately placed within the chassis that captures notes that have passed through the bill validators and, in such embodiment as will described, a messenger who is emptying the contents of the drop safe retrieves the sealable bag and seals it without the need for the messenger to physically contact any of the notes that have been accepted by the bill validators or otherwise received by the drop safe.

The Drop Safe's Door

Figure 8:
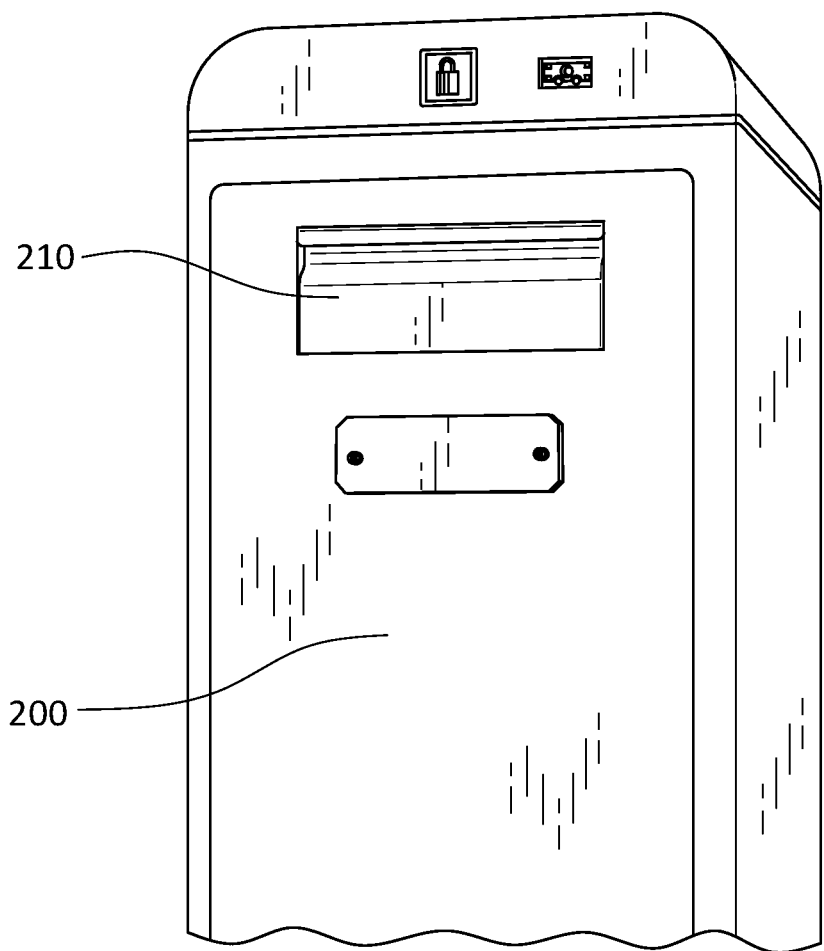
FIG. 8 shows an exemplary exterior of the door of the Brink's Box.
Figure 9:
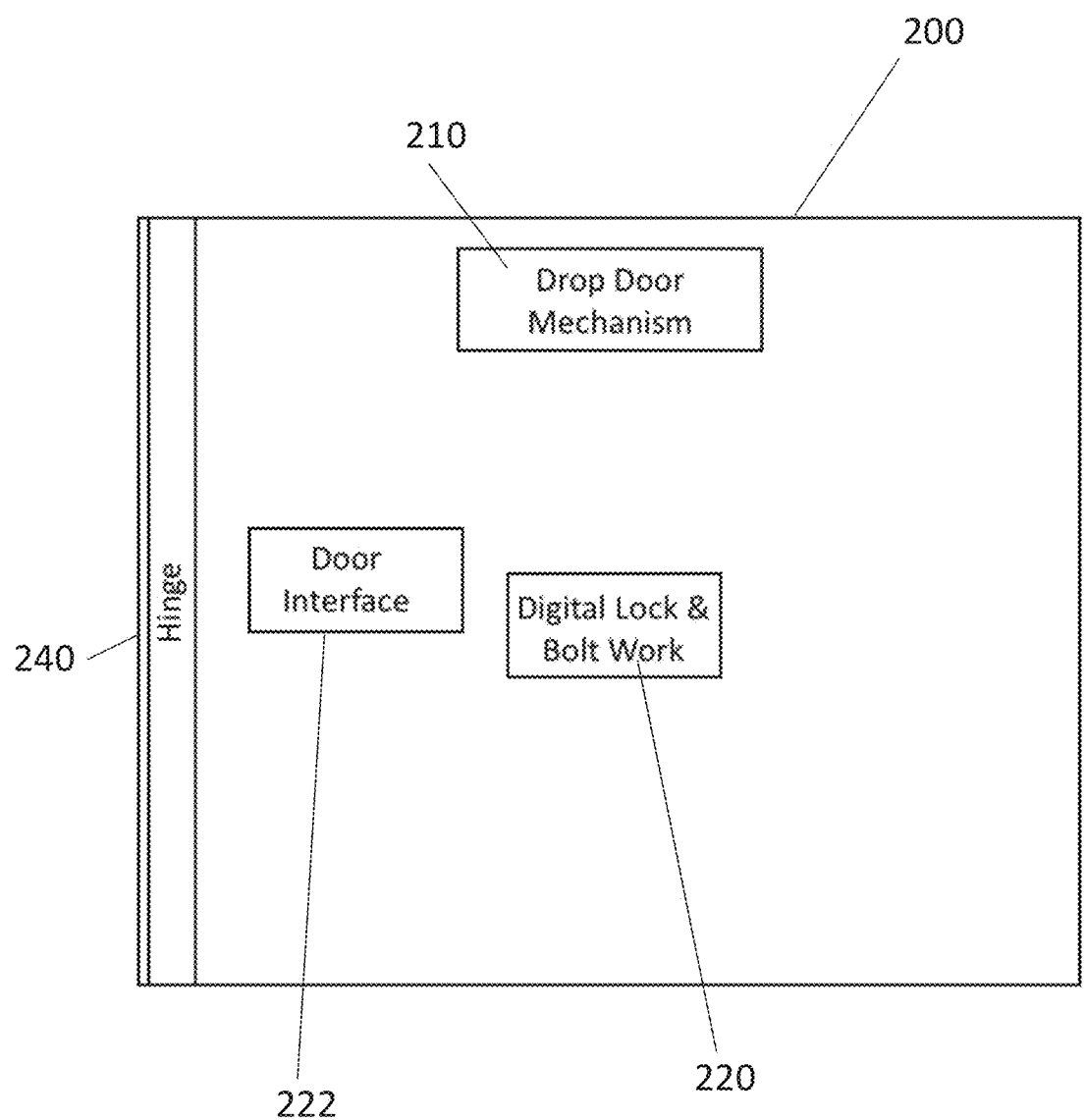
FIG. 9 is a functional block diagram of the door of the Brink's Box.
Figure 10:
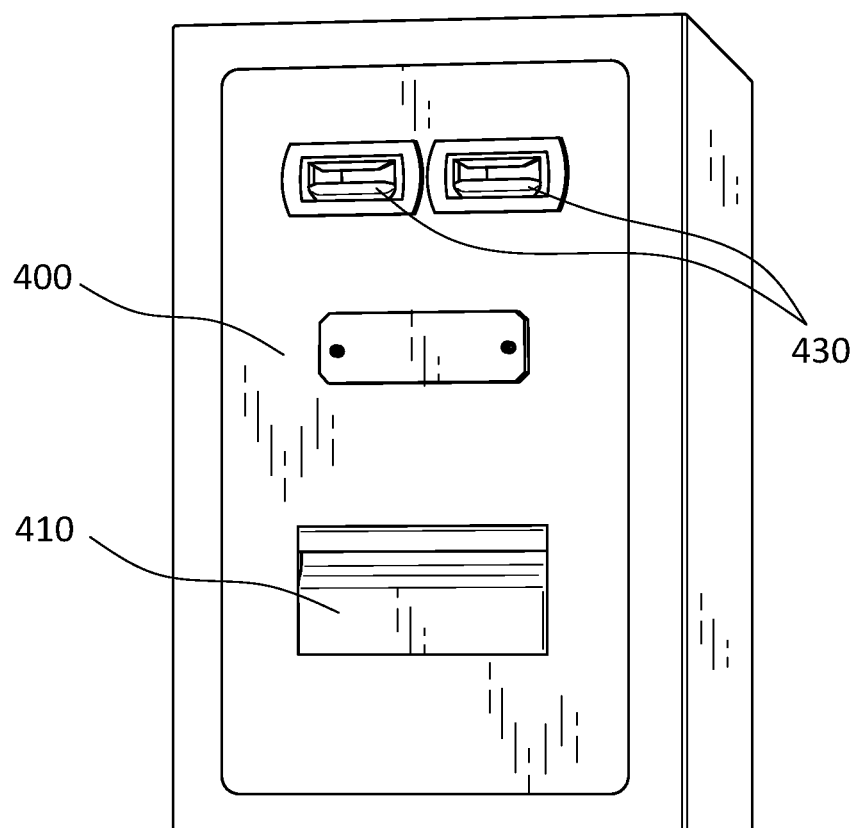
FIG. 10 shows an exemplary exterior of the door of the B-Safe.
Figure 11:
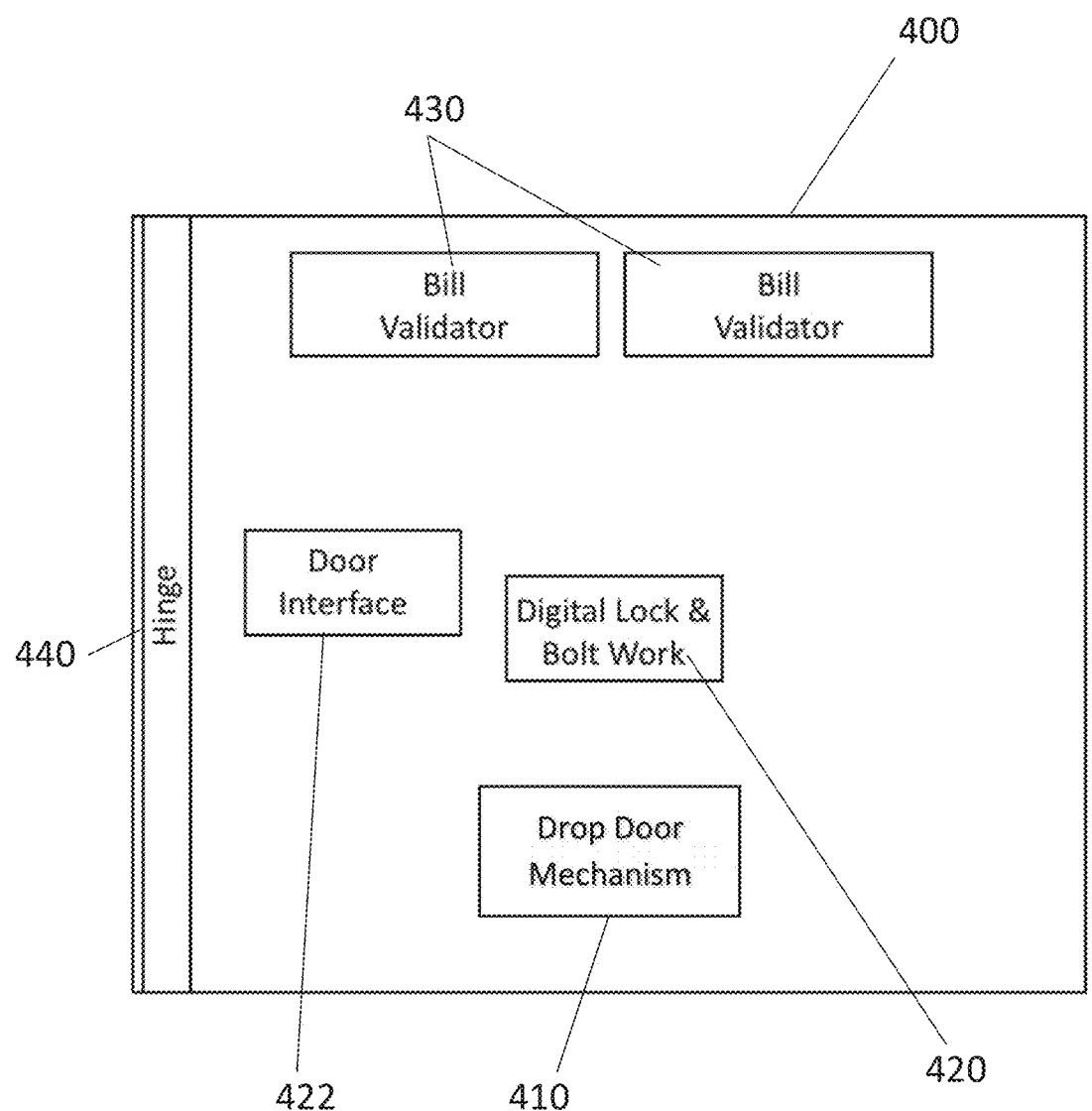
FIG. 11 is a functional block diagram of the door of the B-Safe.
Figure 13:
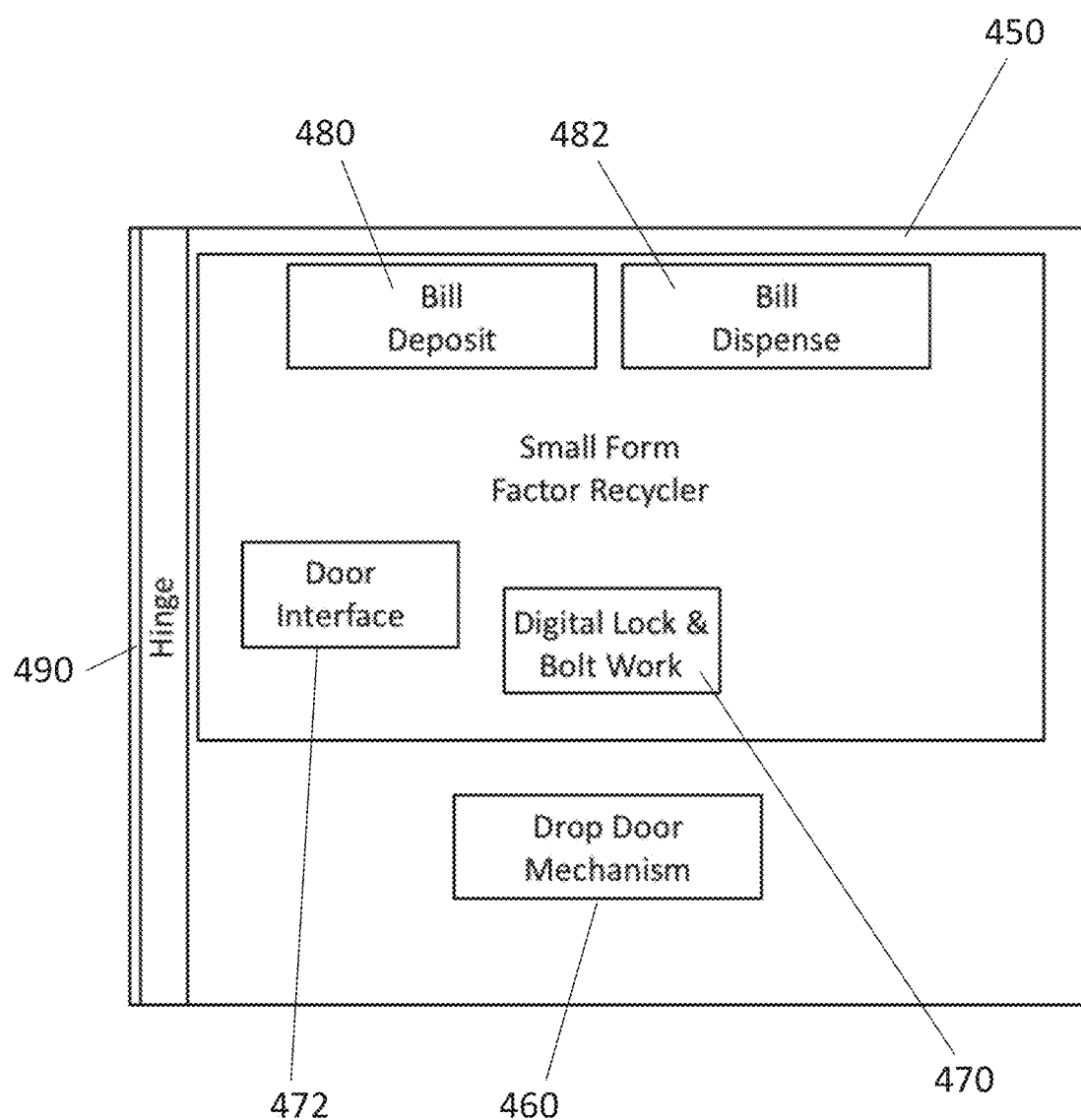
FIG. 13 is a functional block diagram of the Recycler Safe.

The doors of the Brink's Box 10, B-Safe 20, and Recycler Safe 30 have different configurations, different functions, and different capabilities, although some of their functions and capabilities overlap in various embodiments/versions. FIG. 8 shows the outside of an exemplary door 200 of the Brink's Box and FIG. 9 is a block diagram of door 200. FIG. 10 shows the outside of an exemplary door 400 of the B-Safe and FIG. 11 is a block diagram of door 400. FIG. 13 is a block diagram of door 450 of Recycler Safe 30, and previously referenced FIG. 4A is a block diagram of Recycler Safe 30.

Referring first to Brink's Box 10, door 200 includes bag drop slot 210 and digital lock 220 (with associated bolt work) (FIGS. 8 and 9). Preferably, bag drop slot 210 includes an "anti-fishing" design that prevents, or at least minimizes, the risk of a bag within the safe's chassis from being pulled out through slot 210.

Digital lock 220 utilizes bolts and is designed to unlock (as controlled by the tech shelf) upon proper receipt of a one-time authorization (OTA) code. The mechanical/functional construction of the locking mechanism employed by digital lock 220 is well understood in the art and further description thereof is not necessary except where necessary to appreciate the present invention.

The B-Safe's door 400 includes bag drop slot 410, digital lock 420, and bill validators 430 (FIGS. 10 and 11). Bag drop slot 410 is identical to bag drop slot 210 of door 200, but bag drop slot 410 may be placed within the lower portion of door 400, such as shown in FIG. 10. Digital lock 420 is identical to digital lock 220 of door 200.

In the B-Safe embodiment of the present invention, a pair of bill validators are placed near the top of door 400. During operation, each bill validator 430 is able to receive an inserted note, recognize its denomination, verify its authenticity and, if authentic, causes the validated note to pass into the safe's chassis. Each bill validator is in communication with the tech shelf's processors and communicates all appropriate data, which includes the denomination of each accepted note. In accordance with the present invention, accepted notes fall directly into the safe's chassis without the use of a spring-loaded cartridge.

Figure 12A:
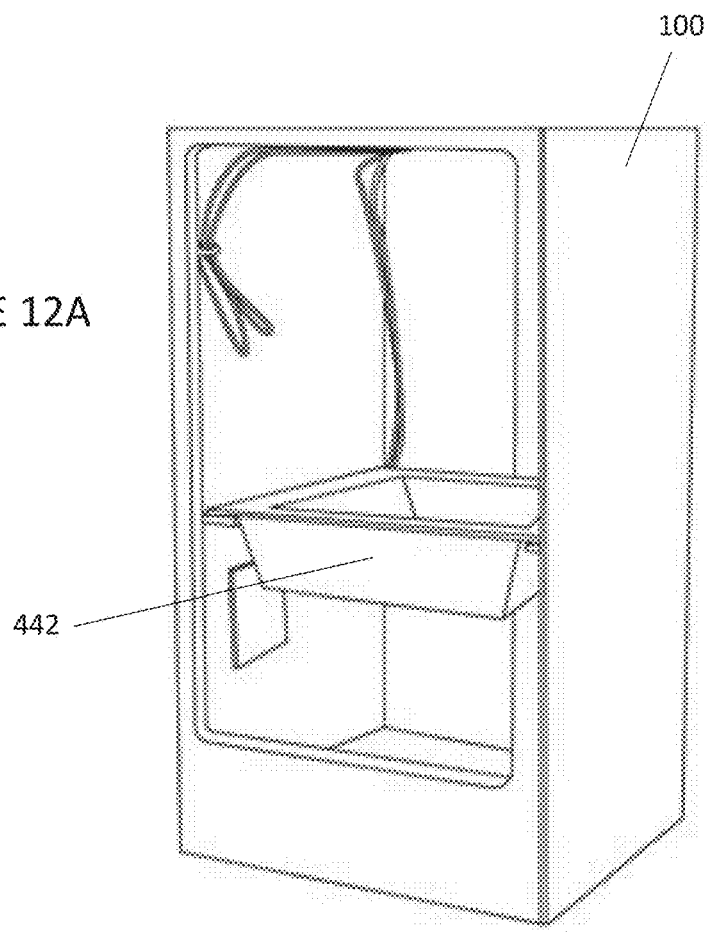
FIG. 12A shows an exemplary chassis of the B-Safe that includes an exemplary bin that captures notes that pass through the B-Safe's bill validators.

A single bin, with an optional containment bag (liner), placed within the chassis beneath the bill validators is used to capture notes that are received by both bill validators. FIG. 12A illustrates an exemplary bin 442 placed within the B-Safe's chassis 100 at a position that catches notes that are accepted by either bill validator. Accordingly, a single bin may be employed even though two bill validators are provided within the B-Safe. As explained further herein, when a messenger empties the contents of the B-Safe of the present invention, the messenger gathers all the notes within the bin and places those notes into an envelope or other type of container for further processing. If an optional containment bag is employed, the messenger removes the existing bag and replaces it with a new empty containment bag (liner) that is identified by the B-Safe.

In accordance with the present invention, by not utilizing cartridges that are designed to hold a certain number of notes, the impact of bill jams is minimized. Moreover, the note storage capacity of the B-Safe is based on the size of the storage area within the drop safe's chassis, not by the size of a cartridge.

Since the construction and operation of bill validators are well known in the art, further description thereof is not provided except where particularly necessary for an understanding of the present invention.

Figure 12B:
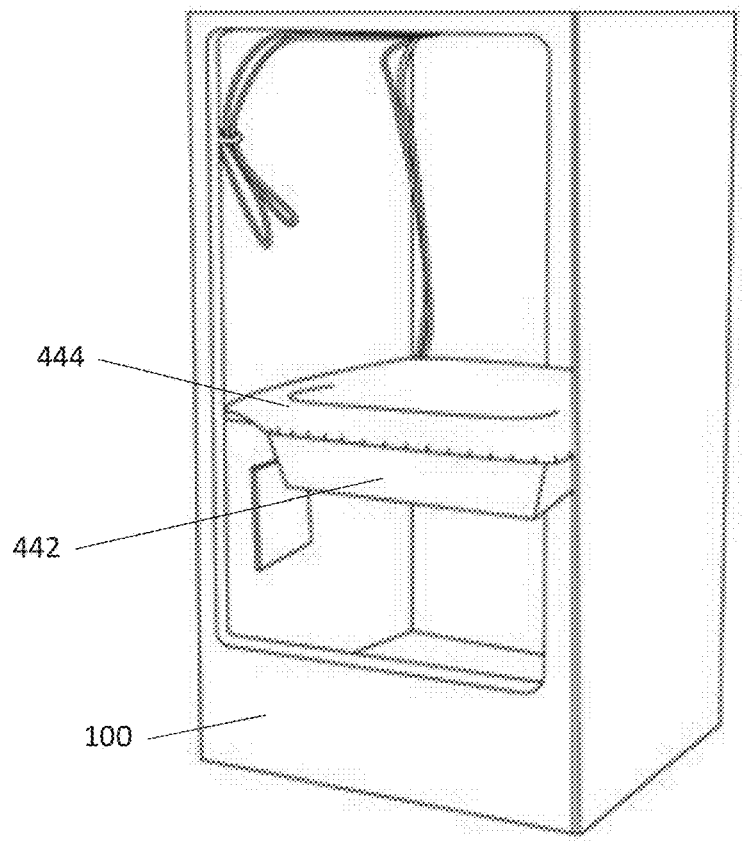
FIG. 12B shows an exemplary bin liner within the exemplary bin that captures notes that pass through the B-Safe's bill validators.

FIG. 12B shows a variation that employs an identifiable bin liner 444, which is placed within bin 442, that catches notes that have been accepted by the bill validators. During removal of the notes, the bin liner is removed from the B-Safe in its entirety (including the notes within it) and placed within an appropriate envelope or transfer container for further handling. Accordingly, the bin liner allows for the collection of notes that have been accepted by the bill validators without the need for the messenger to physically contact those notes. These features are further explained during the herein-in provided description of the process of emptying a B-Safe in accordance with the present invention.

In the Recycler Safe embodiment of the present invention, a small form factor cash recycler is placed near the top of door 450, such as shown in FIGS. 4A and 13.

During operation, notes are received by bill depositor 480 and may be dispensed via bill dispenser 482. As would be understood in the art, the small form factor cash recycler receives an inserted note, recognizes its denomination, verifies its authenticity and, if authentic, stores the note in a particular cassette based on its denomination. Notes may then be dispensed upon receiving a suitable request.

The Recycler Safe's bag drop slot 460 and digital lock 470 are identical to the bag drop slots and the digital locks of the Brink's Box and the B-Safe.

The Drop Safe's Tech Shelf

The tech shelf is coupled to the top of the chassis, such as shown in FIG. 3 (showing the Brink's Box), FIG. 4 (showing the B-Safe), and FIG. 4A (showing the Recycler Safe). A block diagram of tech shelf 300 is shown in FIG. 14A. An exemplary view of the exterior of tech shelf 300 is shown in FIG. 14B.

Tech shelf 300 includes various modules/components, including system controller and communications module 310, an auxiliary controller board 312, dropped item identification and authentication module 320, user and dropped item authorization module 330, LCD screen/button 340, a light strip/diffuser 360, and a power supply 370. As will be appreciated, a module may be implemented via a single component or multiple components, as appropriate. Moreover, as mentioned further below, various components/functionality are optional or may be incorporated within other devices within the tech shelf.

System controller and communications module 310 includes a main controller board that controls the various operations of tech shelf 300 and includes communications equipment for communicating with the central server (or other remote servers) and/or other devices external to the drop safe. In certain embodiments, LTE/4G communication equipment is employed. In other embodiments, Wi-Fi communication equipment is employed. In further embodiments, both LTE/4G and W-Fi communication equipment are employed. Other forms of communication equipment/technology, including mid and short-range communication equipment, may be employed/included within system controller and communications module 310.

In variations of any of these embodiments, system control and communications 310 includes suitable equipment/capability to carry out multiple forms/protocols of wireless communication. Non-wireless (i.e., wired) communication also may be employed. Moreover, some or all these communication capabilities may be implemented via separate components/devices within the tech shelf, whether standalone or included within modules/devices performing other functionality.

Auxiliary controller board 312 is employed to supply power and to supply and receive data to various components of the drop safe, including bag drop slot 210 and digital lock 220 within door 200 (or those components within door 400 of the B-Safe or within door 450 of the Recycle Safe), and other devices. In addition, auxiliary controller board 312 communicates with and provides power to bill validators 430 within door 400 when the drop safe is configured as a B-Safe in accordance with the present invention. Similarly, auxiliary controller board 312 communicates with and provides power to the small form factor cash recycler within door 450 of the Recycler Safe.

The functions of main controller board 310 and auxiliary controller board 312 may be modified, combined within a single component/module or implemented by other components within the tech shelf Dropped item identification and authentication module 320 identifies the Smart Bags dropped within the drop safe's chassis. In certain embodiments, this module is an RFID reader that works together with the RFID antennae 110 placed within the chassis. In other embodiments, this module employs visual recognition processing that works together with appropriate cameras 110 placed within the chassis to identify the items dropped within the chassis. Other technologies suitable for uniquely identifying each Smart Bag dropped within the chassis may be employed.

In the embodiments in which dropped item identification and authentication 320 employs an RFID reader, a set of connectors 322 allow the direct coupling, via appropriate cabling, of the RFID reader to RFID pads 110 placed within the chassis. Similarly, in embodiments in which dropped item identification and authentication 320 employs visual recognition technology/capability (e.g., using appropriate processing), cameras placed within the chassis are coupled to module 320 via connectors 322.

User and dropped item authorization module 330 identifies users who are authorized to use the drop safe and/or items (e.g., Smart Bags) that are authorized to be dropped. Module 330 may be implemented using different technology, equipment, and methodologies. In certain embodiments, a barcode/QR-code scanner/reader 330 and associated processor is employed. In other embodiments, non-visual, short-range wireless communication equipment (e.g., RFID reader, NFC reader) are employed. In yet further embodiments, other forms of visual recognition technology, such facial recognition, biometric analysis (e.g., fingerprint reader), etc., are employed. Various embodiments/variations are further described.

The tech shelf also includes LCD screen/button 340, which is capable of providing instructions to users, such as a countdown timer during different modes, and is depressible by a user. In certain embodiments, LCD screen/button 340 may be omitted.

Tech shelf 300 is housed within a cabinet or housing 350 constructed of a material that permits the pass-through of RF signals to enable the enclosure of RF-based communications. For instance, housing 350 may be made of various types of plastics, as well as Polypropylene (PP), Polypropiolactone (PPL), Polyvinyl chloride (PVC), Acrylonitrile-butadiene-styrene (ABS), or other RF transparent materials, such as, for example, Polyurethane (PU), Polycarbonate (PC), Fiberglass and Teflon. Accordingly, housing 350 minimally interferes with RF-based communications between the tech shelf and communication devices external to the tech shelf, including cell towers, suitably equipped mobile devices, Wi-Fi routers, and other communication equipment.

To inform users of status, mode and other information, the tech shelf's light strip/diffuser 360 is controlled by the main controller board or other controller of the tech shelf. In some embodiments, the light strip is a strip of LEDs that are mounted along the perimeter of the tech shelf. The strip can extend along any side in different versions (including along all sides).

The LEDS within the strip are controlled by the controller board during the various operations of the present invention to emit different colors during different modes of operation. For instance, the light strip may be blue during an idle mode to indicate that the system is ready to initiate a deposit instruction. The light strip may be green during an active deposit session. The light strip may be yellow during a timed session. The light strip may be red to indicate something is critical. And the light strip may flash red to indicate that the system is offline. Other colors may be provided during other modes. Moreover, this color system is exemplary, and another set of color combinations may be employed to assist the users of the drop safes of the present invention. The diffuser may be omitted in certain embodiments. Other forms of lighting devices, other than LEDs, may be employed in any embodiment/variation.

Power supply 370 receives externally provided power via a power cord (not shown) and in turn supplies power to the various components within the tech shelf.

The tech shelf further includes, in certain embodiments, a GPS chip/module. In a variation, GPS capability may be included within one of the other devices/modules of the tech shelf. As discussed herein, with GPS capability, the drop safe of the present invention is able to identify its own location, which is used for security, authentication and other purposes.

Communication between the various components of the tech shelf may be achieved via USB cables, via Ethernet, or other known communication devices/protocols. Communications between the various components and/or other communication devices (internal or external to the drop safe) may be encrypted as appropriate. Generally, the construction and design of the tech shelf of the present invention will be consistent with generally accepted communication protocols, which may vary from country to country. The present invention is not intended to be specific to any one type of communication protocol. Moreover, since the general operation of the various electronic components mentioned herein, communication between the devices, and encryption methodologies are well understood in the art, further discussion of these features, components, and methodologies are not provided herein except where particularly necessary for an understanding of the present invention.

In further embodiments, communication between the drop safe and the central server (or other remote server) may be achieved via a hardwire connection, which may be necessary in areas of the world where cellular (or other wireless)

communication is unavailable or "spotty." The use of hardwire for long distance communication is well known and thus further description is not provided except where necessary for an understanding of the present invention. In addition, the communications antenna can be extended beyond the confines of the tech shelf, if desired, to improve wireless communication with the remote central server. Communication to the remote server may be via any standard or non-standard wireless communication technique, and may include communication to a nearby router via Wifi or Bluetooth, or other short or mid-range communication protocol.

Tech Shelf Configuration and Drop Safe Type Detection

In accordance with the present invention, the tech shelf has the ability to sense/identify the type of door that is installed on the drop safe's chassis, communicate that information to the central server, and be auto-configured to control all the equipment/functionality of the drop safe. Such auto-configuration is carried upon installation of the drop safe at the retailer location, upon installation of a new tech shelf within a drop safe already installed at a retailer location, upon on-site conversion of the drop safe from one type to another type, and at other desired times.

After installation of a new drop safe at a retailer location, the tech shelf performs a boot-up operation that includes detection of all equipment included within the drop safe's door. In particular, the tech shelf detects the presence or absence of individual types of devices that may be included within the drop safe's attached door, including a bag drop slot (drop door mechanism), a digital lock/locking mechanism, bill validators, a small form factor cash recycler, and other equipment that can be included within a door of the various types/embodiments of drop safes of the present invention.

Each new tech shelf includes a unique identifier, which may be provided on the tech shelf as a bar code or other computer-readable code (e.g., a QR code). The drop safe also includes a unique identifier, which may be initially associated with the chassis. For instance, a bar code (or other computer-readable code) is provided on the exterior or the interior of the chassis. The door of the drop safe also may include its own unique identifier (e.g., displayed on the interior portion of the door).

FIG. 15 shows an exemplary flow chart 800 for configuring the tech shelf in accordance with the present invention. Initially, and after a new (or refurbished) chassis, a new (or refurbished) door, and a new (or refurbished) tech shelf are individually mailed or otherwise provided to the installation site located at a retailer (or common area), an authorized technician assembles the drop safe (Step 810).

During assembly, the chassis is placed in its permanent position and bolted to the floor or otherwise fixed to its permanent location in a manner that makes it extremely difficult to forcibly move. Any suitable technique for permanently installing the chassis may be employed. The technician then installs the door in the manner intended in accordance with the construction/design of the design, its hinge and the connection technique to the chassis. The present invention provides exemplary embodiments for door installation, as well as door removal. As particularly indicated, installation of the door of the present invention (of the various embodiments described) on a chassis may be achieved without any special tools and in the described embodiments, without any tools at all. Further details are provided in the description below.

After the door is installed on the chassis, the tech shelf is installed. Any suitable manner of installation may be provided, in accordance with the particular design of the tech shelf, the chassis, and tech shelf mounting equipment, if any. The present invention provides exemplary embodiments that show tech shelf installation (and removal), as discussed in detail below.

The technician proceeds to attach all cables. In particular, cables that are connected to equipment within the door pass through the chassis' internal chamber through a small opening/aperture at or near the top of the chassis for connection to the tech shelf. Cables from the chassis' RFID antennae (or from equipment within the chassis pertaining to the tech shelf's dropped item sensing functionality) also are connected to the tech shelf. Finally, a source of power is provided to the tech shelf (e.g., via a power cord that is connected to a power receptacle).

Upon the drop safe's assembly, the drop safe is powered up (e.g., via an appropriate on/off button or depression of the tech shelf's LCD Screen/Button or other appropriate manner). At power up, the tech shelf boots up and begins an initialization process (FIG. 15: Step 820).

During initialization, the tech shelf obtains the drop safe's unique identifier (Step 830). This may be achieved in various ways. In one embodiment, the technician takes an image of the drop safe's unique identifier using the technician's mobile device, displays that image, which is then read by the tech shelf's Barcode/QR-code scanner/reader. The unique identifier on the drop safe may be a barcode, a QR code, or other appropriate computer-recognizable indicia. In another embodiment, the drop safe's chassis is retrofitted with a permanently installed RFID tag with an ID that uniquely identifies the drop safe. That ID is ascertained via the same RFID reader of the tech shelf (utilizing the antennas within the chassis) that ascertains the IDs of the RFID tags of each of the Smart Bags within the safe's chassis.

In a further embodiment, the tech shelf identifies its own, current location utilizing its own GPS capability, communicates its location to the central server that, in turn, ascertains the unique identifier of the drop safe based on the known location of the retailer or, if applicable, the otherwise known location of the drop safe. In yet another embodiment, the technician manually enters the unique identifier of the drop safe into an appropriate app on his/her mobile device that, in turn, wirelessly communicates that identifier to the tech shelf using Bluetooth, or other short-range communication protocol. Other manners of identifying the unique identifier of the drop safe may be employed.

The tech shelf communicates the drop safe's identifier to the central server (if not already known). The drop safe's identifier is mated to the particular tech shelf in use (Step 840). If the tech shelf is replaced at a later date, this process is repeated to associate the new tech shelf with the particular drop safe being serviced.

The tech shelf proceeds to identify each device that is included within the door that is attached to the drop safe (Step 850). Exemplary devices include a bag drop slot, a digital lock/locking mechanism, bill validators, a small form factor cash recycler, and other equipment including equipment employed within future-enhancements. The tech shelf communicates with the detected devices to establish their configuration using a combination of locally hosted information and connection to the central server. The central server, in response, suitably programs the tech shelf to operate as a Brink's Box, a B-Safe, a Recycler Safe, or other type of device, or any appropriate variation thereof depending on the types of devices within the door that have been identified by the tech shelf (Step 860). That is, the tech shelf is programmed/configured to align with the door's total functionality.

Once initialized and auto-programmed, the drop safe is ready for use by the retailer.

The process described with reference to FIG. 15 is repeated upon installation of a replacement tech shelf, upon installation of a new door, or at other appropriate time. Accordingly, the present invention's auto-sensing by the tech shelf of the drop safe's capabilities and subsequent tech-shelf auto-programming allows for the relatively quick installation of a new drop safe, a replacement tech shelf, and a new door (possibly with additional capabilities).

In addition to such auto provisioning, in certain embodiments, the tech shelf includes active location functionality (e.g., GPS), which enables it to verify and/or validate the location of the drop safe. With such validation, the drop safe's location is verified and other enhanced security measures are possible, including allowing auto-programing or other processes to occur only upon verification that the drop safe is located at an authorized location.

Moreover, with hardware and logical interfaces of the tech shelf predefined, the functionality of the drop safe can be modified and upgraded to newer technologies if the functionality and communications of the subtended equipment, e.g., doors, adhere to these definitions. The controller within the tech shelf then is able to auto-sense and provision accordingly.

Technologies and functionalities contained within the tech shelf itself may also be enhanced/upgraded as long as the interfacing standards both downstream to the door/chassis and upstream to the central server are maintained. In any of these instances, the new components, tech shelf or door are identified and configured upon power/boot up after an installation/upgrade action.

Accordingly, with the modular design of the drop safes of the present invention, issues need not be troubleshot on-site. Instead, any issues with the tech shelf preferably are handled through a replacement with another tech shelf. This is accomplished by detaching the faulty tech shelf physically, unfastening and pulling it forward to remove off of the rails. Installing the new tech shelf and conducting initialization, auto-sensing, and auto-programming in the manner described herein. Exemplary embodiments and techniques for physically replacing a tech shelf with a new tech shelf are described below.

Thereafter, the faulty tech shelf is sent to a service depot to analyze the root cause of the issues and application of a suitable remedy. The repaired tech shelf then is placed back into inventory. In light of its modular design, the repaired/refurbished tech shelf can be reused for subsequent repair swap actions.

Auto-sensing and auto-programming of the tech shelf after replacement of the drop safe door are handled in a similar fashion. This is the case whether a door is replaced with a door that is of the same type (i.e., has the same functionality) or of a different type (i.e., to convert the drop safe into one of a different type). The old door, whether or not faulty, is sent to a service depot and assessed for full operability. Faulty doors are repaired. The serviced doors then are placed back into inventory for future use.

The various steps carried out by the tech shelf of the present invention during installation, auto-sensing and auto-programming may be carried out, if appropriate, in a different order than that described above. Moreover, in certain embodiments, a step or multiple steps may be omitted and/or be unnecessary. For instance, the identity of the drop safe's unique identifier need not be obtained, if already known. This may be the case in the event of replacement of a faulty tech shelf. Auto-detection (i.e., auto-sensing) of the door's capabilities may also be omitted if already know. However, auto-detection along with error assessment substeps may be employed periodically or at designated times (e.g., upon a tech shelf swap) to verify continued functionality of all the equipment with the door.

In connection with the specifics of auto-detecting and auto-programming as discussed herein, such functionality (in the broad sense) is well known and understood in the art, and thus further discussion of auto-detecting and auto-programming is not provided except where necessary for an understanding of the present invention.

Tech Shelf Replacement

In accordance with the present invention, the tech shelf is removable from the drop safe for repair or replacement without the need to access the interior of the chassis. A technician or other service personnel is able to service the tech shelf without risk of theft to the drop safe's contents. Replacement also is achieved in a relatively short period of time, thus causing, at most, minimal interruption to the operations of a retailer. Moreover, a technician doesn't need to have diagnostic tools to repair components on site. The tech shelf can also be replaced with a tech shelf that includes upgraded electronics over time, thus providing further additional capability to retailers as they are developed.

A discussion of how the tech shelf is removed from the drop safe of the present invention is described with reference to one particular embodiment of the tech shelf shown in FIGS. 16A to 16E.

Figure 16A:
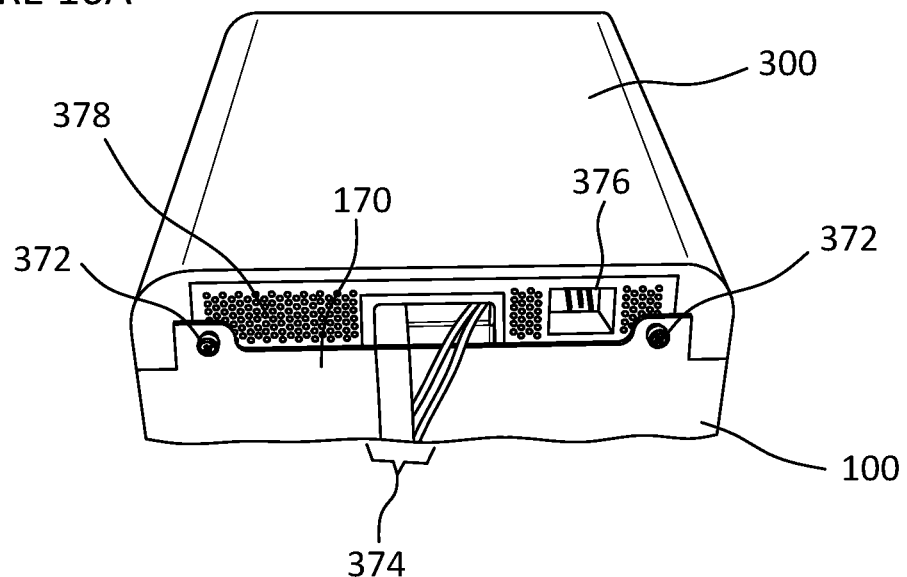
FIG. 16A shows an exemplary exterior of the rear of the technology shelf in accordance with one particular embodiment of the technology shelf.

FIG. 16A shows the back of an exemplary tech shelf 300 (in accordance with one embodiment) when connected to the top of chassis 100. In this exemplary embodiment, chassis 100 includes a bracket 170 extending upwards from its rear, and a pair of screws 372 are threaded through the bracket into appropriate slots in the back of the tech shelf to secure the tech shelf to the chassis. However, other manners of connection of the tech shelf to the drop safe's chassis may be employed.

Figure 16B:
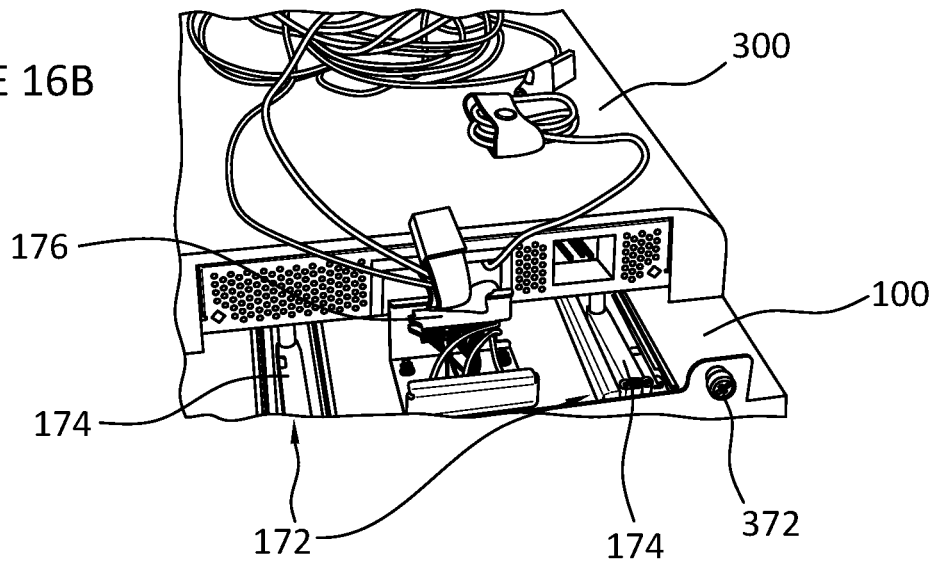
FIGS. 16B, 16C and 16D illustrate how the technology shelf is removed from the drop safe in accordance with one embodiment of the present invention.
Figure 16C:
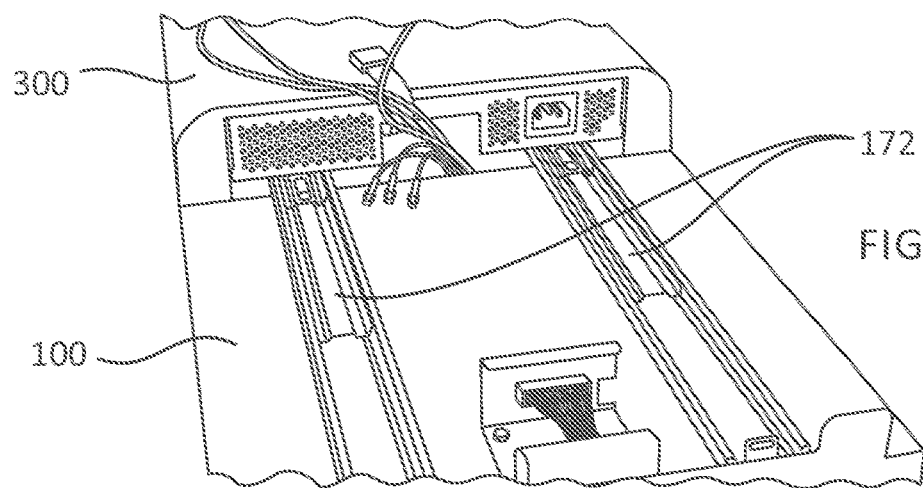
Figure 16D:
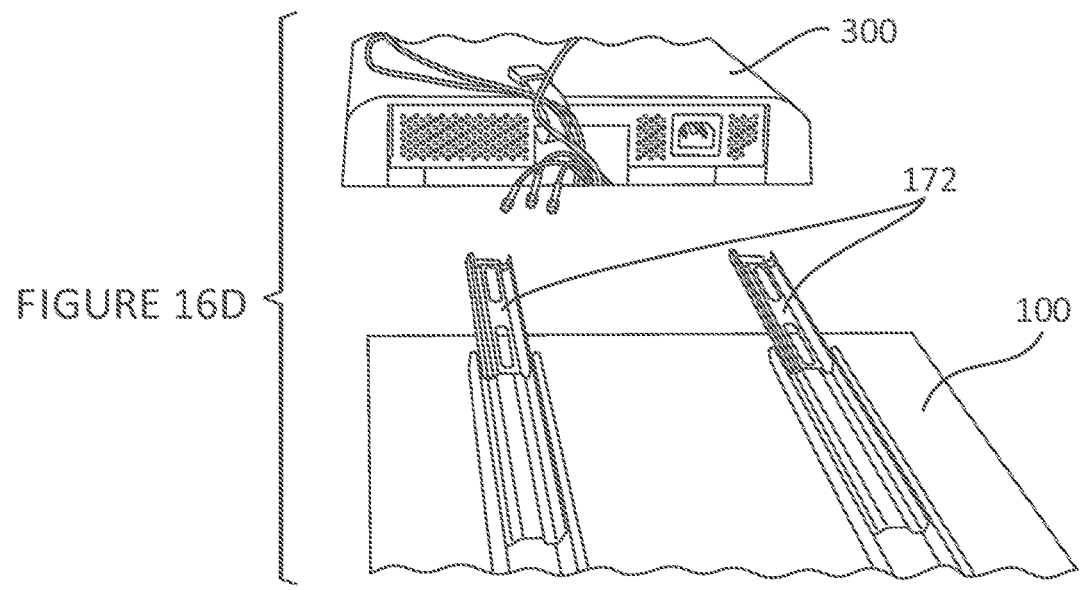
Figure 16E:
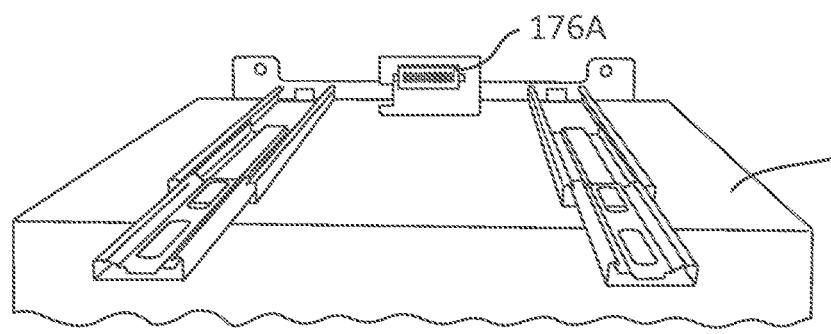
FIG. 16E shows an exemplary top of the chassis with the technology shelf removed in certain embodiments.

Data and power will be provided from the Tech Shelf to the chassis through connector 176 as shown in FIGS. 16B and 16E. Power to the drop safe is provided via power connector 376. Air vents 378 also are shown in the rear of tech shelf 300, although the air vents may be placed along the top, sides and/or front of the tech shelf.

To remove the tech shelf, screws 372 are removed and the tech shelf is gently slid forward along a pair of mounting rails 172 that are placed between the tech shelf and the chassis, as shown in FIG. 16B. The cabinet portion 174 of each mounting rail 172 is secured to the chassis, and corresponding mounting rails are secured to the underside of the tech shelf. Any suitably strong mounting rail (also generally known as a drawer slide) may be utilized. Moreover, cable connectors 176 that are exposed as shown in FIG. 16B are disconnected to facilitate complete removal of the tech shelf.

After the cables are disconnected, the tech shelf 300 is slid further forward along mounting rails 172 as shown in FIG. 16C. As tech shelf 300 continues to slide, the tech shelf is fully removable from the mounting rails, as shown in FIG. 16D. FIG. 16E shows the top of chassis 100, looking from the front of the drop safe, with the tech shelf fully removed. FIG. 16E shows one of the connectors 176A of cable connectors 176, with the tech shelf side connector removed.

FIGS. 17A-17G show a connection structure/technique between the tech shelf and the chassis in accordance with another embodiment of the present invention. In the embodiment shown in these figures, rather than employing screws, a latch plate extending from the chassis is employed to couple and lock the tech shelf in place.

Figure 17A:
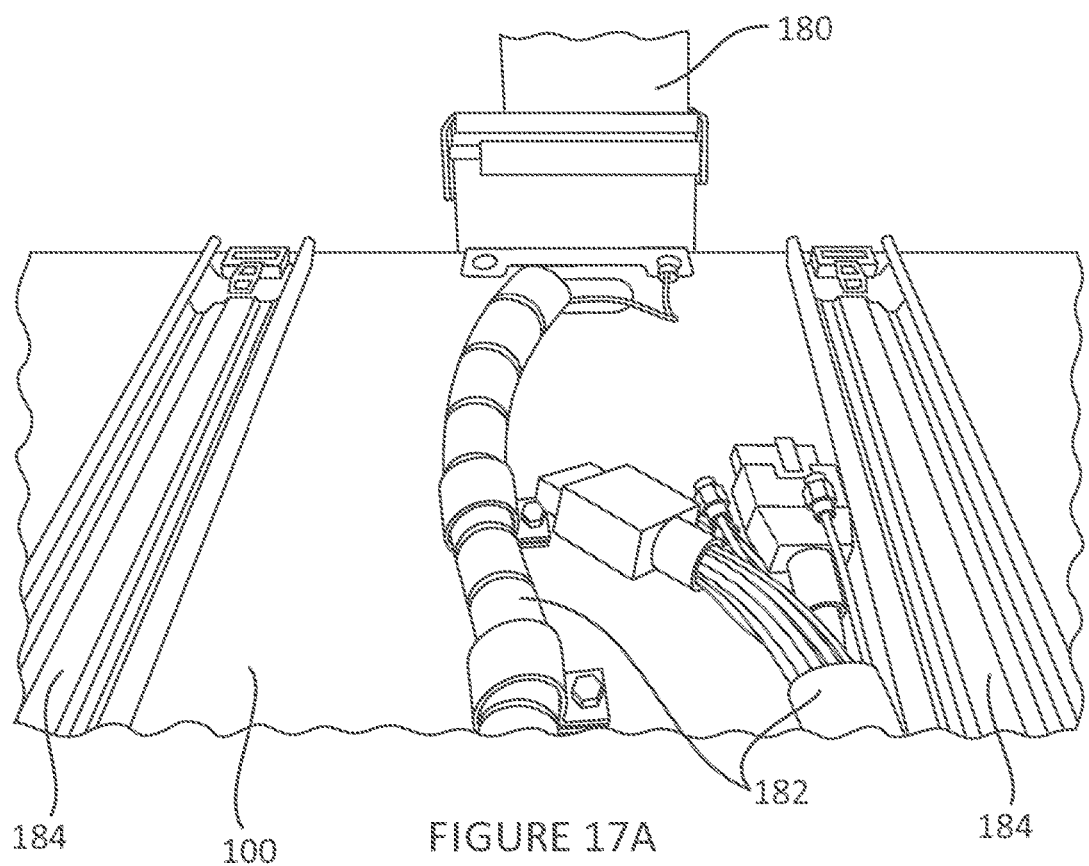
FIGS. 17A to 17G show various view of the interconnection between the chassis and tech shelf in accordance with another embodiment of the present invention.
Figure 17B:
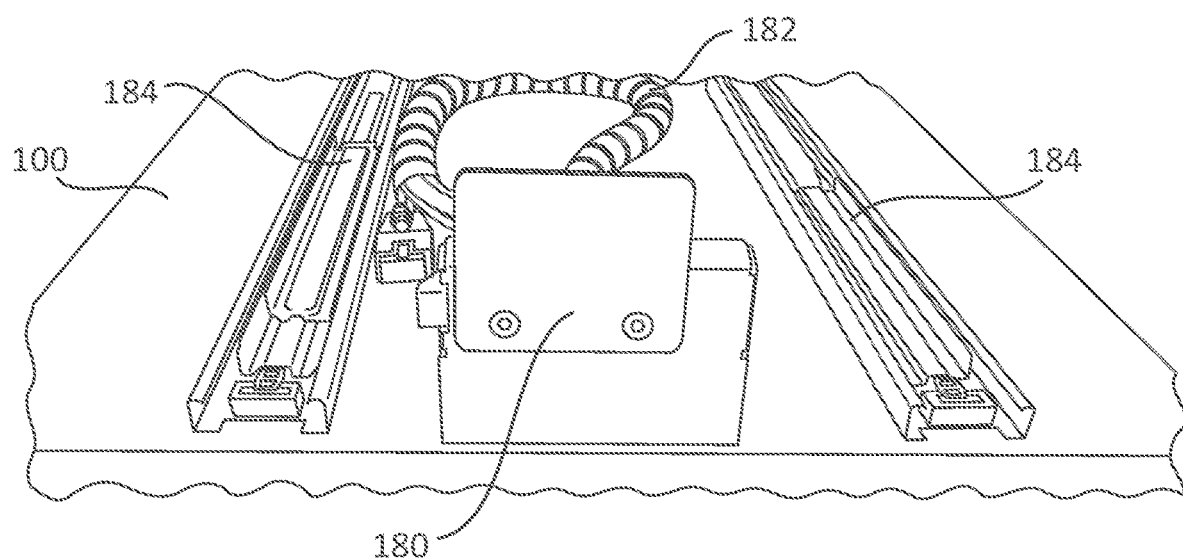

FIGS. 17A and 17B are front and rear views, respectively, of the top of chassis 100. As shown, a movable latch plate 180 extends upwards from the rear top edge of chassis 100 and serves as the locking mechanism that holds the tech shelf. A cabling harness 182 that extends through an opening in the top of chassis 100 holds the cables that extend between the tech shelf and both the chassis and the door. FIGS. 17A and 17B further show a pair of mounting rails 184, which serve the same function as the mounting rails in the embodiment described above with reference to FIGS. 16A-16E.

Figure 17C:
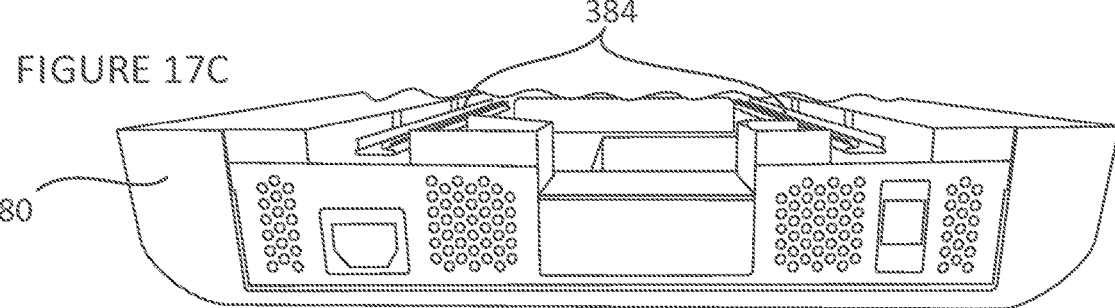
Figure 17D:
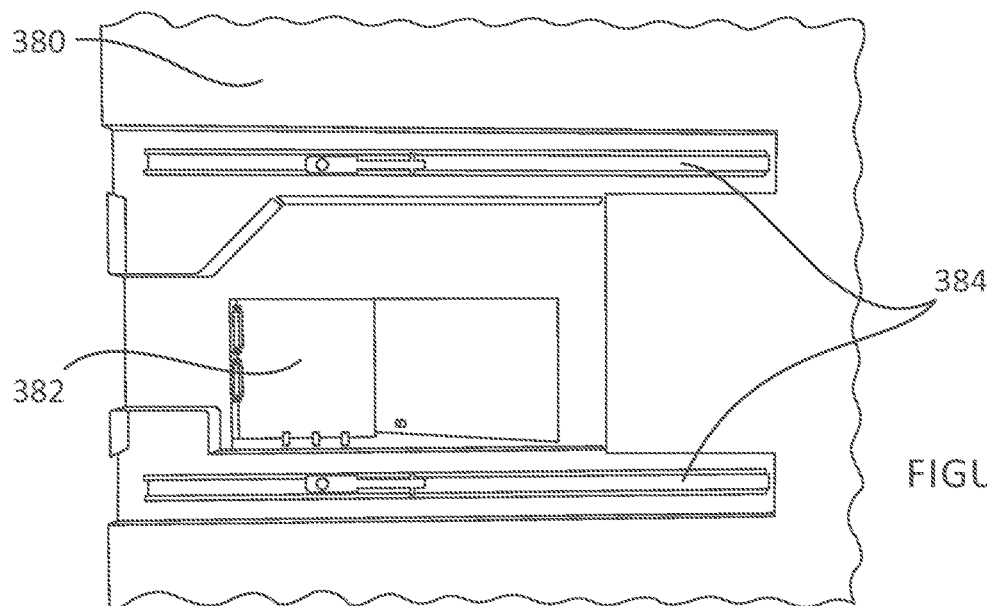
Figure 17E:
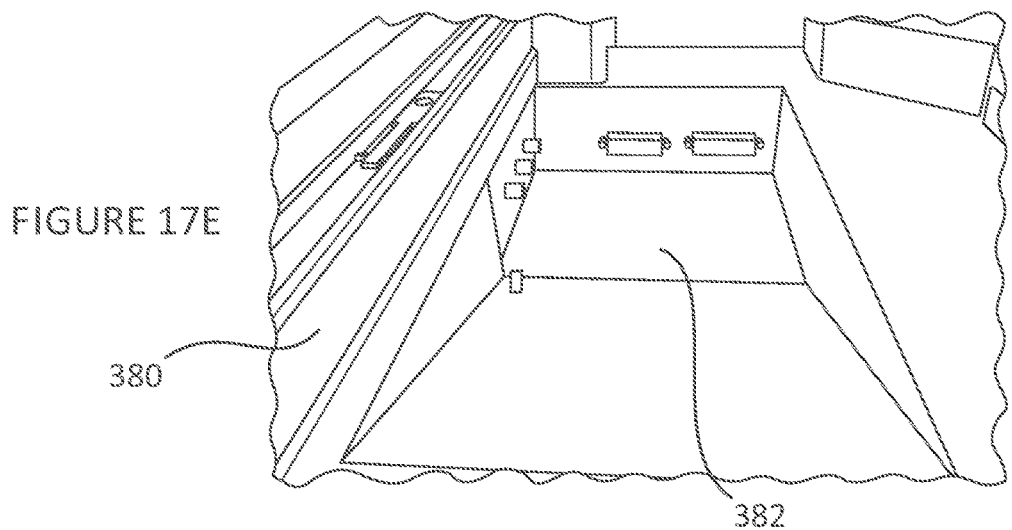

FIGS. 17C and 17D are rear and bottom views, respectively, of tech shelf 380 in accordance with this particular embodiment of the present invention (FIG. 17C shows the tech shelf upside down). FIG. 17E shows the bottom of tech shelf 380, and particularly shows a recessed area 382 that holds cabling harness 182 when the tech shelf is installed on the chassis. FIGS. 17C and 17D also show the tech shelf's two mounting rails 384 that slide along the chassis' mounting rails 184 during installation and removal (FIG. 17E shows a portion of one of the mounting rails).

Figure 17F:
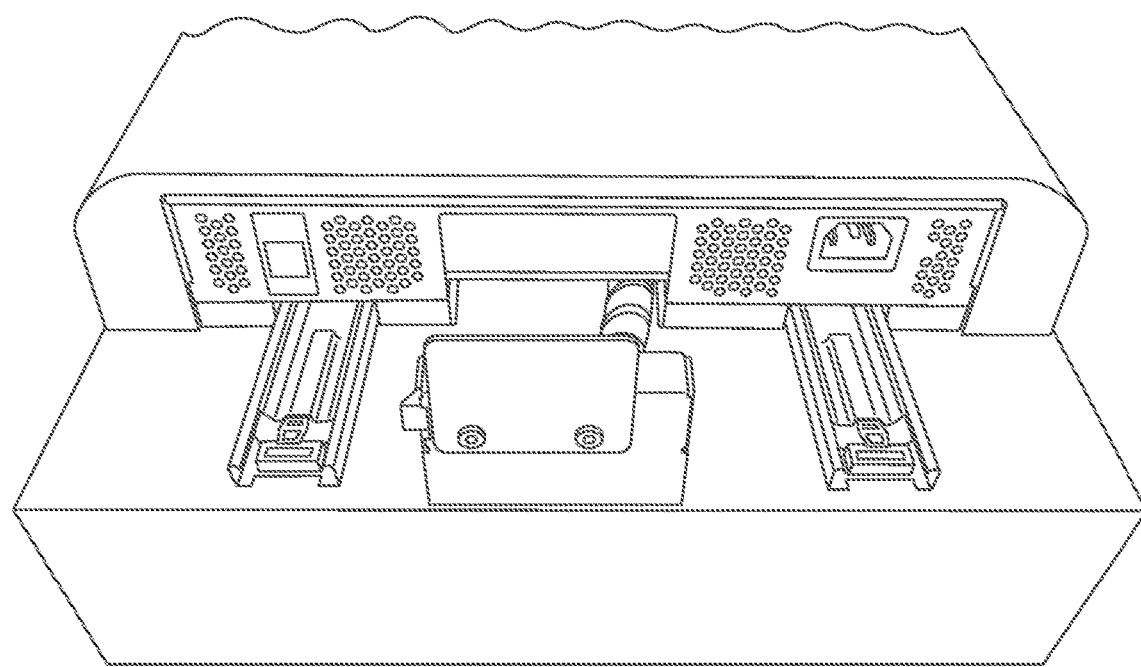
Figure 17G:
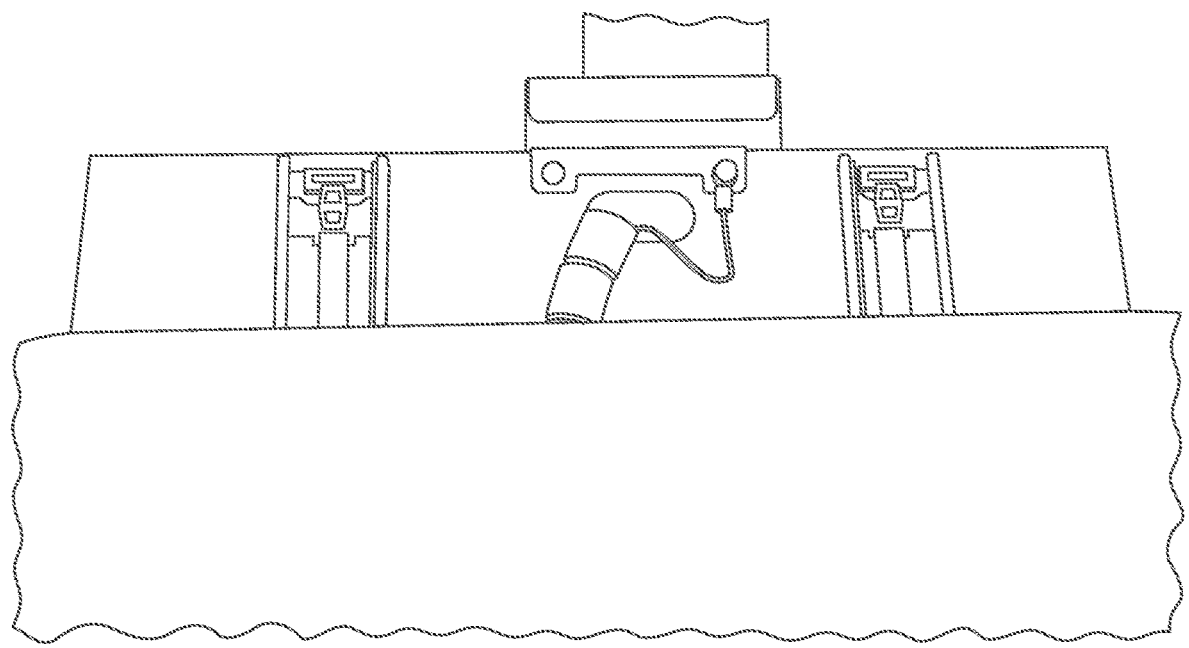

During installation, the cables extending through the cabling harness are appropriately connected and the tech shelf is slid, via the mounting rails, onto the chassis in the same manner as in the prior discussed embodiment. FIGS. 17F and 17G are rear and top views, respectively, that show tech shelf 380 partially on chassis 100. When tech shelf 380 is fully moved onto chassis 100, latch plate 180 latches onto the tech shelf, locking and securing the tech shelf in place. The latch may be spring-loaded or otherwise designed to automatically latch onto (i.e., secure) the tech shelf. In another version, the latch is designed to be manually moved to secure the tech shelf in place. Other types of mechanical latches may be employed to selectively secure the tech shelf.

To remove the tech shelf, the technician moves latch plate 180 to its unlocked position to release the tech shelf, at which point the technician slides the tech shelf forward along the mounting rails. Once the tech shelf is fully removed from the chassis, the cables are disconnected.

Upon removal of the tech shelf, the technician proceeds to install a new (or refurbished) tech shelf. To install, the above-described steps (depending on which tech shelf embodiment is employed) are carried out in reverse.

After the new tech shelf is physically installed, power is supplied to the drop safe and the new tech shelf is initiated and auto-programmed as described above.

In accordance with the present invention, the technician doesn't have to open the drop safe or otherwise have access to the dropped Smart Bags or other contents within the drop safe's chassis. The technician also doesn't diagnose the tech shelf on site, but rather the removed tech shelf may be diagnosed and, if necessary, repaired at a separate location. The tech shelves are removable and installable without any special equipment or knowledge of the operation of the tech shelf or any of its components.

In addition, the tech shelf is a modular component, that is, the same tech shelf may be utilized for any drop safe embodiment described herein. Accordingly, to replace a tech shelf, a modular new tech shelf may be mailed via a standard commercial shipping company, such as Federal Express or UPS, or delivered to the retailer location by other means. The tech shelf employs a lightweight cabinet and, thus, its total weight, including the weight of its components, falls well below the limits (e.g., 150 lbs) for using standard commercial shipping companies. Accordingly, when it is determined that the tech shelf of a drop safe needs repair, replacement or other type of servicing (including an upgrade), a new tech shelf is simply mailed to the retailer (or delivered in another way), and a technician visits the retailer and proceeds to replace the existing tech shelf with the new tech shelf in the manner described above.

It is appreciated that the particular shape and size of the tech shelf may be different than that shown in the figures. Moreover, the manner of how the tech shelf is fixed to the chassis may be different than that described herein. For instance, in a variation, the tech shelf is coupled to the chassis via appropriate secure mechanisms located at the front of the drop safe. In certain situations, the rear of the tech shelf of the drop safe may not be easily accessible, such as when the drop safe is installed underneath or within a cabinet that restricts access to the back of the tech shelf. Accordingly, the tech shelf of such variation is easily and quickly replaced. In particular, in the embodiment shown in FIGS. 17A to 17G, the latch plate that secures the tech shelf to the chassis can be moved sideways, in order to unlatch the tech shelf, via use of a suitable thin, elongated rod or other elongated tool in the event access to the rear of the drop safe is highly limited.

In yet another embodiment, rather than employing a fully mechanical latch or lock to secure the tech shelf to the chassis, an internal digital-driven lock may be employed that's controlled via use of short-range communication (preferably encrypted) between the technician's mobile device and tech shelf (via an appropriate app on the technician's mobile device). Since the construction and operation of internal digital locks and latches, as well as the necessary software to control them, are well known, further description is not provided except where necessary for an understanding of the present invention.

On-Site Conversion of One Type of Drop Safe to Another Type

In accordance with the present invention, one type of drop safe of the present invention can be converted quickly on site and without having to move the drop safe from its installed location into another type of drop safe of the present invention that has a different capability or capabilities.

For example, a Brink's Box can be quickly converted into a B-Safe. As another example, a Brink's Box, which is strictly a drop safe (i.e., doesn't accept individual notes), can be converted to a validating safe in accordance with the present invention. That is, a safe that does not include a bag drop slot (e.g., a B-Safe without a bag drop slot). As yet a further example, a B-Safe can be converted into a Recycler Safe. As yet another example, a Recycler Safe can be converted into a Brink's Box. Other conversions are possible.

As described herein, the drop safes of the present invention are modular in design and include the three main components of a chassis, door, and tech shelf. The chassis and tech shelf of the Brink's Box, B-safe, and Recycler Safe (and other embodiments/variations described herein) are identical (hardware-wise) and, thus, only the door needs replacement to convert the drop safe. In accordance with the present invention, the door of the drop safe is removed without the need to move the drop safe from its installed location. Then, the tech shelf of the drop safe is reinitialized, performs auto-detection, and then is auto-reprogrammed based on the type of the newly installed door, as previously discussed.

Accordingly, in the case of converting a Brink's Box installed and in use at a retailer location to a B-Safe, an authorized technician removes door 200 from the chassis of the Brink's Box, replaces it with a door 400 (employed within a B-Safe) and installs door 400 onto the chassis. The tech shelf then is reinitialized as discussed herein, which completely converts the drop safe into a B-Safe, with all the functionality, capability and benefits of a B-Safe. Conversion of other types of drop safes are carried out in like fashion.

Figure 18A:
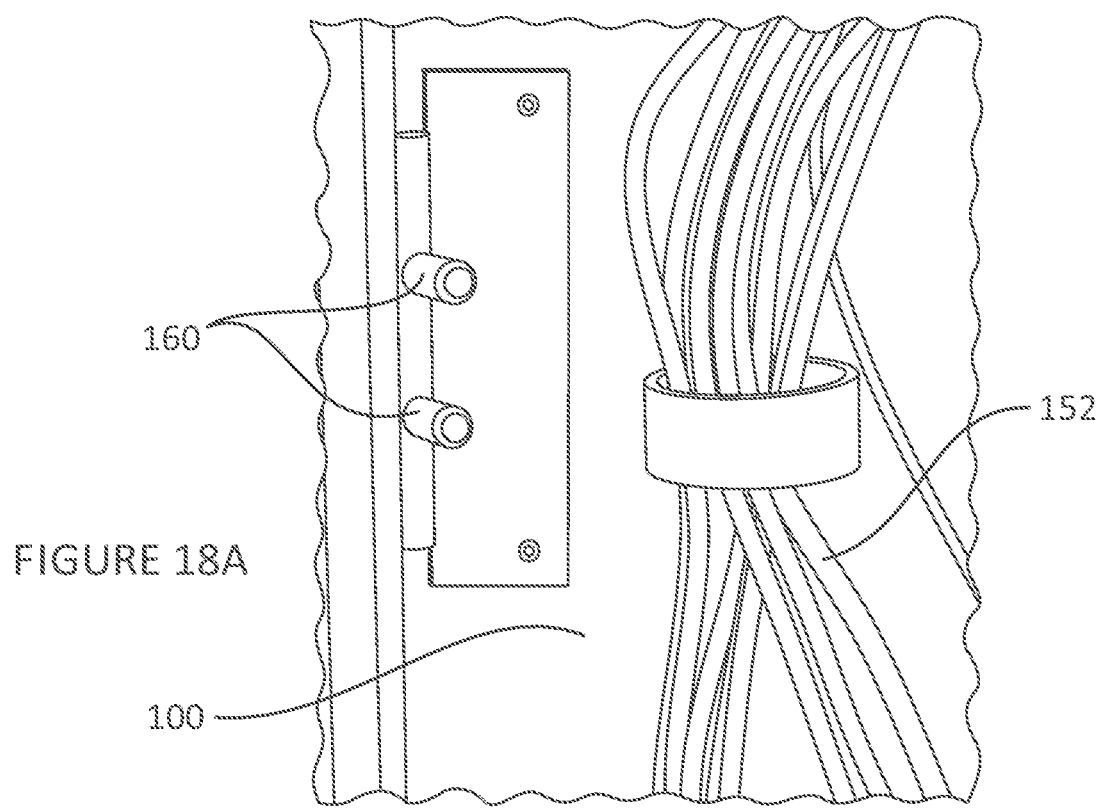
FIGS. 18A and 18B show structures for securing a door to a chassis in accordance with a particular embodiment of the present invention.
Figure 18B:
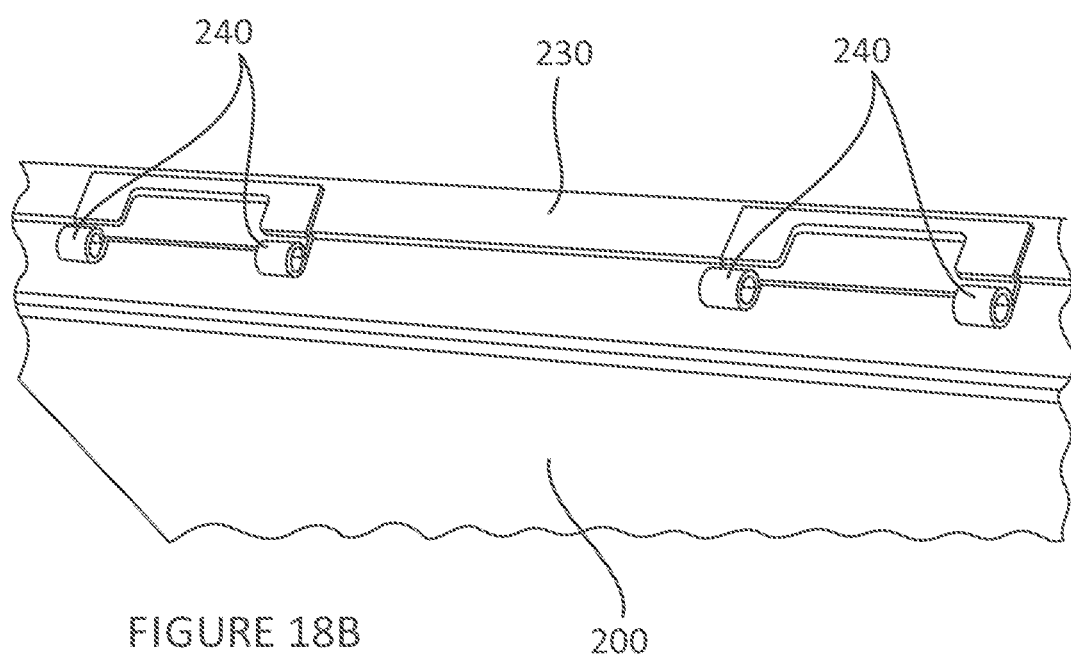

FIGS. 18A and 18B show structures for securing a door to a chassis in accordance with one particular embodiment of the present invention. In such embodiment, FIG. 18A shows a pair of locking pins 160 extending from the chassis that are used to securely hold a door (e.g., a Brink's Box door 200). The chassis includes three pairs of locking pins 160, one pair near the top of the opening for the door, one pair near the bottom of the opening, and one pair in the center of the opening.

FIG. 18B shows a portion of the edge 230 of door 200. Three pairs of round hinge knuckles 240 (only two pairs are shown in FIG. 18B) extend from the door's edge 230. Each pair of the hinge knuckles are placed on the door at locations that correspond to where a respective pair of locking pins are placed on the chassis.

In accordance with this embodiment of the present invention, each of the locking pins 160 on the chassis are depressible so that they can be moved between a locked position and an unlocked position. In the locked position, a corresponding pin portion extends through a corresponding hinge knuckle on the door. To unlock a pin, the pin is depressed and slid laterally to remove the corresponding pin portion from the hinge knuckle. FIG. 18A shows the two pins 160 in their corresponding unlocked position (closest to each other). After all six locking pins are operated and placed in their respective unlocked position, the door is fully removable from the chassis.

In a variation, a different number of locking pins and corresponding hinge knuckles (e.g., 10) are employed. In yet a further variation, the manner in which the locking pins unlock is different.

Accordingly, a door of the drop safe is removable in accordance with the present invention without the use of tools and generally is accomplished in just a few minutes of effort. Prior to actual removal of the door from the chassis, cables 152 (extending, through the chassis, between the tech shelf and the door) are disconnected. Any suitable cable disconnection technique or connector/disconnector device may be employed to allow for cable disconnection (and subsequent connection).

Thereafter, and in accordance with the present invention, a door 400 (designed for a B-Safe), for example, is installed to the chassis. The above-described steps to remove door 200 are reversed. In particular, door 400 is placed on the chassis so that the chassis' locking pins and door 400's hinge knuckles are aligned. Then, one at a time, each locking pin 160 is depressed and then, while depressed, slid into its respective locked position so that a corresponding portion of the pin is fed through a corresponding hinge knuckle on the newly installed door. Once in the locked position, the pin is released, thereby causing the locking pin to be locked in such position. After all the locking pins are in their respective locked positions and securely holding a respective hinge knuckle on the door, the new door 400 is fully secured to the chassis.

Cables 152 extending from within the chassis are then connected to the appropriate cable connector extending from the newly installed door 400. Tech shelf 300 is then reinitiated, performs auto-detection of the equipment within the newly installed door, communicates with the central server, and is auto-reprogrammed, as described herein.

Since the newly installed door 400 is identical to the removed door 200, except door 400 includes bill validators, door 400 is locked to chassis 100 in the same way door 200 was lockable to chassis 100. Moreover, the entire conversion process of converting the previously installed Brink's Box into a B-Safe is undertaken without the need for special door removal equipment, achievable in a relatively short period of time (e.g., under 15 or 30 minutes, if not quicker), and achievable without moving the safe from its current location.

The above-discussion of converting a Brink's Box into a B-Safe is exemplary and illustrative of the conversion capabilities of the present invention. Accordingly, any type of drop safe of the present invention can be converted into another type of drop safe by physically swapping out the original door with another door with a different set of capabilities, and then reinitializing the tech shelf as hereindescribed.

Figure 18C:
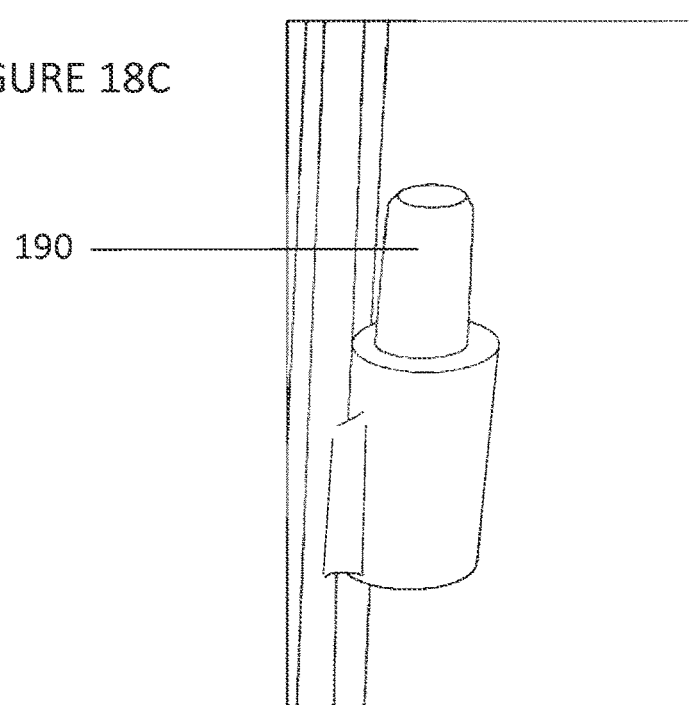
FIGS. 18C and 18D show structures for securing a door to a chassis in accordance with a further embodiment of the present invention.
Figure 18D:
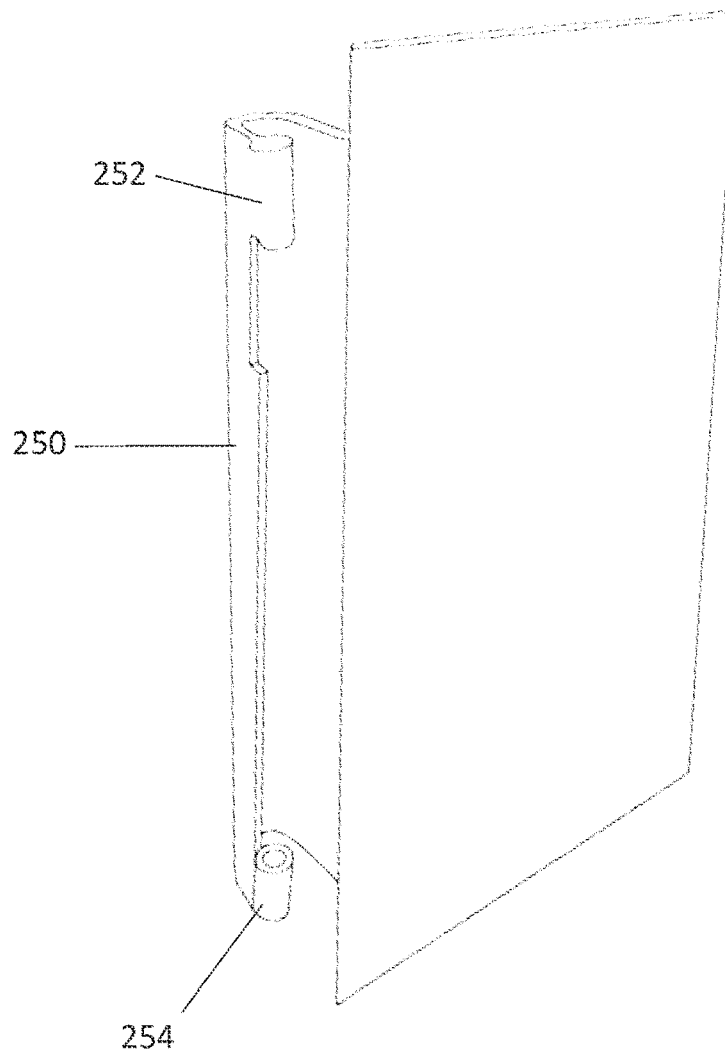

FIGS. 18C and 18D show another set of structures/technique for securing a door to a chassis in accordance with a further embodiment of the present invention. FIG. 18C shows the structure of each of the chassis' hinge pins 190 to which the door is attached (only one pin shown in the figure). In one version, two such pins are provided, one at the bottom of the door opening of the chassis and one near the top of the chassis' door opening. FIG. 18D shows the structure of a hinge sleeve 250 extending from the door to be mounted to the chassis.

Hinge sleeve 250 includes upper and lower hinge knuckles 252 and 254, which are aligned on the door to receive the respective chassis pins. Door removal entails raising the door when it is in its open position until the knuckles are completely above the pins. A new door then is easily installed by appropriately aligning the door's knuckles above the pins and slowly lowering the door in place. As in the other described embodiment, the cables are attached to the newly installed door and the tech shelf is reinitialized and auto-programmed to control the additional capabilities now provided in the newly installed door.

In a further version, the chassis includes three or more pins and the structure of the door's hinge sleeve includes a corresponding number of knuckles. With additional pins and knuckles extending along the height of the chassis and door, additional strength is provided and relatively tall doors can be accommodated.

Drop safes generally are bolted internally to a concrete floor or other support structure, and such drop safes ordinarily need to be unbolted or otherwise unsecured from its installed location in order for it to be serviced, upgraded, or otherwise replaced. The present invention obviates the need for any unbolting, unsecuring or moving of the drop safe to convert, for example, a previously installed Brink's Box into a B-Safe that includes bill validation capability. Advantageously, a retailer who has been utilizing a Brink's Box of the present invention is able to request and expect that the Brink's Box be changed to a B-Safe without any meaningful or substantial interruption to the retailer's operations. Likewise, other types of previously installed drop safes are easily convertible on site into drop safes that include additional or otherwise modified capability.

The herein-described structure and techniques for door removal and installation also advantageously enable for quick replacement of a faulty door (or a door with a faulty drop slot or other faulty component) without the need to unbolt or move the drop safe. In such instance, a new (or refurbished) door with the same capabilities can be quickly installed in the manner described herein to replace a faulty door.

The removed door is returned to an appropriate service center for analysis and, if necessary, repair. In any situation, the operation of the retailer (or retailers) who is using the drop safe of the present invention is not meaningfully impacted by the upgrade or otherwise replacement of the safe's door. As described earlier herein, the same is true in the event the drop safe's tech shelf needs repair or replacement.

As discussed, door replacement is accomplished in accordance with the present invention without any special tools or any tools at all. Unlike the drop safes used in the industry that include doors that are permanently attached to the safe's chassis, the present invention employs a removable door using specially designed hinges that allow for disconnection without tools. Moreover, the door hinges are internally placed and are inaccessible except by authorized personnel who are able to open the door in accordance with the techniques/processes described herein.

Deposit Creation Process

In accordance with the present invention, deposit creation is carried out utilizing a deposit creation software application (also called herein retail deposit application) of the present invention. The herein-described deposit creation software application (also referred to herein, for convenience, as "deposit creation app" or "retail deposit app") is developed by or on behalf of the cash processing facility. The cash processing facility may be the process facilitator described in U.S. Patent Application Publication No. 2018/0293649, which is incorporated herein by reference, or by another suitable entity that is facilitating or assisting in facilitating the processes of the present invention as described herein.

In accordance with the present invention, and with reference to flow chart 1000 shown in FIG. 19, a retailer's manager (or other designated, authorized personnel of the retailer) launches the retail deposit app on his/her mobile device to start the deposit creation process (Step 1010). Once the app is launched, the mobile device is in communication with central server 710.

The retail deposit app employs known security measures to ensure the authenticity of the mobile device and verification of the identity of its user (Step 1020). For instance, thumbprint or facial recognition technology (or other biometric data) may be employed to enable the manager to verify his/her identity during use of the deposit creation app, in addition to or in lieu of passwords or other security techniques. Since suitable security measures to verify mobile device and user identity are well known in the art, further discussion thereof is not provided herein except where necessary for an understanding of the invention.

In addition to known security measures, further security in accordance with the present invention may entail, in certain embodiments, using the deposit creation app only when the retailer's mobile device is located at an authorized location, such as only within the retailer's premises or only within designated areas within the retailer premises (e.g., within a designated back office(s) of the retailer). This may be achieved using the mobile device's GPS capability. Accordingly, the deposit creation app is designed to terminate or to provide only limited functionality when the retailer's mobile device is outside the designated, authorized location(s) of use.

Some retailers (or other involved entities) may desire to have further security measures. In accordance with the present invention, the deposit creation app may require (or select functionality may require) two-factor authentication. In certain embodiments, a second, designated person performs the second verification that is required. For instance, an SMS text message in the form of a unique code is sent to the second designated person who then must communicate that code to the manager desiring to create a deposit record. Other known techniques pertaining to two-factor authentication may be employed. Security techniques pertaining to multi-factor authentication may be employed, if desired.

During use of the retail deposit app, the manager identifies the total amount of the deposit (Step 1030). That is, the manager inputs this information into a deposit creation form on the mobile device. In a variation, the manager identifies the deposit details, which includes the number of each denomination of currency to be deposited (e.g., the number of $100 notes, $50 notes, etc.). The value of coins to be deposited, if any, is identified. In certain embodiments, if other things of value are to be deposited, then the identity and value (or perceived value) is identified. The retail deposit app auto-calculates the total amount of the deposit based on the information provided.

The retail deposit app may auto-populate certain information within the deposit record being created, including the name of the depositor (e.g., the manager), the identity of the retailer, the address of the retailer, etc. (Step 1040) The manager may include the name of the employee initially responsible for the money to be deposited, for example, the particular cashier who just finished his/her shift. Other helpful or desired information may also be included (Step 1050).

The current location of the manager's mobile device, using the mobile device's GPS, may be incorporated in the deposit record (Step 1060). The current location may be utilized to ascertain the particular retailer location, generally helpful if the retailer includes multiple locations and the manager is charged with conducting deposits at such different locations. The manager may be instructed by the retail deposit app to make the deposit into a particular drop safe (Step 1070). For security purposes, the manager may be instructed to make the deposit at the closest drop safe. If the retailer does not have a drop safe on its premises, the retail deposit app may instruct the manager as to the location of the nearest drop safe (e.g., into a drop safe located within a common area) and, in certain circumstances, provide walking and/or driving navigation instructions as to how to get to that nearest drop safe. If the facility at which that nearest drop safe is closed or inaccessible for another reason, then another drop safe is identified (e.g., the next closest drop safe).

The retail deposit app then instructs the manager to obtain a new Smart Bag. The unique ID of the new Smart Bag (also called the Smart Bag's ID) is ascertained by the manager's mobile device (Step 1080). In one embodiment, the manager uses the mobile device's camera to scan the barcode that is printed on the outside of the Smart Bag. In a variation, another form of unique indicia provided on the exterior of the Smart Bag is photographed/imaged by the mobile device that ascertains the unique ID of the Smart Bag.

In yet a further variation, the retailer's mobile device includes NFC capability (near-field communication), and/or iBeacon, or other appropriate RFID communication technology, and the mobile device obtains the ID of the RFID tag (or other electronic passive or active device) embedded within the Smart Bag to ascertain the Smart Bag's ID. Other information on or in the Smart Bag may be utilized to access its ID. If the Smart Bag includes the capability to audibly emit its ID, then the manager's mobile device may ascertain the Smart Bag's ID via use of the mobile device's microphone. In yet a further variation, multiple methods of identifying the Smart Bag's ID may be employed. Preferably, the ID of the RFID tag and the Smart Bag's ID are the same to remove the need to convert the accessed ID into the ID to be included within the deposit record.

The authenticity of the Smart Bag is verified by the central server based on the ascertained Smart Bag ID (Step 1090). If the Smart Bag is authentic, the manager is instructed to place the monetary deposit (or other things of value) into the Smart Bag and then to seal the Smart Bag (Step 1100). In addition to authenticity, the central server may reject the Smart Bag for other reasons. For instance, the Smart Bag may have been used multiple times beyond its usable life. The Smart Bag may inadvertently have been stamped with an ID that is already in use by another Smart Bag. Other reasons for not authorizing a Smart Bag are possible.

The Smart Bag may include any suitable sealing technique, such as a cover that includes an adhesive strip. Preferably, the Smart Bag is tamper-evident. If the Smart Bag is not authentic or is rejected for another reason, the manager is instructed to destroy the Smart Bag and to obtain another Smart Bag. If too many Smart Bags are determined to not be authentic, the central server flags the situation for further analysis as deemed appropriate.

The order of the steps during the deposit creation process may be different than that presented herein. For instance, the retail deposit app may instruct the manager to place the money within the Smart Bag in advance of the entry of certain information, or in advance of identifying the location of the drop safe to make the deposit, or other steps. Also, all the herein-described steps need not be carried out and/or additional steps as well as sub-steps may be included within the process.

The manager is requested to verify the accuracy of all (or select) information entered (Step 1110). Upon verifying the accuracy of the entered information, the retail deposit app (along with the central server) associates/saves the deposit record with the Smart Bag ID (Step 1120). The deposit record includes the manager supplied deposit information, along with the identity of the retailer, the manager, the location of the retailer (and the particular store, if applicable), date, time, and other appropriate information, including any other reference information, such as discussed in U.S. Patent Application Publication No. 2018/0293649.

It is noted that reference to certain steps carried out by the retail deposit app may also be achieved by a remote server (e.g., the central server) with which the manager's mobile device is communicating, or in other industry-acceptable manners. For convenience, the discussion herein talks of the retail deposit app performing certain tasks, but it is appreciated that such tasks may be implemented (or controlled) by other systems/processors as appropriate.

The manager then goes to the drop safe of the present invention that is placed at the retailer location or other location (Step 1130). At the drop safe, the manager seeks physical access to the drop safe in various ways in accordance with various embodiments of the present invention (Step 1140). That is, the manager presents to the drop safe proper identification of some sort, which is assessed by the drop safe's user and dropped item authorization module. This module, which is in the drop safe's tech shelf, verifies whether the item to be dropped is authorized to be dropped, whether the manager is authorized to access the drop safe, or both, depending on the particular embodiment of the drop safe (Step 1150).

In accordance with one embodiment, the user and dropped item authorization module includes a barcode/QR-code scanner/reader (identified as element 330 in FIG. 14B). To access the drop safe, the manager places the Smart Bag's barcode in front of the barcode/QR-code scanner/reader (sometimes also referred to as barcode/QR-code reader). The barcode/QR-code reader scans the Smart Bag's barcode to identify the Smart Bag's ID, which is transmitted to the central server for verification that access is authorized.

During verification, the central server verifies that a deposit record exists for the transmitted Smart Bag ID. The central server performs other verifications, including that the Smart Bag that is associated with the transmitted ID hasn't yet been deposited into a drop safe, that is, the status of the Smart Bag is undeposited (or other appropriate status). The drop safe being accessed should be authorized for use by the retailer associated with the Smart Bag. The deposit record should not be stale. That is, it is expected that Smart Bags be dropped within the designated drop safe within a set amount of time after creation of the deposit record. The set amount of time can be designated by the retailer or another entity, and can be different for different retailers, different drop safes, different drop safes of the same retailer, etc. Other assessments/verifications also may be made.

If the central server determines that access to the drop safe is authorized, such authorization is communicated to the drop safe, and the drop safe's bag drop slot is controlled to unlock (Step 1160). At this time, the tech shelf's light strip turns green to inform the manager that access authorized and the drop safe's bag drop slot has been unlocked. Other manners of informing the manager that access is authorized may be provided. For instance, an appropriate notification may be provided on the manager's mobile device (e.g., via the retail deposit app, or via an SMS text message, etc.). Another visible indicator on the drop safe may be provided as well as an audible indicator.

In accordance with another embodiment, the user and dropped item authorization module verifies that access to the drop safe is authorized by reading the RFID tag of the Smart Bag to be deposited. In this embodiment, the manager may place the Smart Bag, near, in or on a designated area, such as near the face of the tech shelf or other suitable location. The tech shelf may include a separate RFID reader dedicated for this purpose along with an associated RFID antenna within the tech shelf (or exterior to the tech shelf, but not placed within the chassis). In a variation, the RFID reader that reads the RFID tags of the Smart Bags within the chassis may be employed, along with a separate RFID antenna placed exterior to the chassis. The read RFID tag then is transmitted to the central server, which performs verification as described above.

In accordance with yet a further embodiment, another optical verification technique is employed that ascertains a unique visual characteristic of the Smart Bag. In yet other embodiments, other electronic means may be employed. Moreover, any of the techniques mentioned herein for identifying the Smart Bag ID by the manager's mobile device (as earlier discussed) may be employed by the drop safe.

Instead of establishing access to the drop safe by identifying the Smart Bag to be dropped, the drop safe in certain embodiments provides access upon verifying that the manager (or other employee) is authorized to access the drop safe. Several embodiments are as follows.

In one embodiment, the manager places his/her badge in front of the tech shelf's barcode/QR-code reader. The reader scans the barcode (or QR code or other indicia) printed on manager's badge that uniquely identifies the manager. The scanned data is transmitted to the central server, which verifies that the individual associated with the scanned data is authorized to access that particular drop safe. The central server then communicates that authorization is provided to the drop safe that, in turn, unlocks the bag drop slot.

In certain circumstances, access to select authorized individuals of a retailer may be restricted. Certain individuals may be time-restricted. For example, select employees may be restricted to access the drop safe only for a set period of time immediately following the end of that person's shift. Restrictions may be based on other factors, which may be set by the retailer's authorized management or other personnel.

In another embodiment, the manager's badge (or other retailer issued item) includes an RFID tag with an ID that uniquely identifies the manager (e.g., an NFC badge). In this embodiment, a suitable RFID reader (or other appropriate reader) within the drop safe reads the ID of the RFID tag within the manager's badge. Like the embodiment above, that ID is transmitted to the central server for verification.

In further embodiments, the manager's badge (or other thing that the manager carries around) includes other printed or otherwise displayed indicia or other technology (passive or active) on or in the badge that is detected in any manner that a Smart Bag is uniquely identified (by either the mobile device or the drop safe) as discussed herein.

As used herein, the term badge refers to any item that is issued by the retailer (or agent or other authorized entity) that includes data that uniquely identifies the designated carrier of that item. The data may be in the form of printed information (barcode, QR-code or other printed indicia including the person's name). The data may be digital data that is included within a passive or active device within or on the item designated to be carried by the individual. The data may be in the form of an audible sound. The data may be a combination of the foregoing.

In a further embodiment, the drop safe's user and dropped item authorization module includes facial recognition technology and processing capability to identify the manager. In such embodiment, the module includes or otherwise is in communication with an appropriate camera that images the manager's face when in close proximity to the drop safe. In such situation, authorized personnel are required to establish a data record (stored at the central server or other designated server) that includes imaging of their face, head, etc., for this purpose. Since facial recognition systems and processes are well known, further description is not provided except where particularly necessary for an understanding of the present invention.

In yet other embodiments, the drop safe employs other biometric information of the manager to identify the manager desiring to access the drop safe. Biometric identification may include fingerprint recognition, eyes (iris and/or retina) recognition, hand geometry recognition, voice recognition, signature recognition, and other appropriate things that enable systems to uniquely identifier individuals. Accordingly, in such embodiments, the drop safe includes suitable equipment and software, which may be included within the tech shelf or in communication with the tech shelf (e.g., a box of some sort fixed to the drop safe or placed reasonably close to the drop safe). Since the technology, equipment and operation of verifying identity using biometric information is well known, further description is not provided except where particularly necessary for an understanding of the present invention.

In accordance with yet further embodiments of the present invention, the retail deposit app on the manager's mobile device is used by the manager to request access to the designated drop safe.

In one such embodiment, a request by the manager (via the app) is communicated to the central server, which in turn assesses whether access should be authorized. The central server perform verification, including any of the verifications and assessments mentioned in the other embodiments described herein. In addition, the central server verifies that the manager's mobile device is very close to (e.g., within several feet of) the designated or authorized drop safe using the GPS functionality of the mobile device. The acceptable distance of the manager to the drop safe may be customized for each retailer (as well as each drop safe of a retailer) and may be established based on any number of suitable factors (e.g., size of the back office, whether the drop safe is in a public location, number of employees authorized to be in the back office, etc.).

In another embodiment, during the manager's request for access, the manager's mobile device establishes communication directly with the drop safe using any appropriate short-range protocol (e.g., Bluetooth, NFC, etc.). The location of the manager's mobile device may also be provided as additional security that the mobile device is very close to the drop safe to be accessed. Depending on the particular embodiment of the drop safe, access to the drop safe may be initiated without communication to the central server or may require communication to and authorization by the central server.

In yet further embodiments of the present invention, multiple forms of identification and verification are required to gain access to the drop safe. That is, the drop safe's bag drop slot does not unlock until any two (or more) of the above-discussed forms of access are carried out. For example, in one embodiment, a manager desiring to deposit a Smart Bag into the drop safe must first have his/her badge scanned by the drop safe (to identify the manager) and then have the barcode on the Smart Bag to be deposited scanned (to identify the specific Smart Bag to be deposited). The ascertained IDs of the manager and the Smart Bag are transmitted to the central server for verification.

As another example, both a request by the retail deposit app on the manager's mobile device and identifying the Smart Bag to be deposited (via any way mentioned herein) must be carried out before access is authorized.

As a further example, access is provided only after the manager is identified via facial recognition (e.g., while immediately standing in front of the drop safe) and the ID of the Smart Bag to be deposited is ascertained. Other numerous exemplary embodiments that require at least two forms of verification are achievable given the discussion herein.

In yet other embodiments, a manager may be given access to a drop safe if the manager carries out one of any number of authorized procedures. For example, a particular drop safe at a retailer location may provide access if the manager's badge is scanned or the barcode of the Smart Bag to be dropped is scanned. Numerous other exemplary embodiments are possible. Moreover, access to different drop safes may entail or otherwise require different forms of verification.

Deposit of Smart Bag Into Drop Safe

Once access is provided and the drop safe's bag drop slot is unlocked, the manager proceeds to open the slot and places the Smart Bag within it. The manager releases the slot, which causes the Smart Bag to be dropped inside the drop safe's chassis (Step 1170). The bag drop slot then is immediately locked (Step 1180).

If access to the drop safe is not authorized, the bag drop slot remains locked. Depending on the reason why access is not provided, the manager may or may not be notified of the reason for denying access.

In the numerous embodiments for accessing the drop safe as discussed herein, the drop safe allows for the drop of a single Smart Bag when the bag drop slot is unlocked. However, in variations of the embodiments described, as appropriate, a designated action by the manager (during his/her request to access the drop safe or after access is authorized) will cause the bag drop slot to remain unlocked for a predetermined amount of time (e.g., 1 minute, 2 minutes, 3 minutes, 5 minutes, etc.) to allow the manager to drop multiple Smart Bags within the drop safe.

An exemplary designated action that results in the bag drop slot remaining unlocked for a preset amount of time includes the manager causing his/her badge to be scanned twice within, for example, a five (5) second period. Another exemplary action includes scanning the barcode of a Smart Bag to be dropped twice within a period of time. A suitable request via the retail deposit app may be employed. Other appropriate actions may also be established to cause the bag drop slot to remain open for a period of time.

During such period of time when the bag drop slot remains open (also referred to herein as a "session"), the manager proceeds to drop each Smart Bag into the drop safe, one at a time, via the drop safe's bag drop slot. In a variation, the bag drop slot is large enough to hold more than one Smart Bag, whereupon the manager is able to place multiple Smart Bags into the bag drop slot and then proceed to have those Smart Bags deposited into the drop safe.

In advance of dropping multiple Smart Bags within the drop safe, a deposit record has to be created for each Smart Bag to be deposited. By allowing multiple Smart Bags to be dropped within a single session, the manager is able to quickly carry out this function. In some instances (e.g., in larger retail establishments), a manager may have to deposit a relatively large number of Smart Bags (e.g., 5 Smart Bags, 10 Smart Bags, etc.). By enabling the manager to deposit more than one Smart Bag during a session, this task can be achieved extremely quickly, often taking no longer than a minute or two.

Identifying the Dropped Smart Bags

In accordance with the present invention, the drop safe's dropped item identification and authentication module identifies the Smart Bags that are in the drop safe (Step 1190).

In accordance with certain embodiments, the dropped item identification and authentication module employs the previously described RFID reader placed within the tech shelf along with RFID antennae placed within the chassis to identify the IDs of the RFID tags embedded within the Smart Bags that have been dropped into the drop safe. As discussed herein, the IDs of several hundred RFID tags can be identified within a few seconds. Accordingly, the IDs of all the Smart Bags within the drop safe are ascertained extremely quickly, taking likely under a second in most instances.

In accordance with the present invention, the drop safe is programmable or otherwise controlled to take an inventory of its contents at different times. In particular, the drop safe can ascertain the IDs of the dropped Smart Bags at any of the following events: upon unlocking the bag drop slot, upon locking the bag drop slot, upon verifying access is authorized (prior to unlocking the bag drop slot), upon creating a deposit record, at the start of a retailer's business day, upon close of the business day, upon messenger request for access to the drop safe to empty (discussed below), upon providing access to the drop safe for emptying, upon closing the drop safe's door after emptying the contents, upon request to service the tech shelf, upon request to swap out the drop safe's door, after installation and initialization of a newly installed tech shelf, after installation of a new door, at regular intervals of time (e.g., every 3 minutes, 5 minutes, 10 minutes, 15 minutes, 25 minutes, 60 minutes, etc., at irregular or random (or pseudo-randon) intervals of time, and/or at other desired times. In certain embodiments, the drop safe is controlled to take inventory upon occurrence of multiple ones of the foregoing events.

In accordance with other embodiments, the dropped item identification and authentication module employs visual/optical recognition of identifiers on the dropped Smart Bags by employing cameras and/or other optical sensors within the door and/or within the chassis. Suitable unique visual identifiers include barcodes (including 3D barcodes), QR-codes, other indicia on the Smart Bag or physical attributes of the Smart Bag.

In further embodiments, the dropped item identification and authentication module employs other electronic identification technology including magnetic readers and audible detection (e.g., microphones). The Smart Bags include corresponding indicators.

In yet additional embodiments, the dropped item identification and authentication module employs a combination of the foregoing identified identification technologies.

The drop safe of the present invention further identifies the ID of the Smart Bag that has just been deposited (or that was last deposited) into the drop safe (Step 1200). At such time, the deposit record associated with the identified ID of the Smart Bag that was just deposited is updated to reflect that the Smart Bag is contained within the drop safe and that the contents of the Smart Bag now are in possession of the cash processing facility via its drop safe (Step 1210). At this point, the deposit of the Smart Bag is complete.

In the embodiments employing an RFID reader (along with RFID antennae), the ID of all the Smart Bags within the drop safe are identified each time an inventory is taken. Accordingly, as each Smart Bag is dropped into the drop safe and the drop safe's contents are re-inventoried, the drop safe (along with the central server) is able to identify the identity of the newly dropped Smart Bag. Likewise, if multiple Smart Bags are dropped (e.g., during a single session), the identities of all those newly dropped Smart Bags are ascertained upon re-inventory. The deposit records associated with those newly dropped Smart Bag are updated to reflect that they have been received within the drop safe.

In the embodiments employing visual/optical recognition, suitable optical equipment (e.g., cameras) may be placed within the door's bag drop slot or other location within or on the interior of the door, or within the chassis to identify the Smart Bag during the drop or immediately thereafter. Similarly readers/technologies employing other detection techniques may be placed within the door and/or chassis, and controlled by controllers placed within the tech shelf.

In these various embodiments, the drop safe is able to verify if and when the Smart Bag that is associated with a newly created deposit record has been deposited within the designated drop safe. Similarly, if the identity of a Smart Bag was used to gain access to the drop safe, the drop safe is able to identity if and when that particular Smart Bag was dropped into the drop safe.

The drop safe further verifies that all previously dropped Smart Bags are still within the drop safe (Step 1220). That is, it is verified that a previously dropped Smart Bag has not been impermissibly removed from the drop safe (e.g., fished out via the bag drop slot or removed in some other manner).

The cash processing facility provides the retailer with a credit to its bank in the amount associated with the amount of money within the deposited Smart Bag (Step 1230). In a variation, the credit is provided at the end of the business day of the retailer or at other designated time, whereby the total credit provided represents the cumulative value of the deposited Smart Bags. Further details and variations regarding providing credit to retailers are provided below.

In accordance with the present invention, the drop safe ascertains the IDs of the Smart Bags that have been deposited, and the deposit records associated with those Smart Bags are updated accordingly. The deposit records include all potentially relevant information, including (along with the information and data mentioned earlier) whether a Smart Bag was deposited together (i.e., during the same deposit session and/or around the same time) with other Smart Bags of that retailer (with the identities of those other Smart Bags), the manner of access to the drop safe, the date/time of the drop, the identity of the depositor, and other potentially relevant information. Accordingly, the chain of title of each dropped Smart Bag is tracked from the initiation of a deposit creation all the way through its deposit within a particular drop safe.

In accordance with the present invention, in each of the embodiments and variations described herein, the manager via his/her mobile device is provided with information about the Smart Bag or Smart Bags that have been successfully deposited in the drop safe. For instance, a short message may be provided that simply indicates that the deposited Smart Bag(s) has been received by the drop safe. The message may be provided via the app on the mobile device, via an SMS text message, via email or other appropriate manner. The information provided to the manager may be more detailed and include any relevant information about the deposits, such as the amount in the Smart Bag, the date/time of deposit, etc. (including any information in the deposit record).

In the cases in which multiple Smart Bags are deposited within a short period of time (e.g., a few minutes), the manager may be provided with confirmation on the mobile device that the Smart Bags having particular IDs have been accepted, along with other information such as the respective amounts of money within each dropped Smart Bag, and/or the total amount of money represented by all the dropped Smart Bags.

The information provided to the manager via the mobile device may be an abbreviated version of the report that is generated and accessible to the retailer via a portal that enables the retailer to set up accounts for individual employees, access deposit records, and other financial and non-financial information. Since a portal and data that is accessible to retailers about their financial and non-financial information are well known in the art, further description thereof is not provided except where necessary for an understanding of the present invention.

The drop safes of the present invention employ technology that identify its contents. As discussed above, the contents can be inventoried and re-inventoried at various times. If a Smart Bag is determined to be missing from a drop safe, alerts are communicated to the system for appropriate actions and handling.

In another variation of the above-described embodiments, a manager of a retailer may utilize a general-purpose computer, such as a desktop computer or a laptop computer, to generate a deposit record. In such variation, a software application residing on the computer may be employed or the manager may access a designated web site that facilitates the deposit creation process (or via other known process using a computer). The computer's camera is employed to scan the barcode of the Smart Bag. In the absence of a camera, the number ID that is printed on the outside of the Smart Bag may be manually entered by the manager (or other person) into the computer. Other appropriate techniques for ascertaining the ID of the Smart bag may be employed.

It is appreciated that the processor(s) within the drop safe's tech shelf control the various components of the drop safe, including, for example, the bag drop slot, and such control may be implemented or determined, or otherwise assisted, by communications from the central server. The discussion herein is presented for convenience as the drop safe performing such actions, but the invention incorporates other control scenarios, including control of all or some of the components of the drop safe by the central server (or by another suitable controller, as would be appreciated in the art).

Bill Insertion Process

The B-Safe of the present invention includes equipment/technology that accepts notes recognizes its denomination, verifies its authenticity, and dispenses the note into the drop safe's chassis. Other embodiments of the drop safe may employ such equipment/technology. For convenience, the following discussion is presented in terms of using such equipment within a B-Safe of the present invention. However, it is understood that the discussion equally applies to other drop safes of the present invention that likewise accept individual notes.

In an illustrative embodiment, the B-Safe includes a pair of bill validators to enable the manager to manually deposit notes. In accordance with the present invention, and with reference to flow chart 1300 shown in FIG. 20, a manager (or other designated person) seeks access to the B-Safe (Step 1310). The B-Safe determines if access is authorized (Step 1320) and, if so, the B-Safe signifies to the manager that access is authorized (Step 1330). At this time, an active deposit session is initiated.

In accordance with different embodiments of the present invention, the manager seeks access to the B-Safe in various manners. In one embodiment, the user and dropped item authorization module of the tech shelf employs the above-discussed barcode/QR-code scanner for this function. In such embodiment, the manager places his/her badge in front of the B-Safe's barcode/QR-code scanner, the barcode (or other indicia) on the badge is read, and then the drop safe (along with the central server) verify whether that individual is authorized to access the B-Safe. The manner of verifying whether access is authorized is as described above in connection with verifying access to a Brink's Box (including all described variations, as appropriate).

The manager seeks access to the B-Safe in other manners in accordance with further embodiments of the present invention. In particular, any of the foregoing described manners for seeking access to a drop safe to deposit a Smart Bag may be employed. For instance, an RFID tag embedded within the manager's badge may be read by a suitable reader to ascertain the manager's identity. Other indicia on the manager's badge or other technology on or in the badge may be employed.

In yet other embodiments, facial recognition or other biometric information may be obtained and then utilized to identify the manager, followed by verifying whether the identified individual is authorized.

In further embodiments, the manager's retail deposit app may be employed, whereupon the manager makes an appropriate request (via the app) when he/she is in close proximity to the B-Safe.

Multiple forms of identification may be required before access to the B-Safe is provided. In yet other embodiments, the manager may seek access via any one of a number of authorized methods.

In yet other variations, access to the B-Safe's bill validators may be achieved simultaneously upon access to the B-Safe's bag drop slot. Accordingly, any of the above-described embodiments/techniques for causing the bag drop slot of a drop safe to open may be employed to gain access to the B-Safe's bill validators.

In any of these embodiments and variations thereof, the equipment, techniques, and methodologies that have been described to gain access to the bag drop slot may be employed to gain access strictly the bill validators of a drop safe.

Once access to the bill validators is authorized, an appropriate signal is provided to signify to the manager that he/she may begin depositing notes (Step 1330). In one version, the B-Safe's light strip changes from blue, which represents an idle state, to green, which represents an active deposit session. Other color systems may be employed and/or other manners of notifying the manager of active session may be used.

During the active session, the manager proceeds to insert notes, one at a time, into either (or both) bill validator (Step 1340). As a bill validator receives an individual note, the bill validator ascertains its denomination and verifies its authenticity (Step 1350). If authentic, the note is accepted and fed into the B-Safe's chassis (Step 1360). Data identifying the denomination of each accepted note, the number of each denomination accepted, the total value of the accepted notes during the session, date/time of acceptance, and other relevant information is maintained within the tech shelf's processor and other appropriate processor(s) (e.g., the central server).

If the note is not authentic or meaningfully damaged, the note is not accepted and returned. Since the manner and operation of a bill validator is well known in the art, further description of determining denomination and validating a note, as well as the mechanical equipment for accepting and feeding notes, are not described herein except where necessary for an understanding of the present invention.

Accepted notes fall into a bin placed within the chassis. A single, sufficiently large bin is placed beneath both bill validators and catches notes that pass through either of the bill validators (Step 1370).

During this process, the manager is provided on his/her mobile device in real-time with the monetary amount of the notes that have been accepted by the bill validators (Step 1380). The information may be provided to the manager via the mobile device in various manners. In one version, the manager launches (or has already launched) the above-described retail deposit app and the information is provided through the retail deposit app. The manager may launch a different app that is dedicated to the bill insertion process. If preset and desired, the information may be provided to the manager via text messages, email or other messaging system that is supported by the mobile device.

The information provided may be the total amount of the monetary deposit at the completion of the session. The information provided may include the total amount of the monetary deposit as the session proceeds, with the monetary amount identified on the mobile device increasing as notes are fed into and accepted by the bill validators. The information may include a breakdown of the deposit by denomination (e.g., number of $100 notes, number of $50 notes, etc.). The information provided may be in numerical form and/or in graphical form. For instance, as a bill (e.g., a $100 note) is accepted by one of the bill validators, the mobile device may display a graphical representation of that note. Other techniques for providing feedback to the manager during and/or after the bill insertion process may be employed.

When no notes are received by the bill validators for a preset period of time, such as 20 seconds, 40 seconds, one minute, two minutes (or other preset length of time), the deposit session terminates and the bill validators are controlled to no longer accept any notes (Step 1390). In a variation, the B-Safe may be programmed to keep the deposit session active until a preset time of day (e.g., one hour after the close of business), or when a designated event occurs, such as the depression of the B-Safe's LCD Screen/Button 340, the scanning of the badge of that manager, or other designated action.

During the active session, if a second employee seeks access to the B-Safe (via any appropriate technique of any appropriate embodiment/variation) (e.g., such as by having his/her badge scanned by the B-Safe's barcode/QR-code scanner), then the current deposit session (for the prior individual) terminates and a new active session begins. The new active session is associated with the second employee. Each drop safe can be configured to initiate an active session and to terminate an active session according to the respective retailer's preferences.

As stated earlier, the forgoing discussion applies equally to other types of drop safes that employ bill validators or other technology that is able to accept a note, ascertain its denomination, verify its authenticity, and dispense the verified note within the drop safe's chassis.

In other embodiments of the present invention, such as the recycler safe, access to the small form factor cash recycler by the manager (or other personnel) may be achieved in any manner that the bill validators may be accessed as described herein. Likewise, in yet further embodiments of the present invention that employ different equipment/different functionality, access to such equipment/functionality may be achieved in numerous ways.

In any of the embodiments described herein, entitlements associated with individual employees, that is, the capabilities that employees of retailers can carry out either via any of the herein-described apps (or other software applications) and/or directly with a drop safe (or multiple drop safes) may be dynamically managed within the central server to tailor authorizations and functionalities based on retailer preferences and other factors. For instance, higher level management generally will be provided with the highest level of abilities while lower level employees will be provided with more restrictive abilities.

Various functionalities and abilities include creating a deposit record, obtaining access to a drop safe's bag drop slot, obtaining access to a drop safe's bill validator or other equipment that accepts individual notes, obtaining access to a drop safe's recycler, obtaining access to other technology within the drop safe, the times/days any such access is provided and/or the criteria under which access is provided (e.g., only during and/or one's shift), the length of time access is made available, etc. The manner access to a piece of equipment may also be different depending on the level or other designation of employees. Based on a retailer's preferences, select employees may only be able to access a certain piece of equipment within the drop safe one way (as preferred by the retailer), whereas other employees may be able to access such equipment in multiple ways. For example, select employees may access the bill validators only upon having their badge scanned by the drop safe, whereas other higher level employees may use the retail deposit app to get access, along with the option of having their badge scanned, and/or using another technique for access.

For a retailer that is associated with a single drop safe, entitlements and access abilities of that retailer's employees are limited solely to the associated drop safe. For retailers that are associated with multiple drop safes (whether those drop safes are within the same facility or different facilities), the ability to access those multiple drop safes may be the same or different for each particular employee who is being provided access.

In any of the embodiments and scenarios provided herein, the present invention is able to quickly, if not immediately, respond to changed or changing circumstances. In accordance with the present invention, a retailer may designate the entitlements/access abilities based on job title and/or other status and designations associated with each employee. Then, when the title, status or designation of an employee is changed, that individual's entitlements and access abilities are automatically modified to conform with the updated title/status/designation. Accordingly, retailers need not have to remember to manually change a particular employee's designated entitlements when circumstances change. Beyond job title, position, and the like, other status or designation can include location (e.g., when an employee is transferred to a different retail location), a switch from full-time to part-time (or vice versa), working hours, termination, etc.

In accordance with the present invention, an employee can be provided with entitlements/access abilities that enable him/her to handle deposits from multiple retailers. For example, an individual is able to collect deposits (i.e., collect Smart Bags) from multiple companies and to deposit those multiple Smart Bags into a designated drop safe. The Smart Bags are associated with different retailers, but a single individual is handling and depositing those Smart Bags into a drop safe. To ensure proper tracking, in one embodiment, access to the drop safe's bag drop slot must entail the individual providing his/her badge, biometrics, or something else that particularly identifies the individual. That is, access is not achieved via the drop safe identifying a Smart Bag to be dropped. In another embodiment, the individual must use his/her mobile device to gain access. In yet a further embodiment, the individual must use his/her mobile device along with a badge (or biometric information) to identify him or herself in order to gain access. Other scenarios, as discussed herein, are possible.

Hence, the present invention is able to employ a combination of verifications and authorizations, including location tracking of the individual and the location of the drop safe, to handle and process deposits from any number of retailers, and whether the particular drop safe is placed at a retailer location or a common area. Moreover, by associating Smart Bags with a designated drop safe at the time of creation of a deposit record, changes to locations of drop safes result in an automatic alignment of deposits to those moved drop safes. Conversely, decisions about where to locate drop safes that are not necessarily associated with a particular retailer may be made based on recent historical data pertaining to the created deposit records of retailers.

Advance Credit

In accordance with the present invention, upon depositing Smart Bags via the drop slots and/or cash via the bill validators, the retailer who made the deposit is provided with a credit to its bank account in the amount of the total deposit. The credit may be immediate. The credit may be provided once per day, such as a designated time after the retailer has closed its operation or at another designated time. The credit may occur multiple times a day. For retailers having multiple locations, such as at multiple locations in different zones, a credit may be provided once per business day or at the close of the business within each respective time zone, or at another designated time. In many circumstances, credit is provided before the Smart Bags and loose notes are removed from the drop safe(s). In some instances, credit is provided several days (if not more) before the Smart Bags and loose notes are removed from the drop safe. Providing a retailer with advance credit is also discussed in U.S. Patent Application Publication No. 2009/0006249, which is incorporated herein by reference.

Messenger Pickup Process

The drop safes of the present invention are emptied by authorized individuals (called "messengers" herein). The messenger service that provides the messengers may be an armored car service or other appropriate service.

In accordance with the present invention, the messenger is authorized through the management of the individual's entitlements contained in their profile resident in the central server. This information is used in conjunction with the particular authorized route containing the drop safe to be accessed. When the messenger arrives, he/she begins the authorization process through the logging into a messenger app on his/her mobile device with the appropriate credentials to verify the user's identity. This can be any combination of access codes, PINs and/or biometrics provided to the location-enabled mobile device. When at the premise containing the deployed drop safe, the specifics of the drop safe to be accessed is identified, through an input of a code or the reading of the proximities of the smart device and safe. If the messenger is properly identified and authorized, determined to be near a valid drop safe to be serviced and is communicating with the central server, a protected authorization message is issued to the drop safe to permit access. This access is limited to a single use on that drop safe and must be utilized within a predetermined timeframe. If it expires before use, another access authorization may be requested.

This dynamic hand-shaking process occurring amongst the three entities: the messenger's mobile device, the drop safe and the central server is unlike any current process employed in the industry that make use of one-time codes. This dynamic process allows for the real-time management of the access to account for changes in an individual's authorization and/or entitlements to specified individual drop safes.

The foregoing summarized process is described in greater detail with reference to flowchart 1400 shown in FIGS. 21A and 21B. Initially, a particular drop safe is determined to be emptied in accordance with either a predetermined schedule or an indication that the drop safe has reached a capacity of some sort (or other reason to empty the drop safe) (Step 1410).

A drop safe can be scheduled to be emptied daily, every other day, every third day, etc., based on historical usage or other information. In addition, the drop safe may be programmed (or the central server programmed) to schedule an emptying of the drop safe when the drop safe includes or exceeds a predetermined number of Smart Bags (e.g., 15 Smart Bags, 25 Smart Bags, 40 Smart Bags, 60 Smart Bags, etc.) For B-Safes and other embodiments that include bill validators, an emptying can be scheduled if a preset number of notes have been accepted by the bill validators and deposited into the drop safe's chassis. An emptying can be scheduled if the total monetary value of the deposits exceeds a preset amount of money in order to minimize monetary risk. Other reasons may be employed to determine that a drop safe is to be emptied.

To initiate removal of the contents of a drop safe, the authorized messenger launches the messenger app on his/her mobile device (Step 1420). Similar to authenticating the retailer during use of the retail deposit app, the messenger app employs known security measures to ensure the authenticity of the mobile device and verification of the identity of the messenger (Step 1430). All manners and variations of authenticating the manager's mobile device and all manners and variations of verifying the identity of the manager as described herein (in connection with deposit creation) may be employed to authenticate the messenger's mobile device and verify the identity of the messenger.

The messenger proceeds to initiate to seek access to the drop safe by identifying the drop safe to be emptied (Step 1440). This is accomplished in different ways in accordance with various embodiments of the present invention.

In one embodiment, the messenger scans, via the mobile device's camera, the QR code that is on the drop safe to be emptied. The QR code, which appears on the exterior of the drop safe at any accessible location, uniquely identifies the drop safe. In a variation, other forms of visual indicia may be employed, such as barcode or other form of uniquely-identifiable indicia mentioned herein.

In accordance with another embodiment, the messenger's mobile device includes NFC capability, or iBeacon, or other appropriate RFID communication technology, and the messenger's mobile device obtains the ID of an RFID tag (or other electronic passive or active device) coupled to the drop safe, placed within the tech shelf of the drop safe, or placed at another location on or in the drop safe that is capable of being detected by the messenger's mobile device.

In a variation, the messenger also has other equipment capable of detecting the ID of the RFID tag (or other electronic tag) on or in the drop safe, and that other equipment wirelessly transmits that information to the messenger's mobile device for further handling.

Other means of identifying the drop safe may be employed, including any variation/technique discussed herein to identify a Smart Bag.

Upon ascertaining the ID of the drop safe to be emptied, the messenger's mobile device supplies that information to the central server (Step 1450). The central server includes records about each drop safe and, thus, identifies all relevant information about the identified drop safe, including the physical location of the drop safe, the retailer to which the drop safe is associated, the particular store of that retailer (if multiple stores and/or locations) to which the drop safe is associated, the last time the drop safe was emptied, all deposits that have been made into that drop safe since the last pickup (based on the above-discussed retail deposit activity), the identity of the prior messengers who had previously emptied that drop safe, and other relevant information.

The messenger's mobile device further provides to the central server the current location of the messenger's mobile device (using its GPS) (Step 1460). In accordance with the present invention, the central server determines whether the messenger's mobile device is currently located within close proximity of the known location of the drop safe to be emptied (Step 1470). If so, then the central server generates a unique single-use, time dependent authorization code (also referred to herein as an "OTA Code") (Step 1480). The OTA Code is transmitted to the messenger's mobile device (Step 1490).

The OTA code is generated based on several different data elements and encrypted in a manner to maximize security and prevention of theft/decryption by unauthorized individuals. For instance, the data elements may include the locations of the messenger and of the drop safe to be emptied, the current date and time, the identity of the messenger, a user ID of the messenger, the identity of the retailer with which the drop safe is associated, and other such type of information. Generation of the OTA code may include any combination of these data elements, or none at all, and may be based on any suitable industry-acceptable methodologies for generating a one-time-use, authorization code that is then used to gain access to a digital safe. Since the various technologies and methodologies used to generate a suitable one-time authorization code are well known in the art, further description thereof is not provided except where necessary for an understanding of the present invention.

If the messenger's mobile device is not sufficiently close to the drop safe to be emptied, then an OTA code is not generated and the messenger is provided with appropriate notification indicating that there is a problem and that the messenger is not authorized to proceed (Step 1475). Follow-up steps to correct the situation may be provided.

In accordance with one embodiment of the present invention, the Messenger's mobile device, via the messenger app, displays the OTA Code in the form of a QR-Code on the mobile device's display (Step 1500). In a variation, the OTA Code is displayed in another two-dimensional form (or in a one-dimensional form, such as barcode).

While the OTA Code is displayed, the messenger quickly places the mobile device in front of the drop safe's barcode/QR-code scanner, which in turn reads the displayed OTA Code (Step 1510). The drop safe determines whether the scanned code corresponds to the correct OTA Code that was just generated by the central server (Step 1520). Such determination may be carried out in any industry-acceptable manner. The determination may be carried out by the central server, by the central server working in conjunction with the drop safe, or by the drop safe itself.

Since methodologies that enable for the creation of a unique one-time-authorization code, transmission thereof, and verification by another device of the accuracy and legitimacy of a presented code are well known in the art, further description thereof is not provided except where necessary for an understanding of the present invention.

Upon verification that the presented OTA Code is accurate and legitimate, the drop safe's digital lock unlocks, which allows the messenger to open the drop safe's door, thereby gaining access to the contents of the drop safe's chassis (Step 1530).

In accordance with a variation of the above embodiment, as an additional safety measure, the messenger app displays the OTA Code for a relatively short pre-set period of time. Exemplary times include 10 seconds, 20 seconds, 30 seconds, 45 seconds, 1 minute, 1 minute 30 seconds, 2 minutes, etc.

In another variation, the OTA Code is time-sensitive, that is, it expires after a predetermined amount of time (separate and apart from how long the OTA Code is displayed by the messenger's mobile device). For instance, the OTA Code must be received by the drop safe and transmitted to the central server within a preset amount of time after the OTA Code was generated in the first place. Any appropriate preset amount of time may be set. By being time-sensitive, unauthorized interception of the OTA Code and later, improper use of that OTA Code will not be accepted since the OTA Code has already expired.

In yet a further variation, the messenger app displays the OTA Code for one pre-set period of time and the OTA Code is time-sensitive (for another pre-set period of time) in order to provide yet further enhanced security against attempts to improperly open the drop safe. For instance, in either of these variations, attempts to take a photograph or otherwise duplicate the OTA Code (e.g., via a different device) to enable for later entry of the drop safe will be unsuccessful.

In accordance with another embodiment of the present invention, the messenger's mobile device wirelessly transmits the OTA Code, in a non-visual manner, to the drop safe. Transmission may occur using NFC, Bluetooth or other short-range or close-proximity type RF communication. Other manners of short-range, non-visual, communication may be employed.

If the messenger is unable to provide the OTA Code from the messenger's mobile device to the smart safe within the designated period of time, the messenger will have to repeat the entire process to receive a new OTA Code from the central server.

As previously discussed, the drop safe of the present invention ascertains the ID of every Smart Bag that is within its chassis. Such inventorying occurs at different times and after, during or before certain events, as already discussed. Preferably, the drop safe carries out yet another inventory of its contents prior to access and emptying by the messenger. For instance, the inventory may occur upon the messenger transmitting the ID of the drop safe to the central server, upon the messenger's mobile device receiving the OTA Code, and/or at any other time (including multiple times), and including immediately prior to the unlocking of the drop safe's door (Step 1530). Accordingly, the drop safe and central server have identified every Smart Bag to be removed by the messenger.

To assist the messenger, the central server may transmit to the messenger's mobile device the number of Smart Bags that are included within the drop safe and that need to be removed. Via the messenger app, that information is provided to the messenger. Optionally, the ID of each Smart Bag within the drop safe can also be provided to the messenger's mobile device and then displayed to the messenger. However, since the drop safe may have upwards of 30 or more Smart Bags, providing the ID of each Smart Bag at the time of emptying the drop safe may unnecessarily slow the messenger down. But such information may be employed after fully emptying the drop safe. For instance, the messenger may scan the bar code of each retrieved Smart Bag (e.g., while the messenger is securely within his/her vehicle or at another location, or optionally while still at the retailer) to verify that each Smart Bag that previously was inside the drop safe is now securely in the messenger's possession. In a variation, the below-mentioned transfer container into which the messenger transfers the Smart bags (as discussed below), may include its own associated RFID reader/RFID antenna that is used to identify and ascertain that all the Smart Bags within the drop safe have been transferred to the messenger's custody.

Emptying Contents of Brink's Box

When the drop safe is a Brink's Box (or other like version) of the present invention, the only removable contents within the chassis are deposited Smart Bags. Hence, when a Brink's Box is being emptied, the messenger proceeds to remove all the deposited Smart Bags (Step 1540 in FIG. 21B). To facilitate ease of removal of the Smart Bags, a large bucket optionally may be provided at the bottom of the chassis, which catches all the deposited Smart Bags. The messenger then removes the bucket from the chassis and transfers all the Smart Bags within the bucket into an appropriate transfer container (Step 1550). The messenger places the now-empty bucket back into the bottom of the chassis.

Upon completing the emptying of the Brink's Box, the messenger closes the door, which is automatically locked (Step 1560). After the door is closed and locked, the Brink's Box conducts a scan of its contents (Step 1570). For instance, in the embodiments that employ an RFID reader within the tech shelf and RFID antennae within the chassis, if all the Smart Bags were removed by the messenger, no RFID tags should be detected. If, however, a Smart Bag is detected, the Smart Bag is flagged as having not been removed from the drop safe.

The messenger may be alerted that a Smart Bag remains in the drop safe, and the messenger may repeat the above-process to again gain access to the drop safe. The messenger may be unable to retrieve the Smart Bag (for any reason) and, in such case, the Smart Bag will be removed during the next time the drop safe is emptied.

The messenger takes the removed Smart Bags and transfers them to the cash processing facility for further handling.

To minimize risk, upon opening of the drop safe as discussed herein, the messenger is given a relatively short period of time, to empty the contents of the drop safe. During this designated period of time, the drop safe's light strip is green to signify to the messenger that the two-minute period has not yet expired. After the designated period of time, the light strip turns yellow to signify to the messenger that he/she has gone over the designated amount of time to empty the drop safe.

When the light strip turns yellow, a representative from the cash processing facility (or other entity) may contact (e.g., call) the messenger to inquire if there are any problems. Accordingly, the status (as indicated by the color of the drop safe's light strip) along with the required handling procedures by the messenger allow for the drop safe to be emptied in a quick, organized and ideally secure manner. Other colors, time-frames and procedures may be employed than that mentioned above. Optionally, the drop safe's LCD screen/button provides a countdown-timer to inform the messenger how long he/she has until the end of the designated amount of time.

Emptying Contents of B-Safe

When the drop safe to be emptied is a B-Safe of the present invention or other similar version, the contents to be removed include both Smart Bags as well as notes that have been accepted by the bill validators.

The messenger proceeds to remove all the deposited Smart Bags from the B-Safe (Step 1580 in FIG. 21B) and transfers the removed Smart Bags into a suitable transfer container (Step 1590). These steps are carried out in basically the same manner for both a Brink's Box and a B-Safe.

The messenger then removes all the notes within the chassis that have been accepted by the bill validators (Step 1600). As mentioned earlier, a sufficiently large bin is placed beneath the bill validators and catches the notes that have been accepted by the bill validators. Accordingly, the messenger is able to quickly remove the notes by removing the bin and transferring the contents of that bin into a separate loose-note transfer bag (Step 1610). The messenger then returns the now-empty bin back into the chassis.

In accordance with the present invention, in one version, the loose-note transfer bag may include an RFID tag within it and have the ID of the RFID tag provided on the outside of the bag in both human-readable form and as a bar code (similar to a Smart Bag). The messenger enters the ID of the loose-note transfer bag into the messenger app that is running on the messenger's mobile device (Step 1620). The ID may be manually entered (using the ID printed on the bag) or may be obtained by using the messenger's mobile device's camera to scan the barcode that is on the outside of the bag. This step is similar to the step of the retailer's manager obtaining the ID of a new Smart Bag, as discussed above. Moreover, any other version/technique/embodiment for obtaining the ID of a Smart Bag as discussed herein may be employed to identify the loose-note transfer bag.

Upon obtaining the ID of the loose-note transfer bag and placing the loose-notes within that bag, the central server creates a deposit record (Step 1630) that identifies the amount of money within the loose-note transfer bag, as well as the number of the notes by denomination, along with the ID of that bag, and other information, including the identity (or identities) of the individual(s) who deposited those notes (based on the prior described use of the bill validators by the retailer), the date/time of each deposit via the bill validators, the retailer associated with the B-Safe, and other relevant information. The loose-note transfer bag is sealed and placed within the transfer container (Step 1640) along with the removed Smart Bags.

After all the Smart Bags and loose notes are removed from the B-Safe, the messenger closes the door, which is automatically locked (Step 1650). Thereafter, the B-Safe conducts a scan of its contents (Step 1660). This scan is the same as that discussed above for the Brink's Box after it is emptied. If a Smart Bag is detected within the B-Safe, the B-Safe proceeds in the manner as already discussed above.

The messenger then proceeds to transfer the Smart Bags and loose-note transfer bag to the cash processing facility for further handling.

The order of the above steps may be different. For instance, the loose notes may be removed first from the B-Safe, followed by removal of the Smart Bags. As another example, the ID of the loose-note transfer bag may be obtained and entered into the messenger app in advance of the messenger transferring the loose notes from the chassis into the loose-note transfer bag. Additional steps or substeps may be included within this process.

In a variation, the loose-note transfer bag doesn't include an associated ID and thus steps 1620 and 1630 in FIG. 21B are omitted from the messenger pickup process. Other variations may be possible.

In yet another variation of the present invention, the B-Safe's chassis includes a bin liner (bin liner 444 shown in FIG. 12B) within bin 442. Accordingly, as the bill validators accept notes, the accepted notes fall into the bin liner. During removal of the B-Safe's contents, the messenger removes the entire bin liner (with the notes within it), places the bin liner within an appropriate envelope, or the above-discussed loose-note transfer bag, or another appropriate receptacle, which is then sealed. The messenger proceeds to place a new, empty bin liner within the bin in the B-Safe's chassis, and closes the B-Safe's door. In this variation, the messenger advantageously doesn't make physical contact with any of the loose notes that have been accepted by the B-Safe's bill validators. In addition, the chance of a note being unintentionally dropped or otherwise misplaced is reduced by the use of a bin liner that has caught all the notes that have been accepted by and dropped from the bill validators.

In yet a further variation, rather than employing a bin liner, the above-discussed loose-note transfer bag may be installed within the chassis of the B-Safe prior to use, and designed to itself capture notes that have been accepted by the bill validators. In such variation, when a new (and empty) loose-note transfer bag is placed within the B-Safe, the messenger obtains the ID of that new loose-note transfer bag via the messenger app, whereby a record is created that is associated with that loose-note transfer bag. Thereafter, as the B-Safe's bill validators accept notes, the record is updated to reflect the accepted notes. Then, when the B-Safe's contents is to be emptied, the messenger removes the loose-note transfer bag and seals it. The messenger then proceeds to obtain the ID of a new (empty) loose-note transfer bag and places that new bag appropriately into the B-Safe's chassis for subsequent use.

In this variation, the messenger obtains the ID of a new loose-note transfer bag by using his/her mobile device to scan the barcode on the outside of the bag (or by manually entering the ID printed on the outside of the bag, or by employing another technique herein described). Alternatively, rather than have the messenger obtain the ID of the new loose-note transfer bag, the ID of that new bag is obtained by the B-Safe itself after the B-Safe's door is closed and locked. That is, and as discussed above, when the B-Safe's door is closed, the B-Safe conducts a scan of its contents (e.g., in certain embodiments, via its RFID reader and RFID antennae) (Step 1660 in FIG. 21B). In this variation, the B-Safe will detect the RFID tag of the newly placed loose-note transfer bag and, at that time, a new record that is associated with this bag may be created.

It is appreciated that the name "loose-note transfer bag" is used herein for convenience, but other terms for this bag and for other elements and components discussed herein may be used. Moreover, in the above variation that entails placing a new, empty loose-note transfer bag within the B-Safe's chassis prior to closing the door, the messenger doesn't have to make physical contact with any of the notes that have been accepted by the bill validators. The messenger only has to remove and seal the loose-note transfer bag, and then to place a new loose-note transfer bag at the appropriate location within the B-Safe's chassis. This effort, along with removing any Smart Bags that have deposited into the B-Safe, is a process that can be carried out very quickly.

In accordance with the present invention, rather than using a liner or a bin, another appropriate container, such as a canvas bag, may be utilized to capture notes that have been accepted by the bill validators. Certain countries may have strict rules as to what types of items can be employed in cash-acceptance type devices, and the present intention is able to accommodate those rules.

The B-Safe of the present invention includes a pair of bill validators. If one of the bill validators is damaged, jammed or otherwise not operating properly, that validator is turned off, but the retailer still is able to deposit notes through the working bill validator. As mentioned above, if the bill validator(s) have accepted an amount of money or a number of notes that exceed a preset limit, a messenger may be scheduled to empty the contents of the B-Safe. Upon acceptance of that amount of money or number of notes, the bill validators can be turned off. In such case, the retailer still is able to make deposits via use of Smart Bags that are dropped using the drop safe's bag drop slot.

In a variation of that shown herein, the B-Safe may employ a different number of bill validators. For example, the B-Safe may employ a single bill validator, three bill validators, or other number. The shape and configuration of the Brink's Box and the B-Safe, and any of their respective components, may be different than that shown and/or described herein.

The contents of other embodiments of the present invention employing other equipment, such as a small form factor cash recycler, coin sidecar, etc. may be carried out in manners similar to or the same as those described in connection with the Brink's Box or the B-Safe. Regardless of the equipment that is employed, given the detailed discussion herein, the messenger is able to access the drop safe utilizing the novel methodologies, techniques, and equipment as herein described and then empty the contents of such drop safe. To avoid duplication, the step-by-step discussion of how the messenger empties the recycler safe or other type of safe with different equipment is not provided.

Central Server

As discussed herein, the drop safes of the present invention communicate with a central server, and both the manager's mobile device and the messenger's mobile device communicate with the central server during use of the apps described herein. Communication with the central server occurs in real-time and may be carried out in any manner and consistent with any suitable communication protocols, as would be appreciated by those of ordinary skill in the art. The details of those manners and communication protocols are not discussed herein, except where necessary for an understanding of the present invention.

The central server maintains/stores all the deposit records that have been created, and maintains/stores data pertaining to the identity, functions, capabilities, location, etc., with respect to each of the drop safes of the present invention. The central server maintains/stores records/data with respect to each of the retailers and its respective employees (or at least those employees authorized to use a mobile device to facilitate deposits within a drop safe). The central server maintains/stores records/data with respect to all messengers who are authorized to empty the drops safes, and maintains/stores records/data with respect to all service personnel who are authorized service a drop safe (e.g., replace a damages tech shelf, change a door to convert a Brink's Box to a B-Safe, etc.). The central server maintains/stores whatever other information is necessary to assist in carrying out the various processes of the present invention.

The functions of the herein-described central server may be carried out by multiple servers and other equipment, with such servers and other equipment controlled by one or more entities. The present invention has been described in a way to make the invention understood by persons of ordinary skill in the art, but as appreciated by those of ordinary skill in the art, variations may be made without departing from the spirit and scope of the invention.

In accordance with the present invention, the central server receives from each of the drop safes data regarding activity that is occurring or has just occurred in connection with those drop safes. Likewise, the central server is in communication with the mobile devices of retailers, messengers and service personnel. During use of suitable apps on those devices, the mobile devices are in communication with the central server, and thus the central server is providing and/or receiving data to/from those mobile devices relating to the processes described herein. For instance, during creation of a deposit record by a retailer's manager, the central server may cause certain information to auto-populate in the deposit record, such as the identity of the retailer, and other information. Implementation of these features as described herein are well within the capability of those of ordinary skill in the art, and thus details about how those apps operate, the types of information transmitted to the central server, and from the central server, are not provided herein except where particularly necessary for an understanding of the present invention.

Additional Embodiments

Each of the drop safes described herein may include additional equipment that are usable by retailers.

In one variation, a drop safe includes a coin sidecar for accepting bulk coins. The "coin sidecar" may be connected to the drop safe or included within it. A retailer may gain access to the coin sidecar similar to how access to the bill validators is obtained. For instance, an employee may have his/her badge scanned by the drop safe in order to identify the employee, and then the employee proceeds to place the coins with the device's receptacle. In any other embodiment/technique/process for accessing the bill validators may be employed to access the coin sidecar.

A deposit record is created for the deposited coins. Since the design, construction, and implementation of a coin sidecar or other similar functional equipment are well known, further description is not provided herein.

The drop safes may employ a display monitor for providing additional information to managers and other employees of the retailers, messengers, service personnel, etc. It is appreciated that the embodiments described above do not include a display monitor other than a very small LCD screen/button. The screen/button is depressible and provides countdown information during timed sessions. The bulk (or nearly all or all) information is provided to the retailer's manager and other personnel via the mobile devices. However, in other variations, rather than employing an LCD screen/button, the drop safe includes only a button. In yet another variation, the LCD screen/button is omitted altogether. In these two variations, the drop safe of the present invention includes no display whatsoever.

In yet a further variation, the drop safes are "disconnected" devices. That is, the drop safes do not communicate directly with the central server (i.e., via cellular communication, via the Internet, or via other long-range communication protocol). Rather, the drop safes include Bluetooth capability (or other short-range communication) so that they directly communicate with the manager's mobile device, the messenger's mobile device, and service personnel's mobile devices via Bluetooth pairing (or other short-range communication technique or protocol). Accordingly, during the manager's use of the retail deposit app on his/her mobile device, the mobile device and the drop safe are in direct communication. Preferably, communication between the two devices employs exclusive connections, whereby the drop safe is able to connect to only a single mobile device at a time. This provides enhanced security of the data communicated between the devices.

A suitable communication protocol that may be employed is Bluetooth 4.0, or other equivalent or later versions having the desired properties. In Bluetooth 4.0, the relevant area of technology is the GATT (Generic Attribute) profile, which defines how two Bluetooth Low Energy devices, one in the mobile device and the other in the drop safe, transfer data back and forth using concepts called Services and Characteristics. As is known, this profile makes use of a generic data protocol called the Attribute Protocol (ATT), which is used to store Services, Characteristics and related data in a lookup table.

The present invention in this variation employs the above protocols/technology to keep the connection between the user's mobile device and the drop safe exclusive. Once the user's mobile device connects to the drop safe, the devices no longer advertise. That is, once the connection is established, other devices no longer ascertain the existence of the devices and thus are not able to connect. In accordance with the present invention, data is transmitted between the drop safe and the mobile device only upon after such exclusive connection is established, thus ensuring a confidential, unalterable flow of information between the devices.

In the herein-described "disconnected" devices, after one or more Smart Bags are deposited into the drop safe (and similarly after notes are accepted by the bill validators in versions that include bill validators), the drop safe communicates to the manager's mobile device that the deposit(s) into the drop safe has been made and accepted, with the associated amounts of the drops. As in the above embodiments, information is provided to the manager's mobile device in real-time, thus providing the user with a "richer" experience.

In accordance with this version of the present invention, data reflecting the activity that has transpired between the manager and the drop safe are stored, in certain versions, within the manager's mobile device. Such data includes the amount of cash that has been dropped, including any notes that have been accepted by the bill validators, date of the drop, and other relevant information. This all may be included within the deposit record that was initially created prior to depositing the money. When the manager is in a location that contains cell service (or Wifi) that enables communication between the manager's mobile device and the central server, the stored data pertaining to the deposit is communicated to the central server.

In certain versions, after receipt from the manager's mobile device by the central server of data representing the above-described deposit, the cash processing facility processes the deposit as if the data was received directly from the drop safe. In certain embodiments, the retailer's bank account is provided with a credit for the amount of the deposit. The credit may be provided immediately, at the end of the business day, or at another time. A discussion of providing retailers with advance credit prior to delivery of the cash is discussed in U.S. Patent Application Publication No. 2009/0006249, which is incorporated herein by reference.

As illustrated from the foregoing discussion of the "disconnected" version of the drop safe of the present invention, a retailer's manager is enabled to receive, in real-time, data and other information concerning the deposit being made, including the amount of the deposit and, in certain versions, a detailed report of the deposit that shows the amount of each denomination reflected in the deposit. A messenger emptying the "disconnected" drop safe receives via the messenger's mobile device from the drop safe all records, transactions, and other data relevant to what has transpired at least since the last time the drop safe was emptied. This information then is transmitted from the messenger's mobile device to the central server either immediately or when the messenger's mobile device is at a location where cellular communication is provided.

Accordingly, the drop safes of the present invention can be utilized in areas that lack cellular coverage and/or other form of communication to the central server.

In a further variation, the drop safes of the present invention can include both long-range communication to the central server, as discussed earlier with reference to the various figures, and further include Bluetooth communication (as discussed above in the "disconnected" versions of the drop safes).

The drop safes of the present invention may be sized to hold various numbers of deposited Smart Bags. In some instances, the drop safe can be a relatively large drop safe or a relatively small drop safe, each sized to meet any customer need. The relative size of the chassis may vary as appropriate.

In a variation, the form of the codes discussed herein may be different. For instance, in one version, the employee may gain access to a drop safe by having the barcode on his/her badge read by the barcode/QR-code scanner/reader of the drop safe. The badge may include a QR code or other type of computer-readable indicia that identifies the employee, and the scanner/reader of the drop safe is able to read such other type of computer-readable indicia. As another example, the OTA code is described herein as being in the form of a QR-code. However, in a variation, the OTA code is either a different form or is displayed by the messenger's mobile device in a different form. Other suitable computer-readable forms of codes may be employed. In yet another variation, rather than employing a barcode/QR-code scanner/reader within the drop safe, a different type of scanner may be employed. For instance, in one variation, the drop safe includes a camera along with suitable software, including computer vision-type software, to identify the scanned image (whether it is displayed by the messenger's mobile device as the OTA code or other thing that is scanned by the drop safe as discussed herein) or to extract data embedded or otherwise included within the item being scanned. The processing of the scanned image may be achieved within the drop safe or by the central server, or a different processing system, or collectively by any of these processing systems.

Overview of General Benefits and Advantages of Invention

In addition to the benefits mentioned above (and some of those benefits are repeated below), the drop safes are modular in design and configurable to accommodate the particular needs of individual retailers or the collective needs of multiple retailers. The present invention further provides a level of future-proofing to enable the deployment of newer technologies through the defined interfaces (physical/electrical/logical). The cost to assemble a drop box of the present invention is lower than current systems that entail custom design to accommodate specified needs. The drop safes of the present invention are reconfigurable by simply replacing one component with another, without moving the entire drop safe to a service location and, in most instances, without having to move the drop safe at all. Since the time and cost to move an installed drop safe is significant, the present invention advantageously allows the drop safes to be repaired, upgraded, emptied, and serviced with minimal interruption to the operations of retailers. As explained in detail above, a drop safe that does not include bill validators (i.e., a Brink's Box) can be reconfigured to include bill validators (i.e., convert to a B-Safe) with minimal time and effort.

The drop safes of the present invention also advantageously take inventory of their contents regularly and/or during particular steps in the various processes as described herein. In certain embodiments, by employing Smart Bags that include RFID tags, the drop safes are able to immediately identify via RFID means the Smart Bags that have deposited and, moreover, are able to immediately identify Smart Bags that have removed from the chassis, whether authorized or not. Unauthorized removal of a Smart Bag is detected (e.g., when a Smart Bag is improperly removed through the bag drop slot) and authorized removal of Smart Bags is detected (i.e., when a messenger properly empties a drop safe). The RFID reader that is employed within the drop safes of the present invention is capable of reading the RFID tags of all the Smart Bags within the chassis, no matter how many are in the chassis, in just a few seconds. This advantageously enables the drop safes to re-inventory their contents at any time. Since the RFID antennae are inside the drop safe's chassis, the likelihood that the RFID reader unintentionally scans an RFID tag that is outside the drop safe is exceedingly low.

The doors of the drop safes of the present invention include a limited number of components, in particular, a bag drop slot, a digital lock and, in the case of a B-Safe, bill validators. In the other embodiments/variations described, only or two additional components are included. It is appreciated that a drop may include, within the door, a significant number of components to allow the retailer to carry out a number of activities and functions.

However, in the various embodiments described, the door includes no pickable lock, no handle, and no physical combination system to unlock the door. The hinges are internal and designed so that a door can be removed from the drop safe's chassis, as discussed herein. The door advantageously can be replaced with another door in a relatively short period of time and without special tools. Still further, in yet other embodiments of the present invention, the drop safe may include a door handle, a physical combination system, and/or external hinges, and such embodiments still include some, if not all, of the novel features described herein.

The tech shelf of the present invention advantageously hold the bulk of the electronics. The tech shelf itself is a modular component of the drop safe and is easily and quickly replaceable, if necessary, without significant (or any) interruption to a retailer's operations. A serviceman with little to no specialized knowledge of the drop safe is able to replace a damaged tech shelf with a new or refurbished tech shelf fairly quickly. Tech shelves may be upgraded from time-to-time rather easily and, again, with little to no interruption to the operations of the retailer. Replacement of a tech shelf is also accomplished without accessing the contents of the drop safe's chassis, thus providing yet additional security to its contents. The tech shelf employs a cabinet that advantageously does not interfere with communication between the drop safe (via the tech shelf) and the central server during operation.

The drop safe of the present invention doesn't include or require a keyboard, keypad or input panel. All or nearly all communication from retailers, messengers and service personnel is via remote means such as connected smart devices, PCs and the mobile devices of those individuals.

By employing a modular design, and with each of the three major components weighing under 150 lbs, the entire drop safe (in any configuration) can be mailed to a retailer, in three separate packages, without the need to use a special freight carrier. Hence, the components of the drop safe may be mailed via a commercial carrier, such as Fed Ex or United Parcel Service, and then a service personnel can quickly assemble the three components and configure the drop safe within a relatively minimal amount of time. The door and chassis in nearly all commercial drop safes are permanently fixed. The present invention, however, provides multiple advantages as discussed by having a door and chassis that are detachable.

Use of the drop safes of the present invention can be done with minimal contact to the drop safe. Likewise, a drop safe may be emptied with minimal contact and, in some versions, with no contact to the currency.

Other benefits are as described herein or would otherwise be appreciated by those skilled in the art.

The present invention employs various individual components that are well understood in the art. For instance, an RFID reader is well understood. As another example, a bill validator is well understood. As a further example, a digital lock is well understood. Accordingly, descriptions of the design and detailed functionality of various components are not provided in order to not obscure the discussion of the invention herein, except where particularly necessary for an understanding of the present invention. Discussions of the construction and operation of certain types of drop safes with some of the components discussed herein are set forth in U.S. Pat. Nos. 5,695,038; 5,975,275; 5,944,163; 8,645,214; 8,844,804; 9,495,705; 9,911,108, and U.S. Patent Application Publication Nos. 2009/0006249; 2009/0222381; and 2018/0293649, all of which are assigned to the assignee of the present application, and are incorporated herein by reference in their entireties.

The following table, which identifies reference numbers in the figures along with the names of the corresponding components, is provided merely convenience, and is not intended to limit the scope of the present invention. The names of various elements are selected for convenience and ease of reference.

TABLE

| # | Element Name |
|---|---|
| 10 | Brink's Box Drop Safe |
| 20 | B-Safe Drop Safe |
| 30 | Small Form Factor Cash Recycler Safe |
| 100 | Chassis |
| 110 | Dropped Item Sensing |
| 120 | Storage Area |
| 130 | Customer Storage Compartment |
| 140 | Chassis Inner Walls |
| 150, 152 | Cables |
| 160 | Locking Pins |
| 170 | Bracket |
| 172 | Mounting Rails |
| 174 | Cabinet Portion of Mounting Rail |
| 176 | Cable Connectors |
| 180 | Latch Plate |
| 182 | Cabling Harness |
| 184 | Mounting Rails |
| 190 | Pin |
| 200 | Door (Brink's Box Version) |
| 210 | Drop Door Mechanism |
| 220 | Digital Lock and Bolt Work |
| 222 | Door Interface |
| 230 | Edge of Door |
| 240 | Hinge Knuckles |
| 250 | Hinge Sleeve |
| 252 | Upper Hinge Knuckle |
| 254 | Lower Hinge Knuckle |
| 300 | Technology Cabinet (Tech Shelf) |
| 310 | System Controller & Com. Module |
| 312 | Auxiliary Controller Board |
| 320 | Dropped Item ID & Auth. Module |
| 322 | Set of Connectors |
| 330 | User & Dropped Item Auth. Module |
| 340 | LCD Screen/Button |
| 350 | Cabinet |
| 360 | Light Strip/Diffuser |
| 370 | Power Supply |

TABLE-continued

| # | Element Name |
|---|---|
| 372 | Screws |
| 374 | Cables |
| 376 | Power Connector |
| 378 | Air Vents |
| 380 | Technology Shelf |
| 382 | Recessed Area |
| 384 | Mounting rails |
| 400 | Door (B-Safe Version) |
| 410 | Drop Door Mechanism |
| 420 | Digital Lock and Bolt Work |
| 422 | Door Interface |
| 430 | Bill Validators |
| 440 | Hinge |
| 442 | Bin |
| 444 | Bin Liner |
| 450 | Door (Recycler Version) |
| 460 | Drop Door Mechanism |
| 470 | Digital Lock and Bolt Work |
| 480 | Bill Depositor |
| 482 | Bill Dispenser |
| 490 | Hinge |
| 500 | Smart Bag |
| 510 | Bag |
| 512 | Printed Barcode |
| 514 | Printed ID # |
| 520 | RFID Tag |
| 600 | Retailer |
| 610 | Drop Safe |
| 620 | Manager's Mobile Device |
| 700 | Cash Processing Facility |
| 710 | Central Server |
| 720 | Messenger |
| 730 | Messenger's Mobile Device |
| 750 | Retailer's Bank |

Having described the present invention including various features and variations thereof, it is intended that the appended claims be interpreted as including the embodiments described herein, the alternatives mentioned above, and all equivalents thereto.

What is claimed is:

1. A method of accessing a drop safe placed at or near a retailer location and adapted to communicate with a remote central server; the method comprising:
scheduling, by the central server, to arrange a messenger to empty a drop safe placed at or near a retailer location;
receiving, by the central server, data from a mobile device of the messenger that includes an identification of the messenger and a current location of the mobile device;
verifying, by the central server, that the identified messenger is authorized to empty the drop safe;
receiving, by the central server from the mobile device, a code that uniquely identifies the drop safe;
identifying, by the central server, an identity of the drop safe based on the received code;
ascertaining, by the central server, a location of the identified drop safe;
determining, by the central server, whether the current location of the mobile device is within a predetermined distance of the ascertained location of the drop safe;
generating, by the central server, a one-time authorization code to open the drop safe if the current location of the mobile device is determined to be within the predetermined distance of the ascertained location of the drop safe;
communicating, by the central server, the generated one-time authorization code to the mobile device;
receiving, by the drop safe from the mobile device, the one-time authorization code communicated by the central server;
determining whether the received one-time authorization code corresponds to the one-time authorization code generated by the central server; and
unlocking and opening a door of the drop safe to provide access of the drop safe by the messenger, for subsequent emptying, if it is determined that the received one-time authorization code corresponds to the one-time authorization code generated by the central server.

2. The method of accessing a drop safe of claim 1, wherein the code that uniquely identifies the drop safe corresponds to a computer-readable code displayed on the drop safe; and the step of receiving, by the central server from the mobile device, a code that uniquely identifies the drop safe comprises receiving by the central server data corresponds to a scanned image of the computer-readable code taken by a camera of the mobile device.

3. The method of accessing a drop safe of claim 1, wherein the step of receiving, by the central server from the mobile device, a code that uniquely identifies the drop safe comprises receiving by the central server data corresponding to an ID of an RFID tag associated with the drop safe as read by a reader on or associated with the mobile device.

4. The method of accessing a drop safe of claim 1, wherein ascertaining, by the central server, a location of the identified drop safe comprises identifying by the drop safe its own location via GPS and transmitting the identified location to the central server.

5. The method of accessing a drop safe of claim 1, wherein the one-time authorization code is a time-dependent code; the method further comprising determining, by the central server, whether the received one-time authorization code was received by the drop safe within a preset amount of time of when the one-time authorization code was generated and, if not, the unlocking and opening of the door of the drop safe is inhibited.

6. The method of accessing a drop safe of claim 1, wherein the one-time authorization code generated by the central server is based on a plurality of data elements including at least data relating to the identified messenger and data representing an identity or location of the drop safe.

7. The method of accessing a drop safe of claim 1, wherein receiving, by the drop safe from the mobile device, the one-time authorization code communicated by the central server comprises scanning, by a reader within or associated with the drop safe, a visual code displayed by a display device within the mobile device, the visual code corresponding to the one-time authorization code.

8. The method of accessing a drop safe of claim 1, wherein receiving, by the drop safe from the mobile device, the one-time authorization code communicated by the central server comprises wirelessly receiving the one-time authorization code from the mobile device via a short-range communication protocol.

9. The method of accessing a drop safe of claim 1, further comprising, prior to unlocking and opening the door of the drop safe, identifying an ID of an RFID tag of each bag deposited within the drop safe to identify all bags within the drop safe to be removed upon unlocking and opening the door of the drop safe.

10. The method of accessing a drop safe of claim 9, further transmitting a number of said bags within the drop safe to be removed for subsequent instruction to the messenger, the number of said bags within the drop safe to be removed based on a number of IDs of RFID tags identified.

11. The method of accessing a drop safe of claim 9, comprising, subsequent to unlocking and opening the door of the drop safe:
receiving, by the central server, from a device operated by the messenger, removed bag data representing IDs of all deposit bags removed from the drop safe by the messenger; and
verifying, by the central server, that the removed bag data corresponds to the IDs of all RFID tags identified prior to unlocking and opening the door of the drop safe.

12. The method of accessing a drop safe of claim 9, wherein identifying the ID of the RFID tag of each bag deposited within the drop safe is carried out by an RFID reader placed exterior to an internal storage area of the drop safe that contains the bags in communication with at least one RFID antenna placed within the internal storage space of the drop safe.

13. The method of accessing a drop safe of claim 9, comprising closing and locking the door of the drop safe after the door is unlocked and opened; and
ascertaining the ID of the RFID tag of any bag remaining within the drop safe after the door is closed and locked to determine whether all bags within the drop safe had been removed prior to the closing of the door of the drop safe.

14. The method of accessing a drop safe of claim 13, comprising contacting, by the central server or a representative of the central server, the messenger to inform the messenger that the drop safe wasn't completely emptied if is determined that all bags within the drop safe had not been removed prior to the closing of the door of the drop safe.

15. A system, comprising:
a drop safe, disposed at or near a retailer location, that includes a bag drop slot and an internal storage space;
a central server, disposed remote from the drop safe, having at least one processor and at least one memory storing instructions that, when executed, by the at least one processor, cause the central server to:
schedule to arrange a messenger to empty the drop safe;
receive data from a mobile device of a messenger that includes an identification of the messenger and a current location of the mobile device;
verify that the identified messenger is authorized to empty the drop safe;
receive, from the mobile device, a code that uniquely identifies the drop safe;
identify an identity of the drop safe based on the received code;
ascertain a location of the identified drop safe;
determine whether the current location of the mobile device is within a predetermined distance of the ascertained location of the drop safe;
generate a one-time authorization code to open the drop safe if the current location of the mobile device is determined to be within the predetermined distance of the ascertained location of the drop safe;
communicate the generated one-time authorization code to the mobile device;
the drop safe configured to:
receive, from the mobile device, the one-time authorization code;
determine whether the received one-time authorization code corresponds to the one-time authorization code generated by the central server; and
unlock and open a door of the drop safe to provide access of the drop safe by the messenger, for subsequent emptying, if it is determined that the received one-time authorization code corresponds to the one-time authorization code generated by the central server.

16. The system of claim 15, wherein the code that uniquely identifies the drop safe corresponds to a computer-readable code displayed on the drop safe; and
the central server is configured to receive, as the code that uniquely identifies the drop safe, data corresponding to a scanned image of the computer-readable code taken by a camera of the mobile device.

17. The system of claim 15, wherein the drop safe includes an associated RFID tag;
the central server configured to receive, as the code that uniquely identifies the drop safe, an ID of the RFID tag associated with the drop safe as read by a reader on or associated with the mobile device.

18. The system of claim 15, wherein the drop safe is configured to identify its own location; and the central server is configured to ascertain a location of the identified drop safe via data regarding the location of the drop safe transmitted by the drop safe to the central server.

19. The system of claim 15, wherein the one-time authorization code is a time-dependent code; and
the central server is configured to determine whether the received one-time authorization code was received by the drop safe within a preset amount of time of when the one-time authorization code was generated and, if not, the unlocking and opening of the door of the drop safe is inhibited.

20. The system of claim 15, wherein the central server is configured to generate the one-time authorization code based on a plurality of data elements including at least data relating to the identified messenger and data representing an identity or location of the drop safe.

21. The system of claim 15, wherein the drop safe includes an associated reader adapted to visually read a visual code displayed by a display device within the mobile device; the drop safe configured to read via the reader the one-time authorization code communicated by the central server, the visual code corresponding to the one-time authorization code.

22. The system of claim 15, wherein the drop safe is configured to wirelessly receive via a short-range communication protocol, from the mobile device, the one-time authorization code communicated by the central server.

23. The system of claim 15, wherein the drop safe is configured to, prior to unlocking and opening the door of the drop safe, identify an ID of an RFID tag of each bag deposited within the drop safe to identify all bags within the drop safe to be removed upon unlocking and opening the door of the drop safe.

24. The system of claim 23, wherein the drop safe is configured to transmit a number of said bags within the drop safe to be removed for subsequent instruction to the messenger, the number of said bags within the drop safe to be removed based on a number of IDs of RFID tags identified.

25. The system of claim 23, wherein the central server is configured to, subsequent to unlocking and opening the door of the drop safe:
receive, from a device operated by the messenger, removed bag data representing IDs of all deposit bags removed from the drop safe by the messenger; and
verify that the removed bag data corresponds to the IDs of all RFID tags identified prior to unlocking and opening the door of the drop safe.

26. The system of claim 23, wherein the drop safe includes an RFID reader disposed external to an internal storage area of the drop safe that contains the bags; and at least one RFID antenna disposed within the internal storage space of the drop safe, the RFID reader in communication with the at least one RFID antenna;

wherein the drop safe is configured to identify the ID of the RFID tag of each bag deposited within the drop safe via the RFID reader in communication with the at least one RFID antenna.

27. The system of claim 23, wherein the drop safe is configured to ascertain the ID of the RFID tag of any bag remaining within the drop safe after the door is closed and locked to determine whether all bags within the drop safe had been removed prior to the closing of the door of the drop safe.

28. The system of claim 27, wherein the central server is configured to initiate a communication to inform the messenger that the drop safe wasn't completely emptied if is determined that all bags within the drop safe had not been removed prior to the closing of the door of the drop safe.

* * * * *